(12) United States Patent
Menton et al.

(10) Patent No.: US 12,506,435 B2
(45) Date of Patent: Dec. 23, 2025

(54) PHOTOVOLTAIC MOUNT ASSEMBLY FOR A COMPOSITION SHINGLE ROOF

(71) Applicant: Enstall US, Inc., Hayward, CA (US)

(72) Inventors: Duane Menton, Vallejo, CA (US); Alexander Morano, Portland, OR (US); Anumeha Justice, Leesburg, VA (US); Roger Pedlar, Phoenix, AZ (US); John Hudson, Walnut Creek, CA (US); Jon Ash, Phoenix, AZ (US)

(73) Assignee: Enstall US, Inc., Hayward, CA (US)

( * ) Notice: Subject to any disclaimer, the term of this patent is extended or adjusted under 35 U.S.C. 154(b) by 0 days.

(21) Appl. No.: 18/559,807

(22) PCT Filed: May 10, 2022

(86) PCT No.: PCT/US2022/028636
§ 371 (c)(1),
(2) Date: Nov. 9, 2023

(87) PCT Pub. No.: WO2022/240909
PCT Pub. Date: Nov. 17, 2022

(65) Prior Publication Data
US 2024/0235457 A1 Jul. 11, 2024

Related U.S. Application Data

(60) Provisional application No. 63/186,534, filed on May 10, 2021.

(51) Int. Cl.
*H02S 20/23* (2014.01)
*F24S 25/61* (2018.01)

(52) U.S. Cl.
CPC ............ *H02S 20/23* (2014.12); *F24S 25/61* (2018.05)

(58) Field of Classification Search
CPC .......... H02S 20/22; H02S 20/23; H02S 20/24; H02S 20/25; H02S 30/10; F24S 25/61;
(Continued)

(56) References Cited

U.S. PATENT DOCUMENTS 4,727,699 A * 3/1988 Sargent .................. E04D 5/147
52/410
4,999,963 A * 3/1991 Verble .................... E04D 5/145
52/410

(Continued)

OTHER PUBLICATIONS

RT-APEX Installation Manual, Roof Tech, Apr. 2021.

*Primary Examiner* — Jonathan Liu
*Assistant Examiner* — Guang H Guan
(74) *Attorney, Agent, or Firm* — TheWebb Law Firm

(57) ABSTRACT

A mount assembly for securing a solar panel rail or rail-less support structure directly to a roof surface, the mount assembly including: a base having a top surface and a bottom surface; a guide extending upwards from the top surface of the base, where the guide forms a pair of members extending from opposing sides of the base and an aperture between the pair of members; a cavity formed within the base, where the cavity has an open end and a bottom cavity surface, where the open end is open relative to the top surface of the base; a through-hole, where the through-hole passes from the bottom cavity surface to the bottom surface of the base; a fastener, where the fastener is sized to pass through the through-hole; and a piston member, where the piston member is configured to surround a portion of the fastener, and further where the piston member is sized to have a volume that is equal to or greater than a volume of the cavity formed within the base.

14 Claims, 69 Drawing Sheets

(58) Field of Classification Search
CPC ..... F24S 25/613; F24S 25/615; F16B 5/0233; F16B 5/123; D16B 5/0233; D16B 5/123
See application file for complete search history.

(56) References Cited

U.S. PATENT DOCUMENTS

| | | | |
|---|---|---|---|
| 7,481,610 B1* | 1/2009 | Egigian | B60P 7/0807 |
| | | | 410/106 |
| 8,448,407 B1* | 5/2013 | Wiener | F16B 43/001 |
| | | | 52/173.3 |
| 8,567,742 B2* | 10/2013 | Sizelove | H01Q 1/1207 |
| | | | 248/500 |
| 9,276,519 B2 | 3/2016 | Kobayashi | |
| 9,496,820 B2* | 11/2016 | Seery | F24S 25/61 |
| 9,660,570 B2* | 5/2017 | Stephan | F16B 5/0028 |
| 9,941,835 B2 | 4/2018 | Molina et al. | |
| 10,135,387 B2* | 11/2018 | Seery | F24S 25/60 |
| 10,171,026 B2* | 1/2019 | Meine | H02S 20/23 |
| 10,359,069 B2 | 7/2019 | Ash et al. | |
| 10,511,251 B2 | 12/2019 | Kobayashi | |
| 10,601,360 B2 | 3/2020 | Mayfield et al. | |
| 10,767,684 B1* | 9/2020 | Meine | F16B 33/004 |
| 11,015,634 B2* | 5/2021 | Inamori | F16B 5/02 |
| 11,152,889 B1* | 10/2021 | Affentranger, Jr. | H02S 20/23 |
| 11,859,870 B2* | 1/2024 | Patton | E04D 13/00 |
| 12,000,428 B2* | 6/2024 | Feldmann | F16J 15/14 |
| 12,068,715 B2* | 8/2024 | Meine | H02S 20/23 |
| 2008/0052878 A1 | 3/2008 | Lewis et al. | |
| 2011/0278760 A1 | 11/2011 | Lewis et al. | |
| 2018/0062560 A1 | 3/2018 | Stephan et al. | |
| 2018/0106289 A1 | 4/2018 | Ash et al. | |
| 2018/0167022 A1 | 6/2018 | Meine | |
| 2018/0167023 A1 | 6/2018 | Meine | |
| 2018/0367088 A1 | 12/2018 | Tomlinson | |
| 2019/0081587 A1 | 3/2019 | Mayfield et al. | |
| 2022/0345074 A1* | 10/2022 | Neal | F24S 25/65 |
| 2023/0228372 A1* | 7/2023 | Stephan | F24S 25/636 |
| | | | 29/525.01 |
| 2024/0060598 A1* | 2/2024 | Wogan | H02S 20/23 |
| 2024/0235457 A1* | 7/2024 | Menton | H02S 30/10 |

* cited by examiner

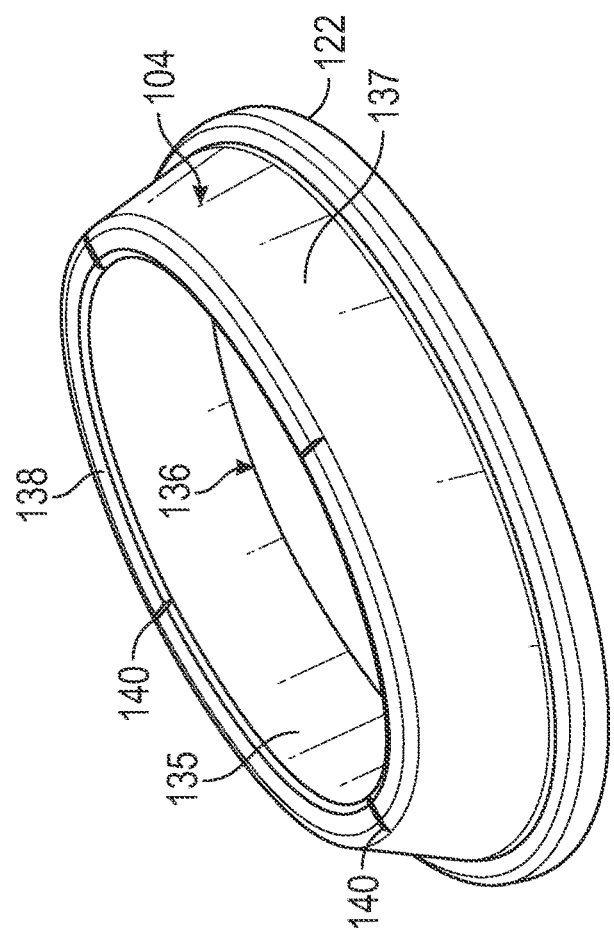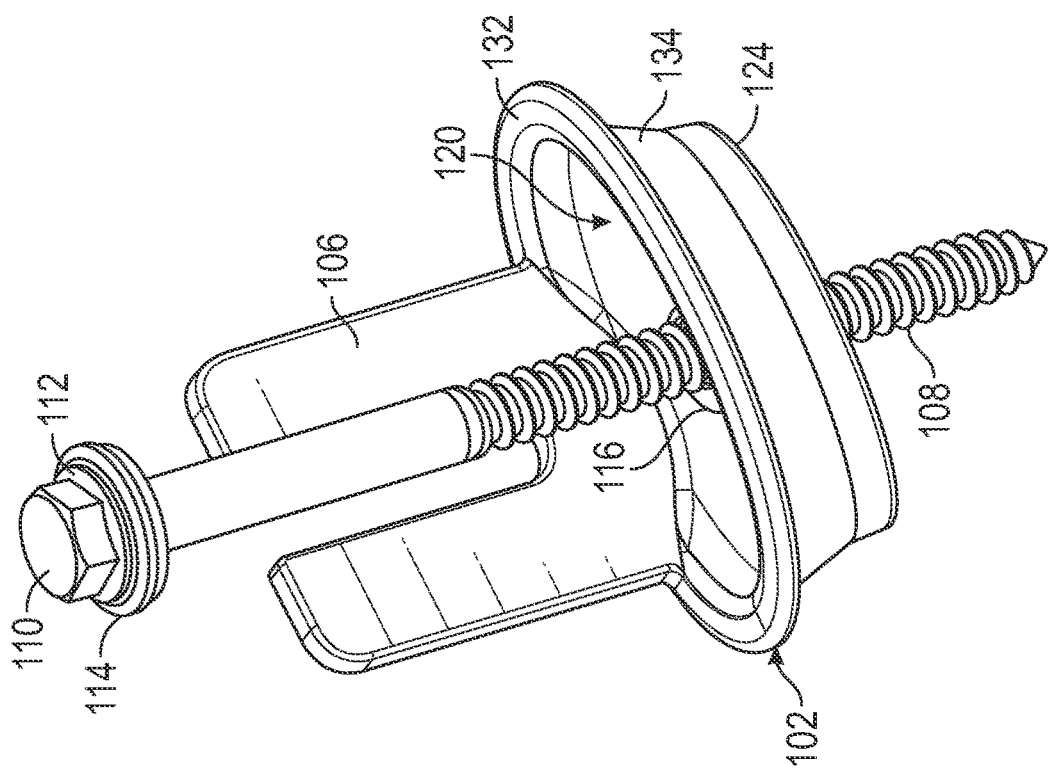

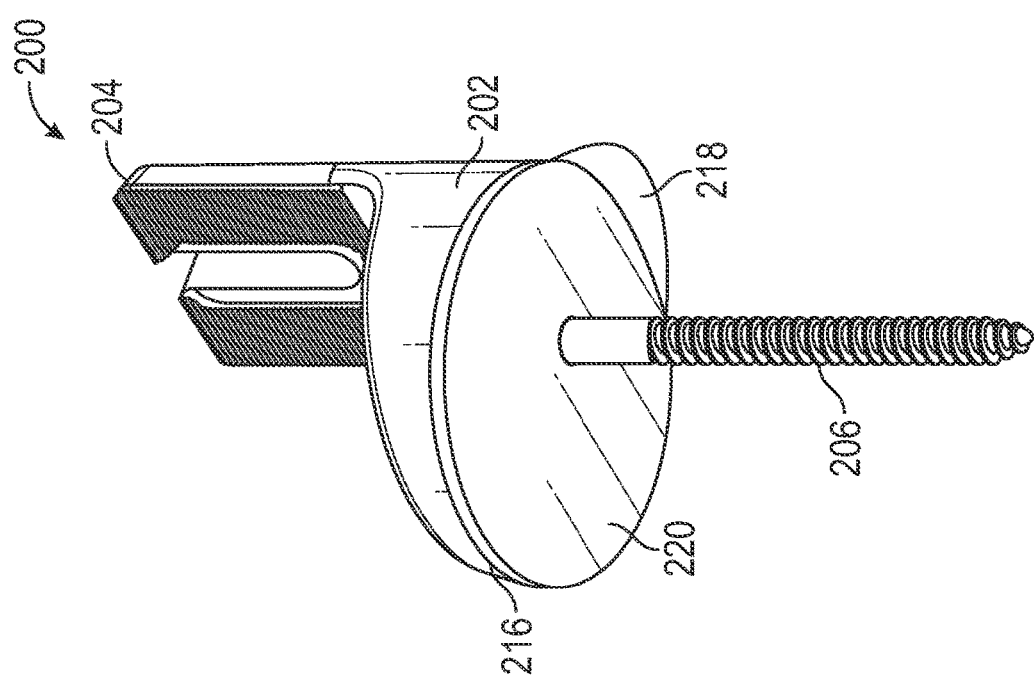
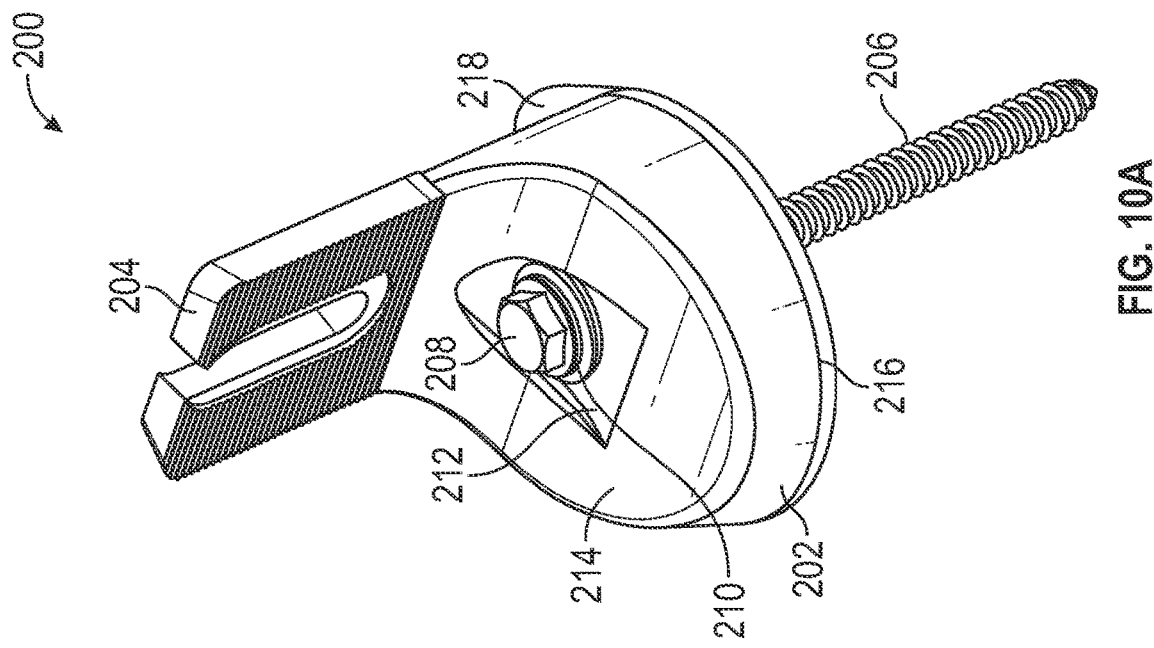

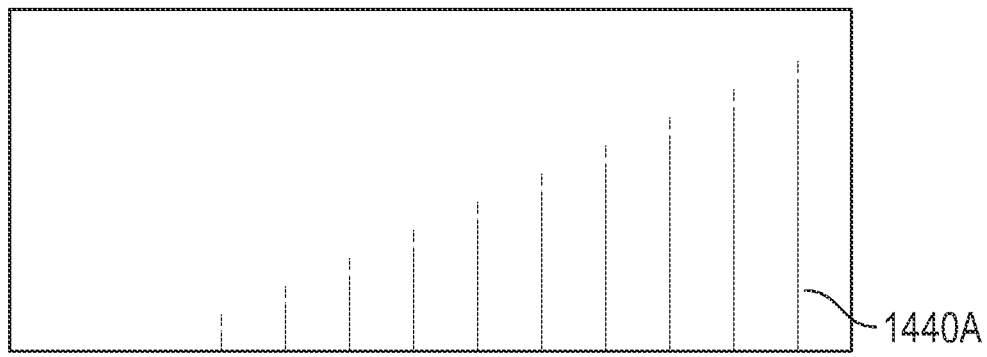
FIG. 77
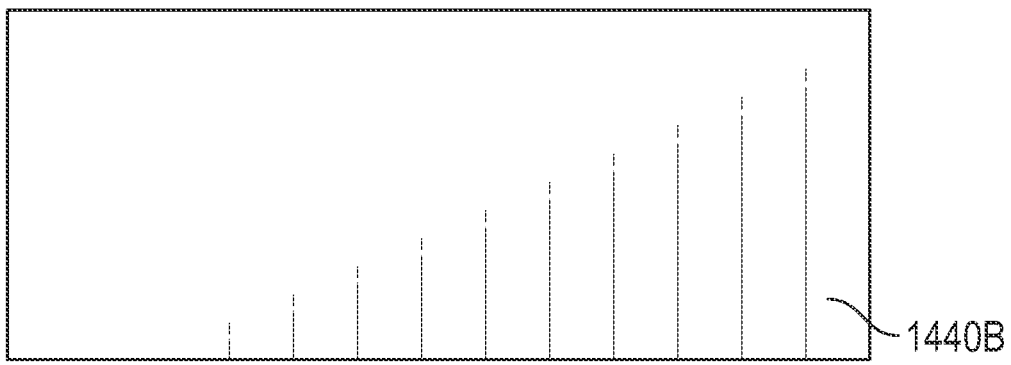
FIG. 78

PHOTOVOLTAIC MOUNT ASSEMBLY FOR A COMPOSITION SHINGLE ROOF

CROSS REFERENCE TO RELATED APPLICATIONS

This application is the United States national phase of International Application No. PCT/US22/28636 filed May 10, 2022, and claims priority to U.S. provisional Patent Application No. 63/186,534 filed on May 10, 2021, the disclosure of which are hereby incorporated by reference in their entireties.

BACKGROUND OF THE INVENTION

Field of the Invention

The present disclosure relates generally to an apparatus for securing a solar panel rail and rail-less support structures to a composition shingle roof.

More specifically, the apparatus provides a novel and improved mount assembly which can be directly mounted to a standard composition shingle roof without the need for a flashing.

Description of Related Art

The installation of solar panel arrays on residential roofs can be arduous and time-consuming. Depending on the array design, the components required to install the array can make the installation process even more difficult. Many of the assembly components require special tools or are generally difficult to install because they are utilized after the solar panel modules are arranged or positioned on their support elements. This is particularly true when the elements must be installed on a standard composition shingle roof that links to a rail guide for supporting the solar panel array.

Typically, support element installation on standard composition shingle roofs utilize a flashing combined with a lag bolt and seal, which together act to effectively seal penetrations in the roof surface and prevent water from leaking into the roof structure. The flashing is generally positioned so that a lag bolt through-hole and seal are positioned over a pre-drilled hole at a rafter location. A support element is then placed on the flashing, the lag bolt is passed through the support module and flashing, and the support module and flashing are mounted to the roof at the location of the pre-drilled hole.

Although flashings are effective at minimizing water infiltration at the support module mounting site, they are also relatively expensive and time-consuming to install. Installing flashing can also require removing nails and/or cutting away a portion of an up-roof shingle in order to interleave the flashing among the shingle, which could potentially create other locations sensitive to water infiltration. In an attempt to avoid these disadvantages, direct-mount or deck-mounted solutions have been developed, which typically utilize a flat-bottomed mounting bracket or foot that is mounted (e.g., via one or more lag bolts or screws) directly into the composition shingle roof deck.

As no flashing is used in direct-mount or deck-mounted solutions, the holes made in the roof by the lag bolt(s) and/or screw(s) must be sealed in some way so as to prevent water infiltration. Accordingly, installers typically use caulk or other sealants to seal these areas during installation. However, there is no way to ensure that the caulk or sealant is fully and properly applied into the holes and around the fasteners, particularly because the direct-mount or deck-mounted mounting bracket or foot itself obscure the area in which the lag bolt(s) and/or screw(s) penetrate the roof. Additionally, with the advent of new interlocking shingles, ensuring that the caulk or sealant has properly been installed become increasingly difficult.

SUMMARY OF THE INVENTION

In view of the foregoing, there exists a need for photovoltaic mounting assemblies that provide reliable and controlled sealing of penetrations in a composition shingle roof, while also improving ease of installation. It is particularly desirable to provide such improved photovoltaic mount assemblies that avoid the use of metal flashings, yet effectively seal any penetrations in the composition shingle roof so as to substantially prevent water infiltration into the roof structure.

Further details and advantages of the present disclosure will be understood from the following detailed description read in conjunction with the accompanying drawings.

Embodiments of the present disclosure are directed to a mount assembly for securing a solar panel rail or rail-less support structure directly to a roof surface, the mount assembly comprising: a base comprising a top surface and a bottom surface; a guide extending upwards from the top portion of the base, wherein the guide forms a member extending from opposing sides of the base and an aperture formed through the member; at least one through-hole portion, wherein the through-hole portion is formed within the top portion of the base and passes through a bottom surface of the top portion; and a fastener, wherein the fastener is sized to pass through the through-hole portion.

In some embodiments, the bottom portion further comprises an open space formed between the interior angled sidewall.

In some embodiments, the mount assembly comprising a covering which is fixably attached to the top surface.

In some embodiments, the bottom surface of the base is configured to be fixed to a seal pad.

In some embodiments, the top portion further comprises a lip extending at least partially around the exterior angled sidewall, and wherein the lip of the top portion is configured to withhold a compression pad.

In some embodiments, a mount assembly for securing a solar panel rail or rail-less support structure directly to a roof surface, comprises: a base having a top surface and a bottom surface; a guide extending upwards from the top surface of the base, wherein the guide forms a pair of members extending from opposing sides of the base and an aperture between the pair of members; a cavity formed within the base, wherein the cavity has an open end and a bottom cavity surface, wherein the open end is open relative to the top surface of the base; a through-hole, wherein the through-hole passes from the bottom cavity surface to the bottom surface of the base; a fastener, wherein the fastener is sized to pass through the through-hole; and a piston member, wherein the piston member is configured to surround a portion of the fastener, and further wherein the piston member is sized to have a volume that is equal to or greater than a volume of the cavity formed within the base.

In some embodiments, the bottom surface of the base comprises a curved portion.

In some embodiments, the mount assembly further comprises an outer rim, wherein outer rim surrounds the concave portion.

In some embodiments, the mount assembly further comprises a gasket member, wherein the gasket member is defined by the outer rim of the bottom surface of the base.

In some embodiments, the bottom surface of the base comprises a first portion and a second portion, and further wherein the second portion is inset relative to the first portion.

In some embodiments, the mount assembly further comprises a gasket member, wherein the gasket member is at least partially surrounds the first portion of the bottom surface of the base.

In some embodiments, the through-hole passes from the bottom cavity surface to the second portion of the bottom surface of the base.

In some embodiments, the fastener is a threaded lag bolt.

In some embodiments, a mount assembly for securing a solar panel rail or rail-less support structure directly to a roof surface, comprises: a two-part base comprising a top portion and a bottom portion, wherein the top portion is nestable within the bottom portion; a guide extending upwards from the top portion of the base, wherein the guide forms a pair of members extending from opposing sides of the base and an aperture between the pair of members; a through-hole portion, wherein the through-hole portion is formed within the top portion of the base and passes through a bottom surface of the top portion; and a fastener, wherein the fastener is sized to pass through the through-hole portion.

In some embodiments, the bottom portion of the base comprises an interior angled sidewall defining an opening, an exterior sidewall, a top rim, and a bottom rim.

In some embodiments, the top portion of the base comprises an exterior angled sidewall, and wherein a shape and dimension of the exterior angled sidewall of the top portion matches a shape and dimension of the interior angled sidewall of the bottom portion.

In some embodiments, the bottom portion further comprises an open space formed between the interior angled sidewall and the exterior sidewall.

In some embodiments, the top portion further comprises a lip extending at least partially around the exterior angled sidewall, and wherein the lip of the top portion is configured to contact the top rim of the bottom portion when the top portion and the bottom portion are in a fully nested configuration.

In some embodiments, the mount assembly further comprises a gasket member, wherein the gasket member is at least partially defined by the bottom rim of the bottom portion of the base.

In some embodiments, the fastener is a threaded lag bolt.

In some embodiments, the mounting device comprises: a base having an internal cavity bound by an inner surface of the base, the base extending from a bottom perimeter to a top, and the base having an open bottom in communication with the internal cavity; an upper portion above the base, wherein the upper portion extends from the top of the base and includes a vertical member defining a face above the base, wherein the face has a width; an aperture formed in the face and extending through the upper portion transverse to the width of the face; and the open bottom of the base has a dimension parallel to the width which is narrower than at least a portion of the width of the face.

In some embodiments, the mounting device comprises: a base having a top, at least one opening at the top for receiving a bolt, opposed sides, an internal cavity, and an open bottom in communication with the internal cavity; an upper portion extending upward from the top and including a vertical member, the upper portion further including a face, an aperture in the face extending through the vertical member in a direction transverse to the face, and opposed minor sides flanking the face, wherein the minor sides are wider than the sides of the base; and a seal pad disposed within the internal cavity of the base.

In some embodiments, the mounting device comprises: a base having a top, a bottom, an opening at the top for receiving a bolt, and an internal cavity; an upper portion extending upward from the top of the base, the upper portion including a face and an aperture in the face extending through the vertical member in a direction transverse to the face; and opposed first and second members each extending upwardly from the base to the face of the upper portion; wherein the first and second members flank the opening at the top of the base.

In some embodiments, the mounting device comprises: a base and an upper portion; the upper portion includes a vertical member configured to receive a mounting rail, opposed major faces, and opposed minor sides between the major faces; the base has a top, a bottom, and an upstanding sidewall extending from a bottom perimeter at the bottom of the base to the top, wherein the bottom perimeter defines an open bottom in communication with an internal cavity bound by an inner surface of the base, and the top has a seat configured to receive and seat a head of a bolt when the bolt is applied through the base; the upstanding sidewall extends upward above the top of the base to the upper portion; the minor sides of the vertical member of the upper portion are each outboard of the inner surface bounding the internal cavity; and an opening formed through the base to align the bolt when applied to the opening through the internal cavity and the open bottom.

BRIEF DESCRIPTION OF THE DRAWINGS

FIG. 1b is a bottom isometric view of the photovoltaic mount assembly of FIG. 1a;

FIG. 2 is a cross-sectional view of the photovoltaic mount assembly of FIG. 1a;

FIG. 3a is an isometric view of the fastener and piston assembly for the photovoltaic mount assembly of FIG. 1a;

FIG. 3b is an exploded view of the fastener and piston assembly of FIG. 3a;

FIG. 4b is a bottom isometric view of the photovoltaic mount assembly of FIG. 4a;

FIG. 5 is a cross-sectional view of the photovoltaic mount assembly of FIG. 4a;

FIG. 6 is an exploded view of the photovoltaic mount assembly of FIG. 4a;

FIG. 7b is a bottom isometric view of the photovoltaic mount assembly of FIG. 7a;

FIG. 8a is a top isometric view of a top portion and fastener assembly of the photovoltaic mount assembly of FIG. 8a;

FIG. 8b is a top isometric view of a bottom portion of the photovoltaic mount assembly of FIG. 8a;

FIG. 8c is a top isometric view of a gasket of the photovoltaic mount assembly of FIG. 8a;

FIG. 9 is a cross-sectional view of the photovoltaic mount assembly of FIG. 8a;

FIG. 10a is a top isometric view of a photovoltaic mount assembly in accordance with another aspect of the present disclosure;

FIG. 10b is a bottom isometric view of the photovoltaic mount assembly of FIG. 10a;

FIG. 11a is a partial exploded view of the photovoltaic mount assembly of FIG. 10a FIG. 11b is a top plan view of a mounting foot of the photovoltaic mount assembly of FIG. 10a; and FIG. 12 is a cross-sectional view of the photovoltaic mount assembly of FIG. 10a.

FIG. 77 is a top and side view of a compression pad;

FIG. 78 is a top and side view of a seal pad;

FIG. 83b is a side view of the rail attachment of FIG. 83a;

FIG. 83c is a top view of the rail attachment of FIG. 83a;

DESCRIPTION OF THE INVENTION

Figure 1A:
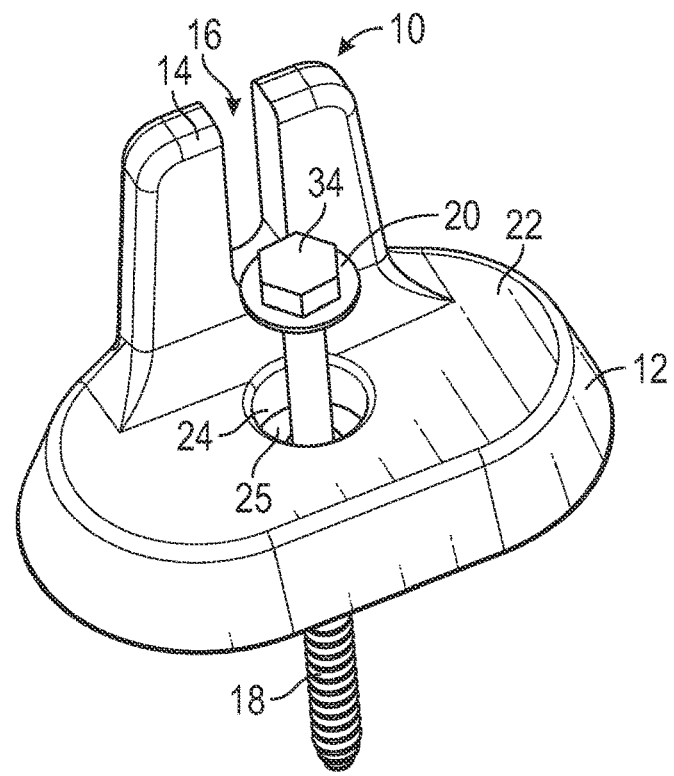
FIG. 1a is a top isometric view of a photovoltaic mount assembly in accordance with an aspect of the present disclosure.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIGS. 1-3b, a flashing-free photovoltaic mount assembly 10 in accordance with an aspect of the present disclosure is illustrated. Mount assembly 10 includes a base 12. In the embodiment shown in FIGS. 1-2, base 12 is formed with a substantially oval-shaped footprint. However, it is to be understood that base 12 is not limited to such a shape, and may be, e.g., circular, triangular, square, etc. The base 12 may be formed of any material of appropriate strength such as, e.g., aluminum, steel, plastic, polymer, etc.

Extending upward from the base 12 is a substantially U-shaped guide 14 that forms a pair of members extending from opposing sides of the base 12, which in turn forms an aperture 16 therebetween. While not shown in FIGS. 1-2, it is to be understood that aperture 16 is sized and configured to accommodate a fastener (e.g., a nut and bolt assembly) couplable to a rail mount such that a photovoltaic rail guide or rail with a mounting means can be selectively coupled to the mount assembly 10. A mounting means may include any bracket or combination of any intermediary structure capable of mounting to the mount assembly 10. The aperture 16 is sized so as to allow for vertical height adjustment of the rail mount fastener along the guide 14. It is noted, as exemplified in other embodiments, that the aperture 16 may be closed at the top of guide 14. Additionally, while also not shown in FIGS. 1-2, it is to be understood that one or both of the pair of members of the guide 14 may include a plurality of horizontal ridges extending along an inner and/or an outer face thereof, with such horizontal ridges acting to retain the fastener more securely when tightened against the guide 14.

The base 12 further comprises a top surface 22 and a bottom surface 26. As will be described in further detail below, bottom surface 26 is configured with a concavity from an outer rim or containment flange 30 toward a central through-hole 28. In this way, the concavity of bottom surface 26 provides for an open space within the outer rim or containment flange 30, above a mounting surface (i.e., above a composition shingle), and below the base 12 into which a sealant can flow during installation of the mount assembly 10 directly onto a roof surface. In some embodiments, the outer rim 30 may include a gasket or other sealing member formed of, e.g., foam, rubber, butyl, sealant tape, mastic, etc. The containment flange 30 may aid in the control of the applied pressure by acting as a stop along the perimeter when the sealant is applied.

Figure 1B:
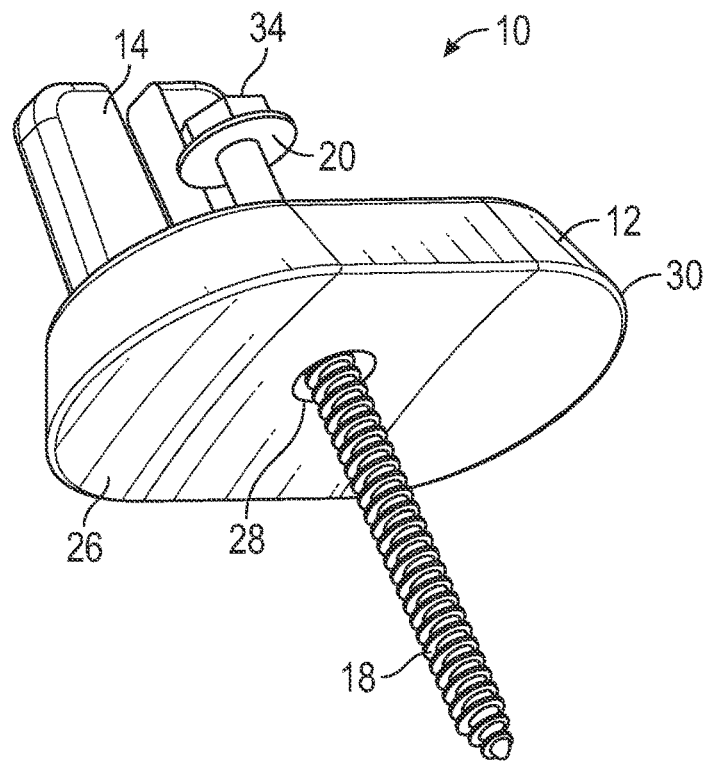
Figure 2:
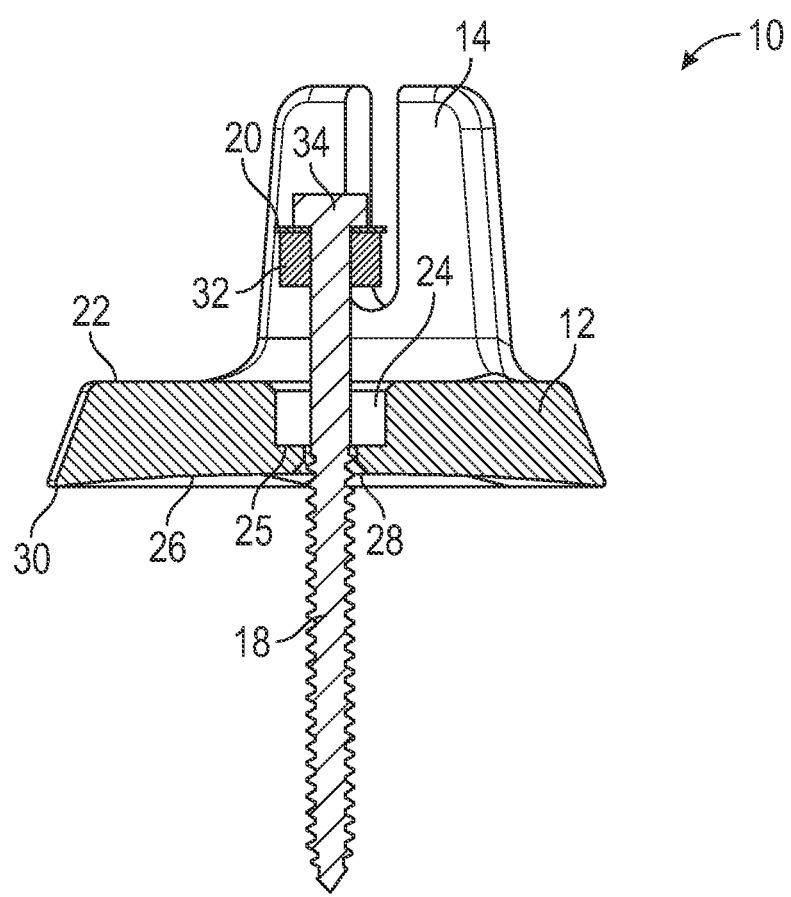

Referring to FIGS. 1-2, a cavity 24 is formed within the base 12, with the cavity 24 being open at a location substantially flush with the top surface 22 of base 12 and having a bottom portion 25 formed therein. A central through-hole 28 passes from the bottom portion 25 of the cavity 24 to the bottom surface 26 of the base 12, thereby providing a passage between the cavity 24 and the open space provided by the concavity of bottom surface 26.

As is shown in FIGS. 1-3b, the mount assembly 10 further includes a fastener 18, a washer 20, and a piston member 32.

The fastener 18 may be any appropriate fastener suitable for roof-mount applications such as, e.g., a threaded lag bolt, a threaded screw, a nail, a stake, etc. In the embodiment shown in FIGS. 1-3*b*, fastener 18 is a threaded lag bolt having a hexagonal head 34. However, it is to be understood that alternative driving head shapes and/or configurations could be utilized in accordance with the present disclosure. The fastener 18 is sized so as to pass through the central through-hole 28 of the mount assembly 10. While FIGS. 1-2 only illustrate a single fastener 18, cavity 24, and central through-hole 28, it is to be understood that the mount assembly in accordance with other embodiments could incorporate more than one fastener 18, cavity 24, and/or central through-hole 28.

Figure 3A:
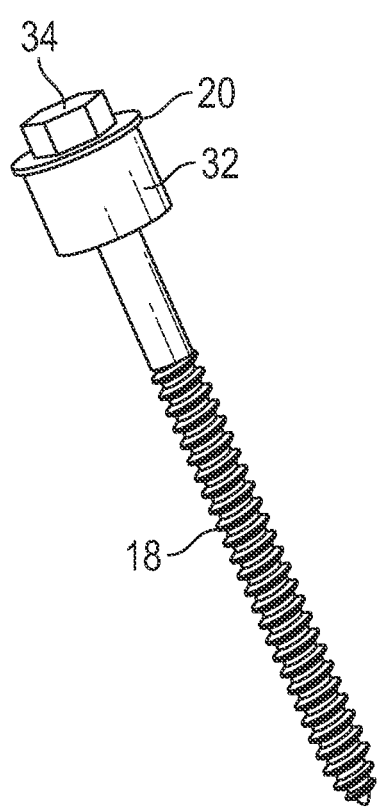
Figure 3B:
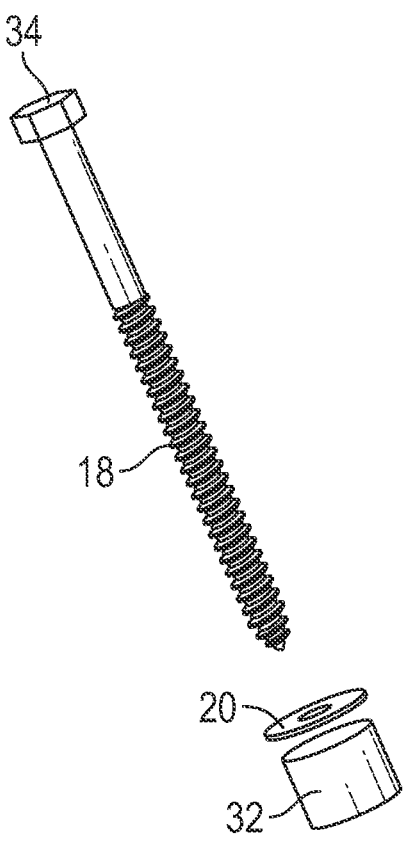

Referring to FIGS. 2-3*b*, the piston member 32 is configured to surround the fastener 18 adjacent the hexagonal head 34 and washer 20. The piston member 32 may be any shape, but is preferably substantially tubular. The piston member 32 may be formed of any appropriate material such as, e.g., rubber, plastic, metal, etc., and is sized such that the overall volume of piston member 32 is substantially equal to or greater than the overall volume of the cavity 24. In this way, when the fastener 18 is driven into a roof surface so as to fixedly attach the base 12 to the roof surface, the piston member 32 gradually fills the cavity 24 until a bottom surface of the piston member 32 contacts the bottom portion 25 of the cavity 24 and/or the washer 20 contacts the top surface 22 of the base 12 so as to restrict further driving of the fastener 18 into the roof surface.

During installation of the mount assembly 10 onto a roof surface, the base 12 is generally positioned directly on a surface (i.e., without a flashing). The surface may be a roof surface like, but not limited to, a low slope roofing membrane, BUR, rolled roofing, TPO, EPDM, or metal roofs or composition shingle roofing. The mount assembly 10 may mount or be used to support any number of structures or devices like, but not limited to, a pool heating device, a domestic water heater, TV dishes, and other devices that may benefit from installation of the mount assembly 10. In some embodiments, the central through-hole 28 of base 12 is positioned directly over a pre-drilled pilot hole and/or a rafter location in the roof. Once the base 12 is in a desired position, the installer then injects, pours, or otherwise applies a sealant (not shown) into the cavity 24 of the base 12. The sealant may be placed into the cavity 24 either before insertion of the fastener 18 into the central through-hole 28 and/or the roof surface, or after insertion of a portion of the fastener 18 into the central through-hole 28 and/or the roof surface (i.e., at the position of fastener 18 shown in FIG. 2). The sealant may be any appropriate water-resistant sealant such as, e.g., a liquid sealant, a foam sealant, etc. Furthermore, in some embodiments, the volume of sealant injected into the cavity may be more, equal, or less than the volume of the cavity 24. The volume can be the same as the area underneath.

After the sealant is injected into cavity 24, the installer drives the fastener 18 into the roof surface, thereby drawing the head 34, washer 20, and piston member 32 closer to the cavity 24. As the fastener 18 is further driven into the roof surface, the piston member 32 eventually enters the cavity 24, thereby compressing the sealant within cavity 24. Due to the diameter of the piston member 32 being equal to (or greater than) the diameter of the cavity 24, the compressed sealant is not forced through the opening of cavity 24 adjacent the top surface 22 and is instead forced through the central through-hole 28 and into the open space created by the concavity of the bottom surface 26 of base 12. Additionally and/or alternatively, while not shown in FIGS. 1-2, it is to be understood that base 12 could incorporate one or more relief passages or holes so as to allow any excess volume of sealant to escape from below the base 12, thereby ensuring a flat and uniform contact between the outer rim 30 and the roof surface.

Thus, as the piston member 32 compresses all or most of the sealant out of the cavity 24, the sealant substantially fills the open space below base 12, thereby forming a substantially water-tight seal around the fastener 18 in order to prevent water infiltration into the roof surface at the location of the fastener 18. Due to the sealant simply being injected or poured into the top-facing opening of the cavity 24 after placement of the base 12 but before driving of the fastener 18 into the roof surface, the complexity and potential mess found in prior art direct-mount or deck-mounted solutions may be substantially avoided.

Figure 4A:
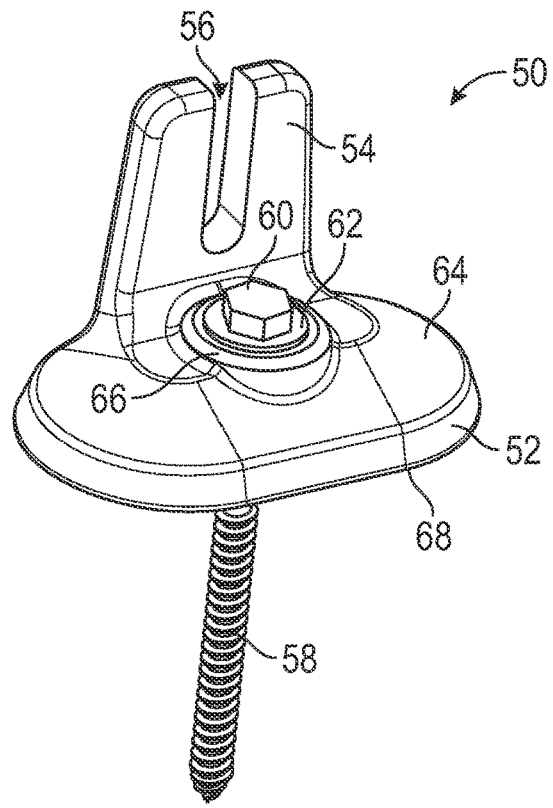
FIG. 4a is a top isometric view of a photovoltaic mount assembly in accordance with another aspect of the present disclosure.
Figure 4B:
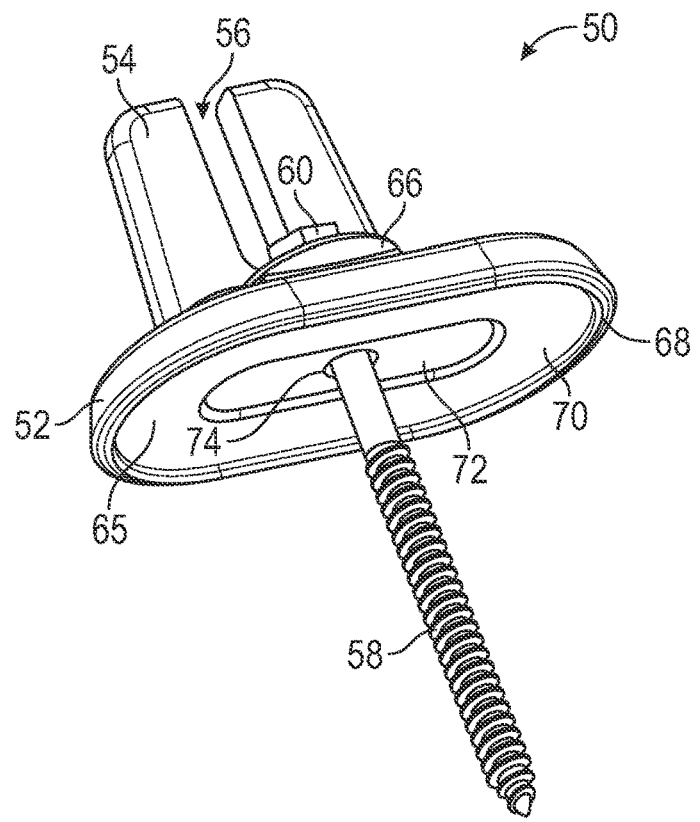
Figure 5:
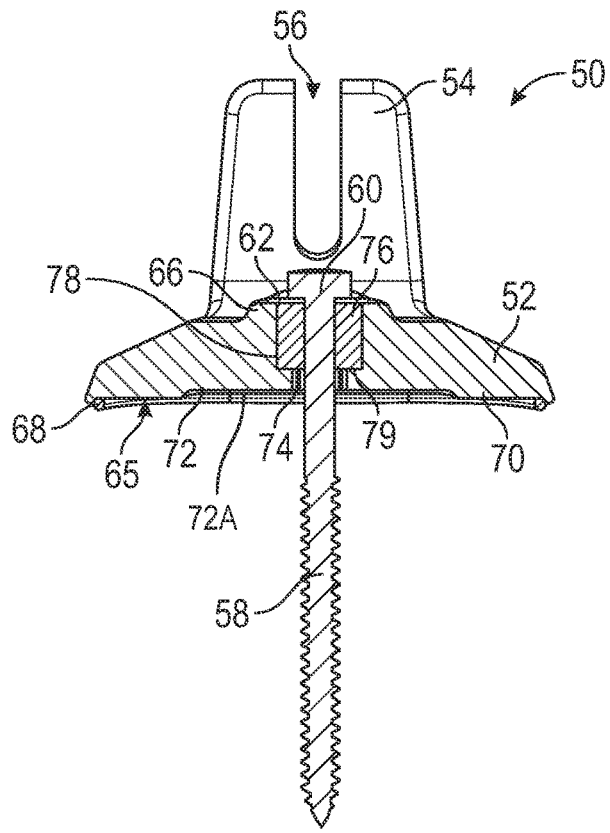
Figure 6:
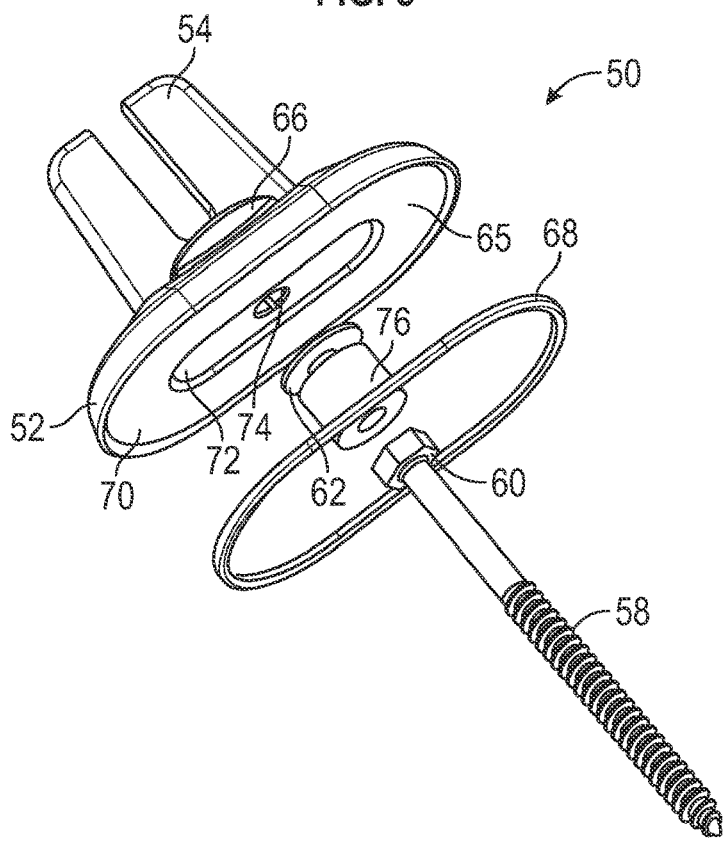

Next, referring to FIGS. 4-6, a flashing-free mount assembly 50 in accordance with another aspect of the present disclosure is illustrated. Similar to mount assembly 10 described above with respect to FIGS. 1-2*b*, mount assembly 50 includes a base 52 formed with a substantially oval-shaped footprint. However, it is to be understood that base 52 is not limited to such a shape, and may be, e.g., circular, triangular, square, etc. The base 52 may be formed of any material of appropriate strength such as, e.g., aluminum, steel, plastic, polymer, etc.

Extending upward from the base 52 is a substantially U-shaped guide 54 that forms a pair of members extending from opposing sides of the base 52, which in turn forms an aperture 56 therebetween. Aperture 56 is sized and configured to accommodate a fastener (e.g., a nut and bolt assembly) couplable to a rail mount such that a photovoltaic rail guide can be selectively coupled to the mount assembly 50. Additionally, it is to be understood that one or both of the pair of members of the guide 54 may include a plurality of horizontal ridges (not shown) extending along an inner and/or an outer face thereof, with such horizontal ridges acting to retain the fastener more securely when tightened against the guide 54 and may help to retain the rail on rail attachment bracket. The pair of members of the guide 54 may connect at the top of the guide 54.

The base 52 includes a top surface 64 and a bottom surface 65. As is shown in FIGS. 4-6, the bottom surface 65 includes a first portion 70 and a second portion 72, with the second portion 72 being inset relative to the first portion 70. In this way, second portion 72 is configured to create an open space surrounding a central through-hole 74 formed in the base 52. As will be described in further detail below, the open space created by second portion 72 provides a space into which sealant can flow during installation of the mount assembly 50 directly onto a roof surface (i.e., directly onto a composition shingle roof surface). In some embodiments, a gasket member 68 may surround the first portion 70 of bottom surface 65, thereby providing an improved seal between the bottom surface 65 and the roof surface. The gasket member 68 may be formed of any appropriate material including, e.g., foam, rubber, butyl, sealant tape, mastic, etc.

Referring to FIGS. 4-6, an upstanding platform 66 extends from the top surface 64 of base 52, with the platform 66 forming a substantially flat surface at a central portion of base 52. As is shown in FIG. 4*b*, a cavity 78 is formed below platform 66 and within the base 12, with the cavity 78 being open at a location substantially flush with the platform 66 and having a bottom portion 79 formed therein. The central through-hole 74 passes from the bottom portion 79 of the cavity 78 to the second portion 72 of bottom surface 65, thereby providing a passage between the cavity 78 and the open space 72A provided second portion 72. The through-hole 74 may not be central to the bottom portion 79.

The mount assembly 50 further includes a fastener 58, a washer 62, and a piston member 76. The fastener 58 may be any appropriate fastener suitable for roof-mount applications such as, e.g., a threaded lag bolt, a threaded screw, a nail, a stake, etc. In the embodiment shown in FIGS. 4-6, fastener 58 is a threaded lag bolt having a hexagonal head 60. However, it is to be understood that alternative driving head shapes and/or configurations could be utilized in accordance with the present disclosure. The fastener 58 is sized so as to pass through the central through-hole 74 of the mount assembly 50. While FIGS. 4-6 only illustrate a single fastener 58, cavity 78, and central through-hole 74, it is to be understood that the mount assembly in accordance with other embodiments could incorporate more than one fastener 58, cavity 78, and/or central through-hole 74.

Referring again to FIGS. 5-6, the piston member 76 is configured to surround the fastener 58 adjacent the hexagonal head 60 and washer 62. The piston member 76 may be any shape, but is preferably substantially cylindrical. The piston member 76 may be formed of any appropriate material such as, e.g., rubber, plastic, metal, etc., and is sized such that the overall volume of piston member 76 is substantially equal to (or greater than) the overall volume of the cavity 78. In this way, when the fastener 58 is driven into a roof surface so as to fixedly attach the base 52 to the roof surface, the piston member 76 gradually fills the cavity 78 until a bottom surface of the piston member 78 contacts the bottom portion 79 of the cavity 78 and/or the washer 62 contacts the platform 66 so as to restrict further driving of the fastener 58 into the roof surface.

During installation of the mount assembly 50 onto a roof surface, the base 52 is generally positioned directly on a shingled surface (i.e., without a flashing). In some embodiments, the central through-hole 74 of base 52 may be positioned directly over a pre-drilled pilot hole and/or a rafter location in the roof. Once the base 52 is in a desired position, the installer then injects, pours, or otherwise applies a sealant (not shown) into the cavity 78 of the base 52. Alternatively, the installer may pre-fil the cavity 78 of the base 52 before the base 52 is in a desired position. The sealant may be placed into the cavity 78 either before insertion of the fastener 58 into the central through-hole 74 and/or the roof surface, or after insertion of a portion of the fastener 58 into the central through-hole 74 and/or the roof surface. The sealant may be any appropriate water-resistant sealant such as, e.g., a liquid or fluid sealant, a foam sealant, etc. Furthermore, in some embodiments, the volume of sealant injected into the cavity is substantially equal to the volume of the cavity 78. However, in other embodiments, the volume of sealant may be less or greater than the volume of cavity 78.

After the sealant is injected into cavity 78, the installer drives the fastener 58 into the roof surface, thereby drawing the head 60, washer 62, and piston member 76 closer to the cavity 78. As the fastener 58 is further driven into the roof surface, the piston member 76 eventually enters the cavity 78, thereby compressing the sealant within cavity 78. Due to the outside diameter of the piston member 76 being equal to (or greater than) the inside diameter of the cavity 78, the compressed sealant is prevented from exiting the cavity 78 through the opening of cavity 78 adjacent the platform 66, but is instead forced through the central through-hole 74 and into the open space 72A created by the inset second portion 72 of bottom surface 65. Additionally and/or alternatively, while not shown in FIGS. 4-6, it is to be understood that base 52 could incorporate one or more relief passages or holes so as to allow any excess volume of sealant to escape from below the base 52, thereby ensuring a flat and uniform contact between roof surface and the gasket 68 and/or the first portion 70 of the bottom surface 65.

As noted above, the volume of the cavity 78 and the volume of the open space created by the inset second portion 72 of bottom surface 65 may be substantially equal. Thus, as the piston member 76 compresses all or most of the sealant out of the cavity 78, the sealant substantially fills the open space formed by second portion 72, thereby forming a substantially water-tight seal around the fastener 58 in order to prevent water infiltration into the roof surface at the location of the fastener 58. Due to the sealant simply being injected or poured into the top-facing opening of the cavity 78 after placement of the base 52 but before driving of the fastener 58 into the roof surface, the complexity and potential mess found in prior art direct-mount or deck-mounted solutions may be substantially avoided.

The oval shape of the open space 72A is not critical and can be any shape but there is a benefit to having a shape that is longer in one direction than the other. In the preferred embodiment shown, the longer dimension is orientated such that in the common installation scenario with the rails running horizontally across the roof, as opposed to up and down the roof slope, the longer dimension of the open space 72A is oriented perpendicularly to the rafter. This allows for a wider water sealed area and is sized to cover holes in the fastening surface. The longer width and shorter height allows coverage of potential missed holes while minimizing increased materials and costs.

Figure 7A:
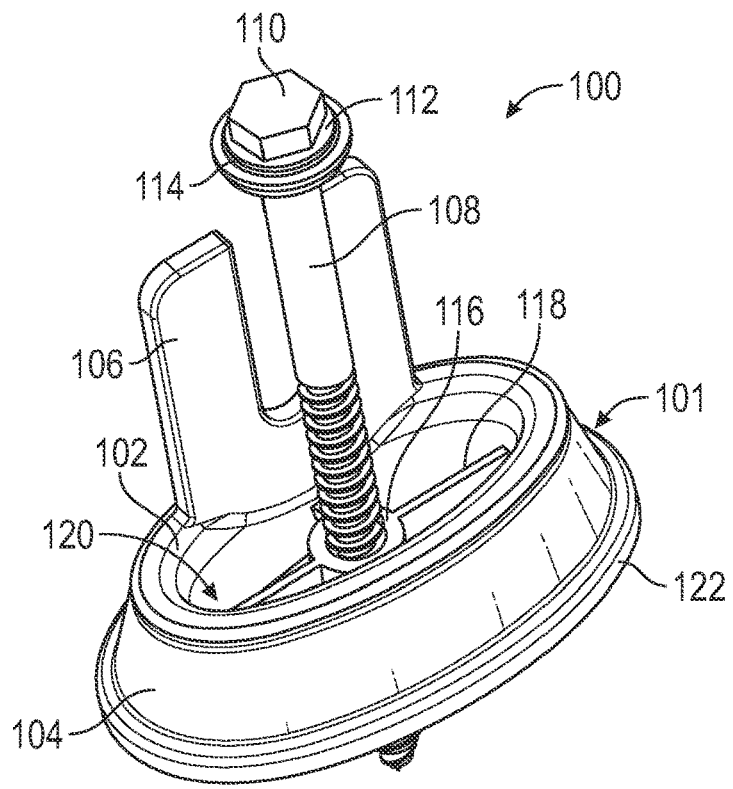
FIG. 7a is a top isometric view of a photovoltaic mount assembly in accordance with another aspect of the present disclosure.
Figure 7B:
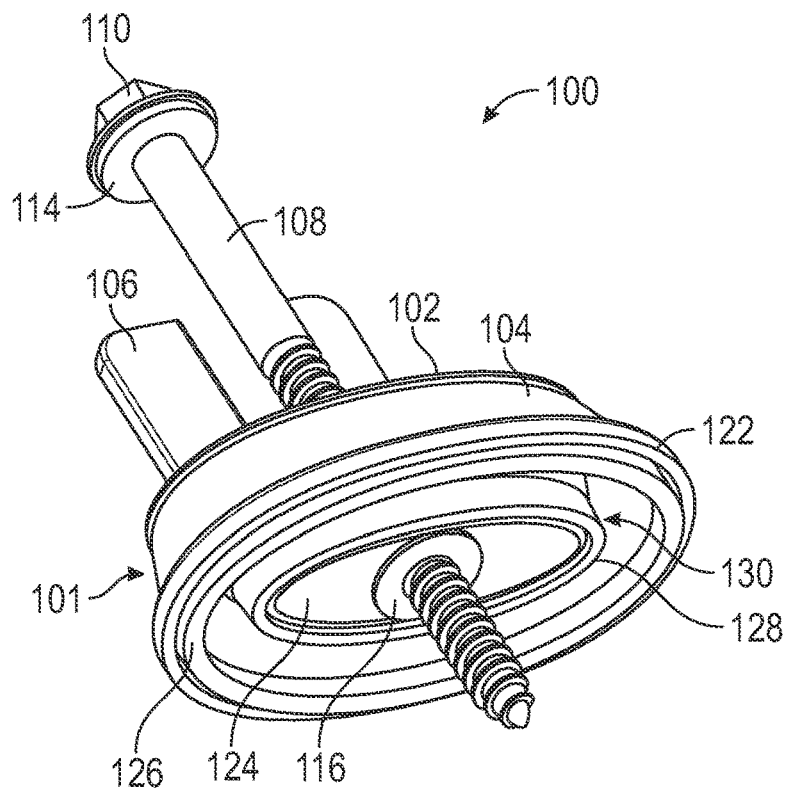
Figure 9:
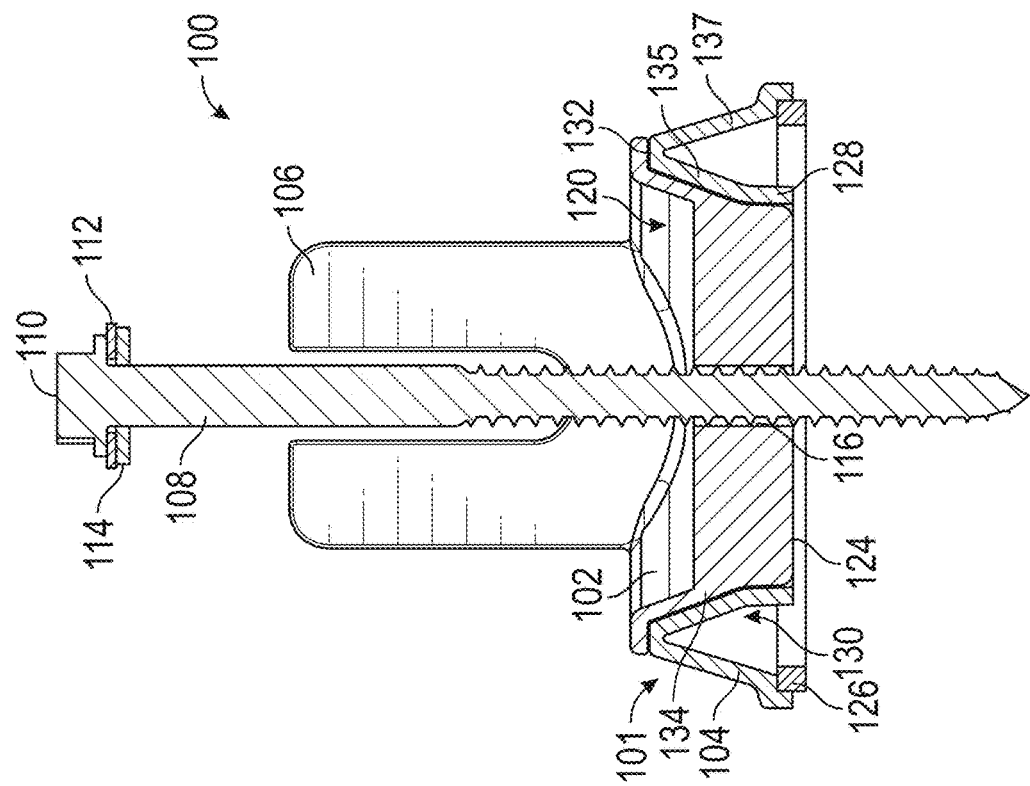
Figure 8C:
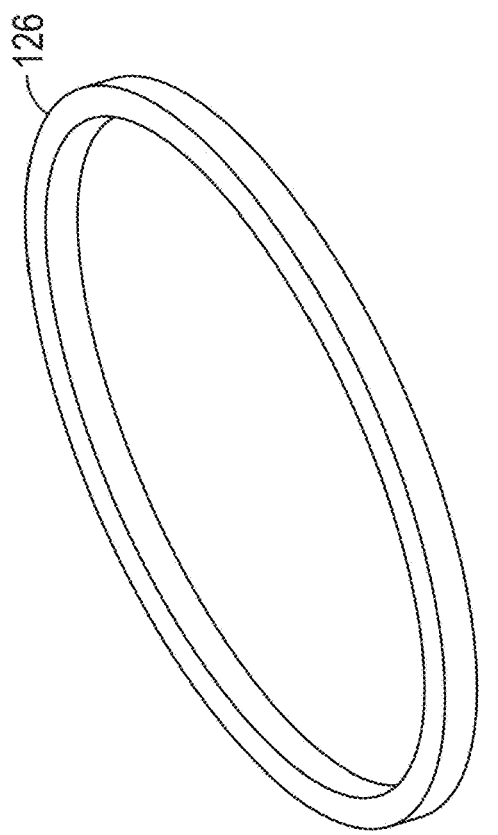

Next, referring to FIGS. 7-9, a flashing-free photovoltaic mount assembly 100 in accordance with another aspect of the present disclosure is illustrated. Mount assembly 100 includes a two-part base 101 comprising a top portion 102 and a bottom portion 104, wherein the top portion 102 is nestable within or insertable relative to the bottom portion 104. In the embodiment shown in FIGS. 7-9, the base 101, consisting of the top portion 102 and bottom portion 104, is formed with a substantially oval-shaped footprint to form a bottom surface. The bottom surface may include portions that may be flat or curved. However, it is to be understood that base 101 is not limited to such a shape, and may be, e.g., circular, triangular, square, etc. The base 101 may be formed of any material of appropriate strength such as, e.g., aluminum, steel, plastic, polymer, etc. Furthermore, the respective top portion 102 and bottom portion 104 of base 101 may be formed of the same or different materials.

Extending upward from the top portion 102 of base 101 is a substantially U-shaped guide 106 that forms a pair of members extending from opposing sides of the base 101, which in turn forms an aperture therebetween. The aperture is sized and configured to accommodate a fastener (e.g., a nut and bolt assembly) couplable to a rail mount, or any device with a mounting means, such that a photovoltaic rail guide can be selectively coupled to the mount assembly 100. A mounting means may include any bracket structured capable of mounting a conduit or clamp to the mount assembly 100. Additionally, it is to be understood that one or both of the pair of members of the guide 106 may include a plurality of horizontal ridges (not shown) extending along an inner and/or an outer face thereof, with such horizontal ridges acting to retain the fastener more securely when tightened against the guide 106.

Referring to FIGS. 7 and 8, top portion 102 of base 101 includes a substantially bowl-shaped opening 120 defined by an angled sidewall 134 and a bottom surface 124, with a lip portion 132 extending at least partially around a top portion of the sidewall 134. A central through-hole portion 116 extends within the bowl-shaped opening 120 of top portion 102, with the central through-hole portion 116 defining a through-hole which passes through the bottom surface 124, as illustrated in FIG. 7b. The through-hole portion 116 may not be central to the bottom surface 124. In some embodiments, one or more reinforcement ribs 118 may extend from the sidewall 134 to the central through-hole portion 116. The one or more reinforcement ribs 118 are configured provide structural support for the central through-hole portion 116 within the bowl-shaped opening 120. However, in some embodiments, it is to be understood that the top portion 102 need not include the bowl-shaped opening 120 and could instead include a closed top surface with a through-hole formed therein. Further, the opening 120 may be any shaped. In such an alternative embodiment, the one or more reinforcement ribs 118 may be omitted.

Referring to FIGS. 7a, 7b, 8b, and 9, the bottom portion 104 of base 101 includes an interior angled sidewall 135 defining an opening 136, an exterior sidewall 137, a top rim 138, and a bottom rim 122. It is to be understood that the shape and dimensions of interior angled sidewall 135 of bottom portion 104 are substantially the same as (or slightly larger than) the shape and dimensions of the angled sidewall 134 of the top portion 102, which enables the top portion 102 to tightly nest within the bottom portion 104, as shown in FIG. 9. The interior angled sidewall 135 and exterior sidewall 137 may form a curved portion or concaved portion of the bottom surface. Furthermore, as is shown in FIGS. 7b and 9, the area between the exterior sidewall 137 and the interior angled sidewall 135 of bottom portion 104 creates an open space 130.

Additionally, in some embodiments, a gasket member 126 is provided, with gasket member 126 being couplable to at least a portion of the bottom rim 122 of the bottom portion 104. The gasket member 126 may at least partially surround the first portion or top portion 102 of the bottom surface of the base. The gasket member 126 may provide for an improved seal between the bottom portion 104 and the roof surface, and the gasket member 126 may be formed of any appropriate material including, e.g., foam, rubber, butyl, sealant tape, mastic, etc.

The mount assembly 100 further includes a fastener 108, a first washer 112, and a second washer 114. The fastener 108 may be any appropriate fastener suitable for roof-mount applications such as, e.g., a threaded lag bolt, a threaded screw, a nail, a stake, etc. In the embodiment shown in FIGS. 7a-8a and 9, fastener 108 is a threaded lag bolt having a hexagonal head 110. However, it is to be understood that alternative driving head shapes and/or configurations could be utilized in accordance with the present disclosure. The first washer 112 and the second washer 114 may be formed of any appropriate material, and they may be the same or different materials. For example, in one embodiment, first washer 112 may be formed of a rigid material (e.g., metal), while the second washer 114 may be formed of a compressible polymeric material (e.g., plastic or rubber). In this way, washers 112 and 114 may act as a sealing washer. The washer 112, 114 may be a two-part sealing washer comprised of a rigid portion and a compressible polymeric portion.

The fastener 108 is sized so as to pass through the central through-hole portion 116 of the top portion 102. While only a single fastener 108 and through-hole portion 116 are illustrated, it is to be understood that the mount assembly in accordance with other embodiments could incorporate more than one fastener and/or through-hole.

During installation of the mount assembly 100 onto a roof surface, the bottom portion 104 of base 101 is generally positioned directly on a surface (i.e., without a flashing). The surface may be a roof surface like, but not limited to, a low slope roofing membrane, BUR, rolled roofing, TPO, EPDM, or metal roofs. The mount assembly 100 may be used to mount or support any number of structures or devices like, but not limited to, a pool heating device, a domestic water heater, TV dishes, and other devices that may benefit from installation of the mount assembly 100. In some embodiments, bottom portion 104 is positioned directly over a pre-drilled pilot hole and/or a rafter location in the roof. Once the bottom portion 104 is in a desired position, the installer then injects, pours, or otherwise applies a fluid sealant (not shown) into the opening 136 of bottom portion 104. The sealant may be any appropriate water-resistant sealant such as, e.g., a liquid sealant, a foam sealant, etc. Furthermore, in some embodiments, the volume of sealant injected into the cavity is substantially equal to the volume of the opening 136. However, in other embodiments, the volume of sealant may be less or greater than the volume of opening 136.

After the sealant is injected into the opening 136, the installer may place the top portion 102 onto the bottom portion 104 such that the bottom surface 124 of the top portion 102 contacts the sealant within the opening 136 of the bottom portion 104. The installer may then drive the fastener 108 through the central through-hole portion 116 and into the roof surface, thereby drawing the head 110, first washer 112, and second washer 114 closer to the top portion 102. As the fastener 108 is further driven into the roof surface, the second washer 114 eventually contacts a top surface of the central through-hole portion 116, pushing the top portion 102 downward relative to the bottom portion 104, thereby compressing the sealant within opening 136. The compressed sealant is then forced below a lower rim 128 of the interior angled sidewall 135 of the bottom portion 104 (shown in FIG. 9) and into the open space 130 of the bottom portion 104. As is shown in FIG. 8b, the bottom portion 104 may include one or more relief passages 140 on the top rim 138 so as to allow any excess volume of sealant to escape from the bottom portion 104, thereby ensuring a flat and uniform contact between roof surface and the gasket member 126 and/or the bottom rim 122.

In some embodiments, the volume of the opening 136 of bottom portion 104 may be substantially equal to or less than the volume of the open space 130. Thus, as the top portion 102 compresses all or most of the sealant out of the opening 136, the sealant substantially fills the open space 130, thereby forming a substantially water-tight seal around the fastener 108 in order to prevent water infiltration into the roof surface at the location of the fastener 108. Due to the sealant simply being injected or poured into the top-facing opening 136 after placement of the bottom portion 104 but before driving of the fastener 108 into the roof surface, the complexity and potential mess found in prior art direct-mount or deck-mounted solutions may be substantially avoided.

Figure 11A:
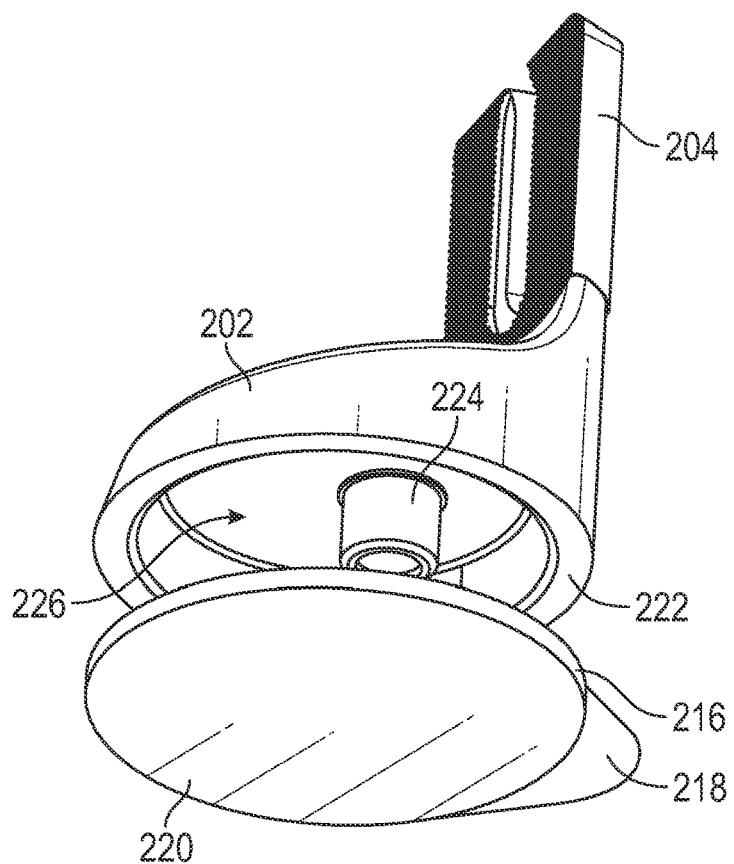
Figure 11B:
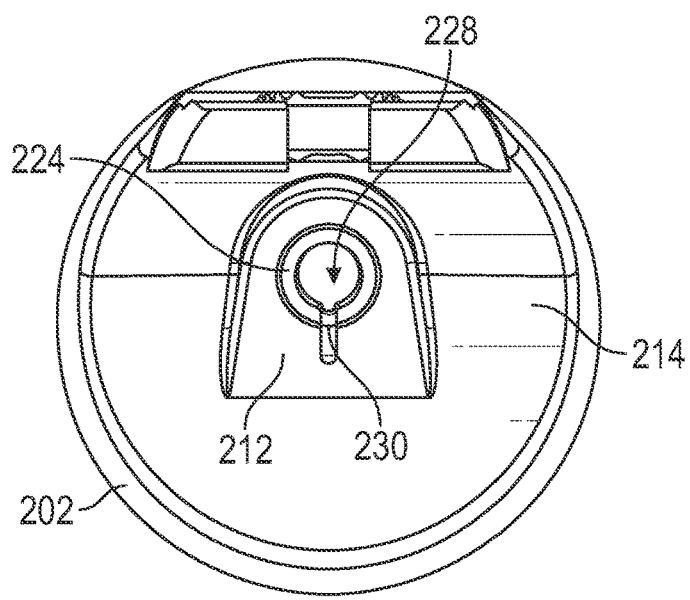
Figure 12:
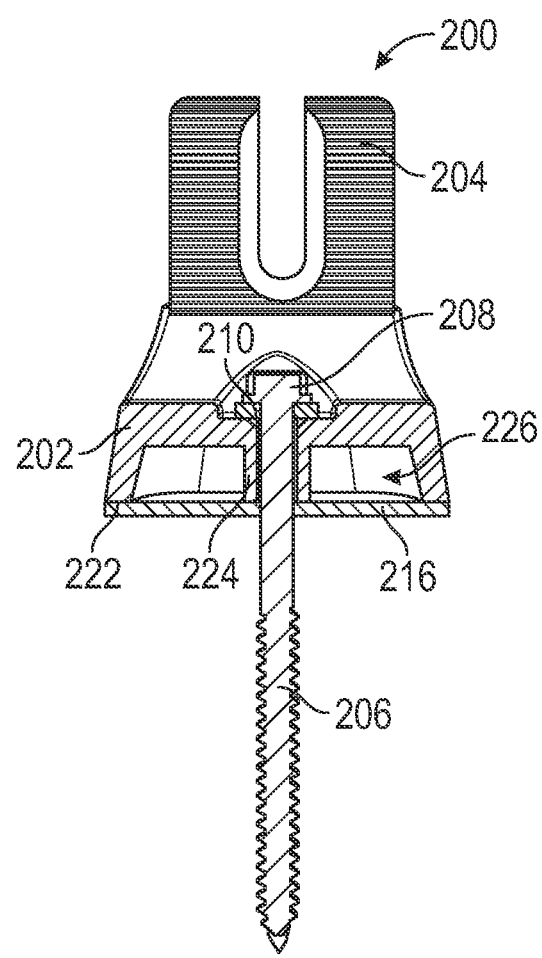
Figure 13:
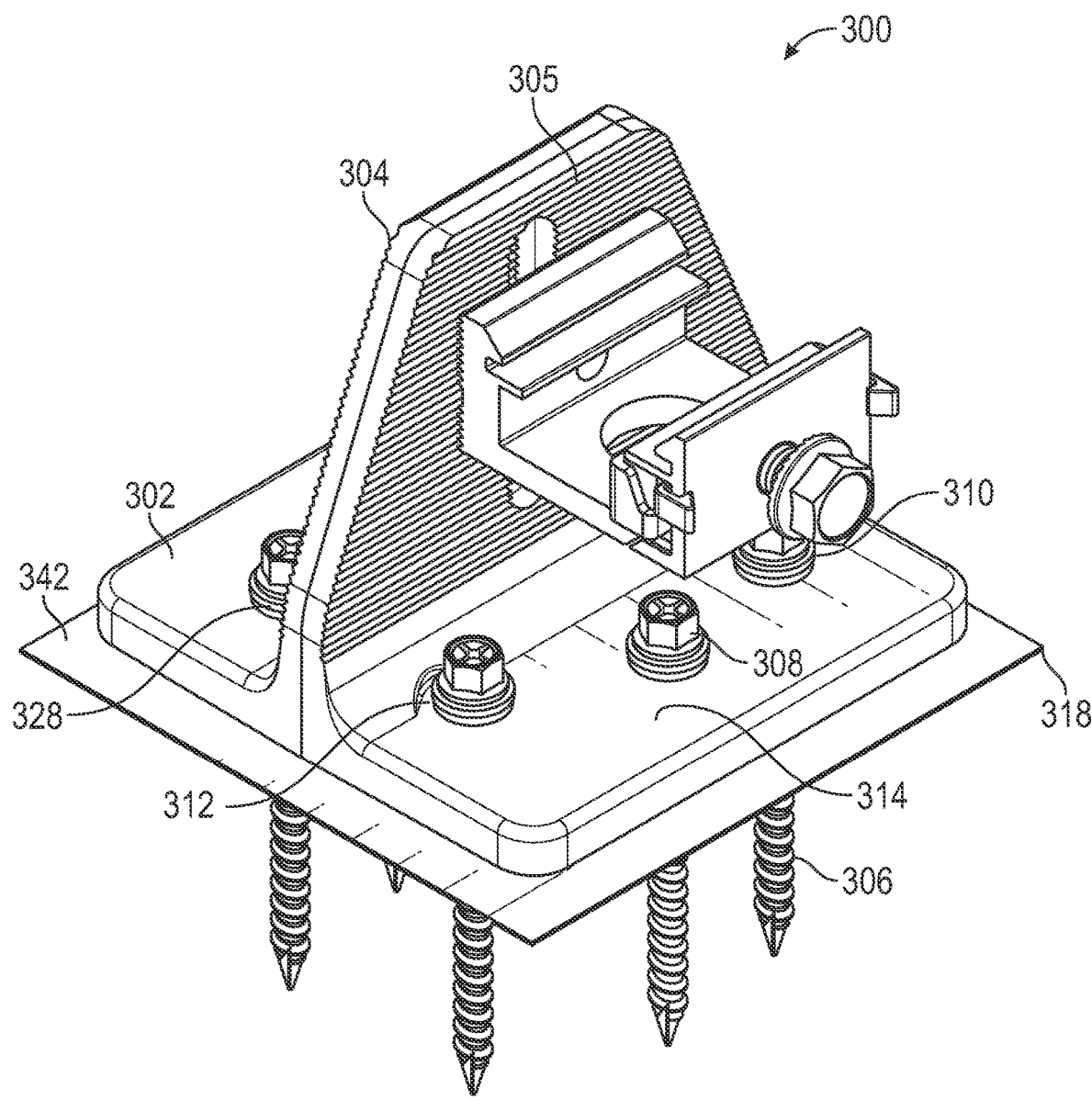
FIG. 13 is a top isometric view of a photovoltaic mount assembly in accordance with another aspect of the present disclosure.

Next, referring to FIGS. 10-12, a flashing-free mount assembly 200 in accordance with another aspect of the present disclosure is illustrated. The mount assembly 200 includes a base 202 formed with a substantially circular-shaped footprint. However, it is to be understood that base 202 is not limited to such a shape, and may be, e.g., oval, triangular, square, etc. The base 202 may be formed of any material of appropriate strength such as, e.g., aluminum, steel, plastic, polymer, etc.

Extending upward from the base 202 is a substantially U-shaped guide 204 that forms a pair of members extending from opposing sides of the base 202, which in turn forms an aperture therebetween. The aperture is sized and configured to accommodate a fastener (e.g., a nut and bolt assembly) couplable to a rail mount such that a photovoltaic rail guide can be selectively coupled to the mount assembly 200. Additionally, it is to be understood that one or both of the pair of members of the guide 204 may include a plurality of horizontal ridges extending along an inner and/or an outer face thereof, with such horizontal ridges acting to retain the fastener more securely when tightened against the guide 204. The guide 204 may connect at the top.

The base 202 further comprises a top surface 214. A substantially flat ledge 212 is formed on top surface 214, with an upper opening of a through-hole portion 224 being located within the ledge 212. As will be described in further detail below, the through-hole portion 224 includes a through-hole 228 and configured to accommodate a fastener. Referring to FIG. 11b, a relief channel 230 is also formed in the through-hole portion 224 and ledge 212.

As is shown in FIG. 11a, the base 202 also includes a bottom rim 222, which substantially surrounds a cavity 226 formed within the base 202. The through-hole portion 224 extends at least partially into the cavity 226. As will be described in further detail below, the cavity 226 is configured to hold a volume of water-resistant sealant (not shown) therein.

Affixed to the bottom rim 222 of base 202 is a covering 216, with covering 216 substantially enclosing the cavity 226. The covering 216 may be formed of any appropriate material such as, e.g., foam, rubber, butyl, sealant tape, mastic, etc. The covering 216 includes a removable film layer 220, with the film layer 220 including a user-accessible pull tab 218. The film layer 220 is configured to protect an adhesive surface of the covering 216 until the mount assembly 200 is to be mounted to a roof surface. That is, when an installer is prepared to mount the mount assembly 200 in a desired location on a roof surface, the film layer 220 can be peeled away from the covering 216, thereby exposing the adhesive surface of covering 216. With the adhesive surface exposed, the installer can then simply apply the base 202 to a desired location on the roof surface (i.e., a "peel-and-stick" arrangement).

The mount assembly 200 further includes a fastener 206 and a washer 210. The fastener 206 may be any appropriate fastener suitable for roof-mount applications such as, e.g., a threaded lag bolt, a threaded screw, a nail, a stake, etc. In the embodiment shown in FIGS. 10-12, fastener 206 is a threaded lag bolt having a hexagonal head 208. However, it is to be understood that alternative driving head shapes and/or configurations could be utilized in accordance with the present disclosure. The fastener 206 is sized so as to pass through the through-hole 228 of the base 202. The washer may be a two-part sealing washer comprised of a rigid portion and a compressible polymeric portion. While FIGS. 10-12 only illustrate a single fastener 206 and through-hole 228, it is to be understood that the mount assembly in accordance with other embodiments could incorporate more than one fastener and/or through-hole.

Figure 14:
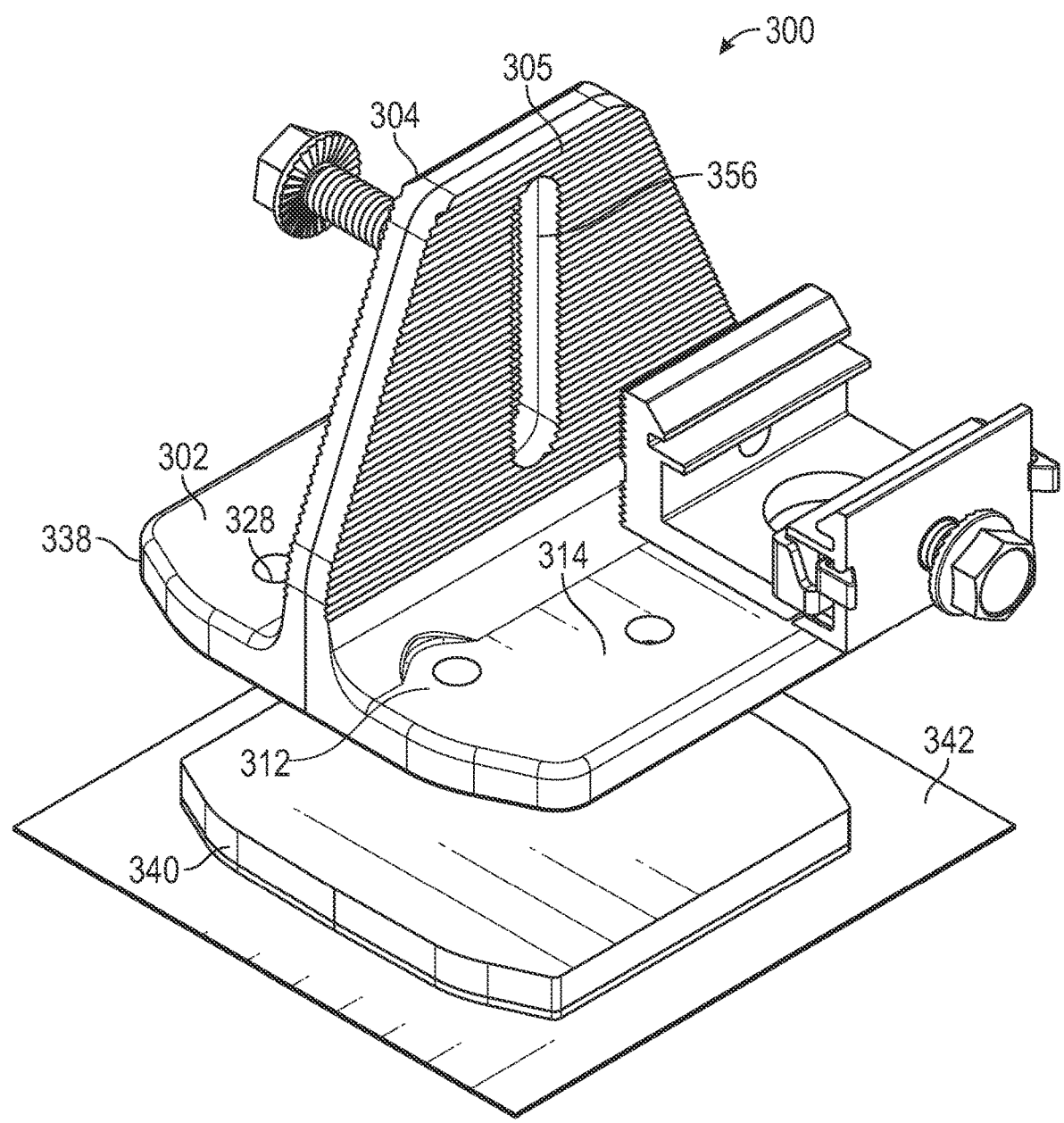
FIG. 14 is a partial exploded view of the photovoltaic mount assembly of FIG. 13.

Next, referring to FIGS. 13-19, a flashing-free mount assembly 300 in accordance with another aspect of the present disclosure is illustrated. The mount assembly 300 includes a base 302 formed with a substantially rectangular-shaped footprint with rounded corners. However, it is to be understood that base 302 is not limited to such a shape, and may be, e.g., oval, triangular, square, etc. An example embodiment with a square base 302 and rounded corners is illustrated in FIG. 14. The base 302 may be formed of any material of appropriate strength such as, e.g., aluminum, steel, plastic, polymer, etc.

Extending upward from the base 302 is an upright guide 304 that forms a member extending from opposing sides of the base 302, which in turn forms an aperture 356 therebetween. The aperture 356 is sized and configured to accommodate a fastener (e.g., a nut and bolt assembly) couplable to a rail mount such that a photovoltaic rail guide can be selectively coupled to the mount assembly 300. Additionally, it is to be understood that the member of the guide 304 may include a plurality of horizontal ridges 305 extending along an inner and/or an outer face thereof, with such horizontal ridges acting to retain the fastener more securely when tightened against the guide 304. In this embodiment the aperture 356 is closed as opposed to open at the top. This is because the specific rail attachment bracket intended for use with this embodiment is installed during manufacturing and the installer receives this further structural assembly attached and affixed to the guide at a predetermined location. Therefore the installer never needs to remove this assembly and thus the facility created by the open top aperture is unnecessary. Removing the open top also reduces the benefit of the recess surrounding the elongated aperture 356 and the lip at the top of the recess and elongated aperture 356.

The base 302 further comprises a top surface 314. A substantially flat ledge 312 may be formed on top surface 314, with an upper opening of a through-hole portion 327 being located within the ledge 312. As will be described in further detail below, the through-hole portion 327 includes a through-hole 328 and configured to accommodate a fastener 306.

Figure 15:
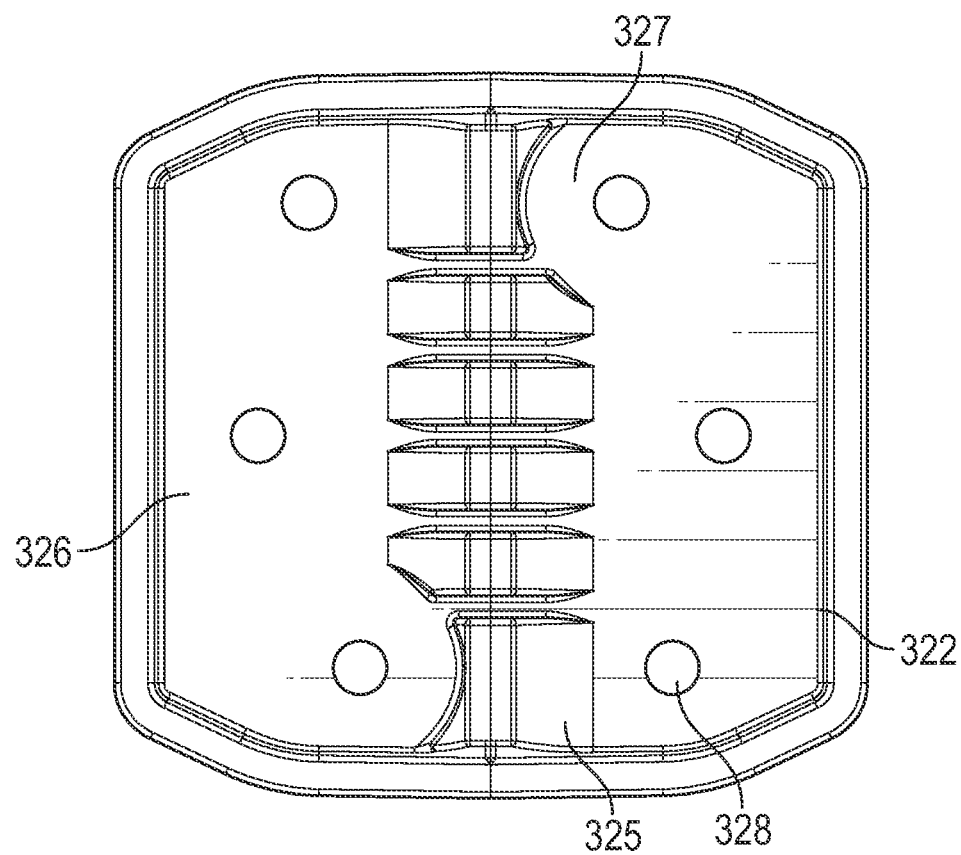
FIG. 15 is a bottom view of the photovoltaic mount assembly of FIG. 13.

As is shown in FIG. 15, the base 302 also includes an inner face 322 of the containment flange 338, which substantially surrounds a cavity 326 formed within the base 302. The through-hole 328 extends at least partially into the cavity 326. As will be described in further detail below, the cavity 326 is configured to hold a volume of fluid-resistant sealant (not shown) therein. The containment flange 338 may aid in the control of the applied pressure by acting as a stop along the perimeter when the flashing free mount is installed on the roof surface. The cavity 326 may further include a cavity upper portion 325 which extends upward from beneath the guide 304. The cavity upper portion 325 may reduce the weight and material of the mount, while remaining portions between upper portions 325 may act as ribs to increase the strength of the guide 304. The lower opening of a through-hole portion 327 may interfere and remove sections of the cavity upper portion 325. The bottom surface of through-hole portion 327 provides a minimum flat area around the through hole to ensure the dual pad seal 339 is compressed against the surface providing resistance to water infiltration through the penetration in the roof surface made by the fastener 306 when it is driven into the roof through the through-hole 328.

Affixed to the bottom surface of the base 302 above the cavity 326 is a dual pad seal 340 which substantially fills cavity 326 within the inner face 322 of the containment flange 338 of base 302. The dual pad seal 340 which may be comprised of a compression pad 340A and a seal pad 340B, with the dual pad seal 340 substantially filling the cavity 326. The dual pad seal 340 may be formed of any appropriate material such as, e.g., foam, rubber, butyl, sealant tape, mastic, etc. The dual pad seal 340 includes a removable film layer 342, with the film layer 342 including a user-accessible pull tab 318. The film layer 342 is configured to protect an adhesive surface of the dual pad seal 340 until the mount assembly 300 is to be mounted to a roof surface. That is, when an installer is prepared to install the mount assembly 300 in a desired location on a roof surface, the film layer 342 can be peeled away from the dual pad seal 340, thereby exposing the adhesive surface of dual pad seal 340. With the adhesive surface exposed, the installer can then simply apply the base 302 to a desired location on the roof surface (i.e., a "peel-and-stick" arrangement).

The dual seal pad 340 includes a removable film layer 342, with the film layer 342 including a user-accessible pull tab 318. The film layer 342 is configured to protect an adhesive surface of the dual seal pad 340 until the mount assembly 300 is to be mounted to a roof surface. That is, when an installer is prepared to mount the mount assembly 300 in a desired location on a roof surface, the film layer 342 can be peeled away from the dual seal pad 340, thereby exposing the adhesive surface of dual seal pad 340. The seal pad 340 may be the Eternabond™ or any synthetic resins, thermoplastics, butyl, and non-curing rubber with a built-in primer or applicable primer. With the adhesive surface exposed, the installer can then simply apply the base 302A, 302A to a desired location on the roof surface (i.e., a "peel-and-stick" arrangement). The base 302A, 302A rest on the dual seal pad 340 when assembled and the bases 302A, 302A are fixed to the roof or surface. The dual seal pad 340 separates the bases 302A, 302B from the roof or surface, or at least partially.

The mount assembly 300 further includes a fastener 306 and a washer 310. The fastener 306 may be any appropriate fastener suitable for roof-mount applications such as, e.g., a threaded lag bolt, a threaded screw, a nail, a stake, etc. In the embodiment shown in FIGS. 13-18, fastener 306 is a threaded lag bolt having a hexagonal head 308. However, it is to be understood that alternative driving head shapes and/or configurations could be utilized in accordance with the present disclosure. The hexagonal head 308 may include any head style such as but not limited to Philips, flat head, star, etc., The fastener 306 is sized so as to pass through the through-hole 328 of the base 302. While FIG. 21 only illustrates six fasteners 306 and through-holes 328, it is to be understood that the mount assembly in accordance with other embodiments could incorporate one or more than one fastener and/or through-hole. The washer 310 may be any washer type or style or combination which allows for a sealing configuration. The washer 310 may be a two-part sealing washer comprised of a rigid portion and a compressible polymeric portion.

Figure 16:
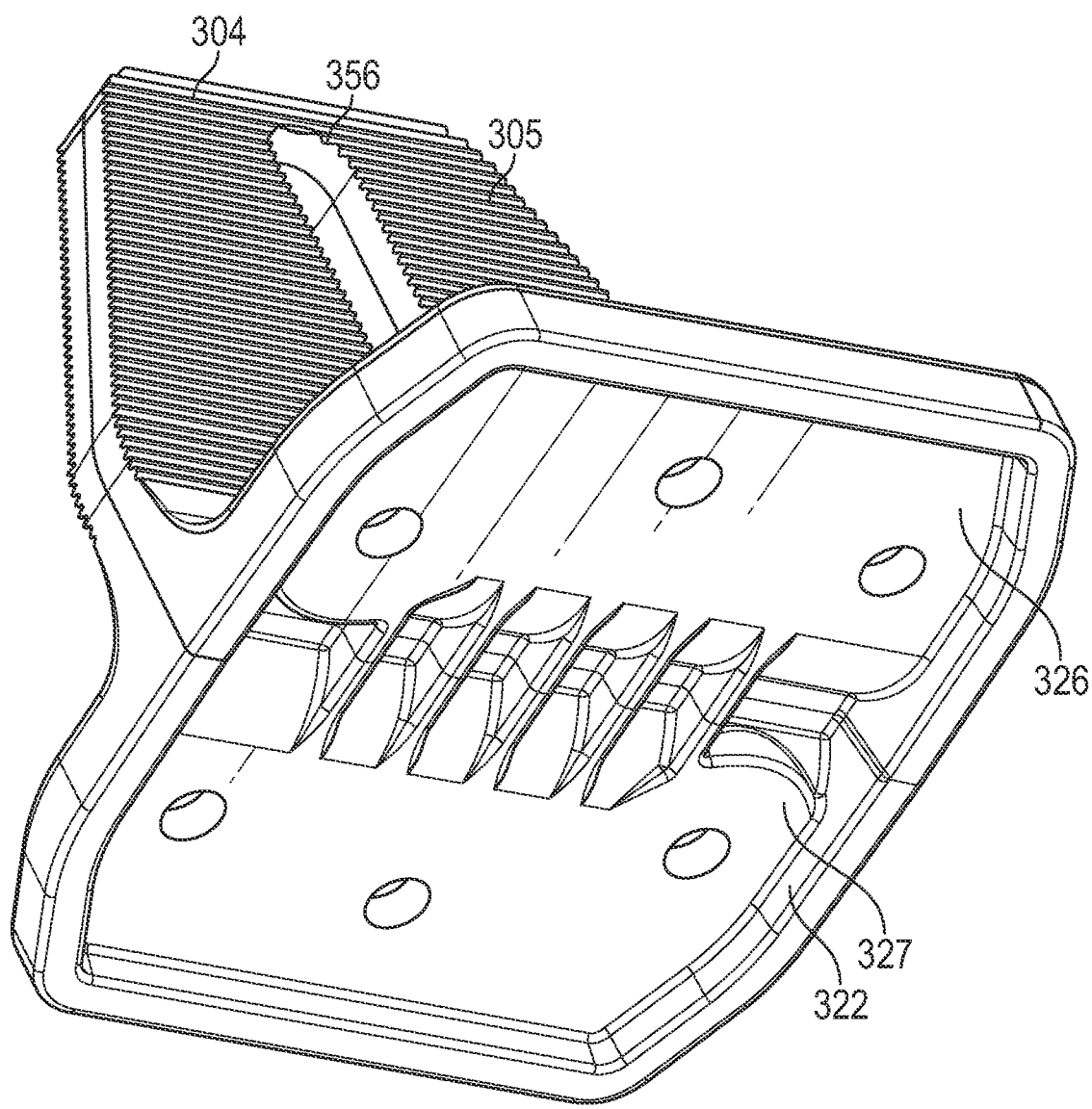
FIG. 16 is a bottom isometric view of the photovoltaic mount assembly of FIG. 13.
Figure 17:
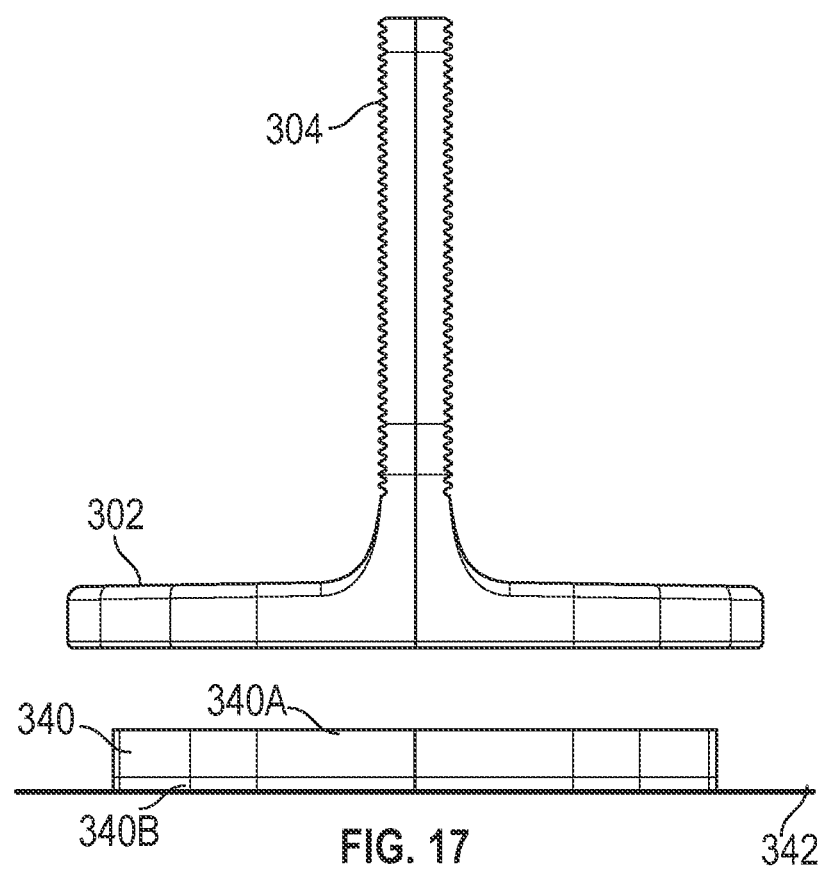
FIG. 17 is a side partial exploded view of the photovoltaic mount assembly of FIG. 13.
Figure 18B:
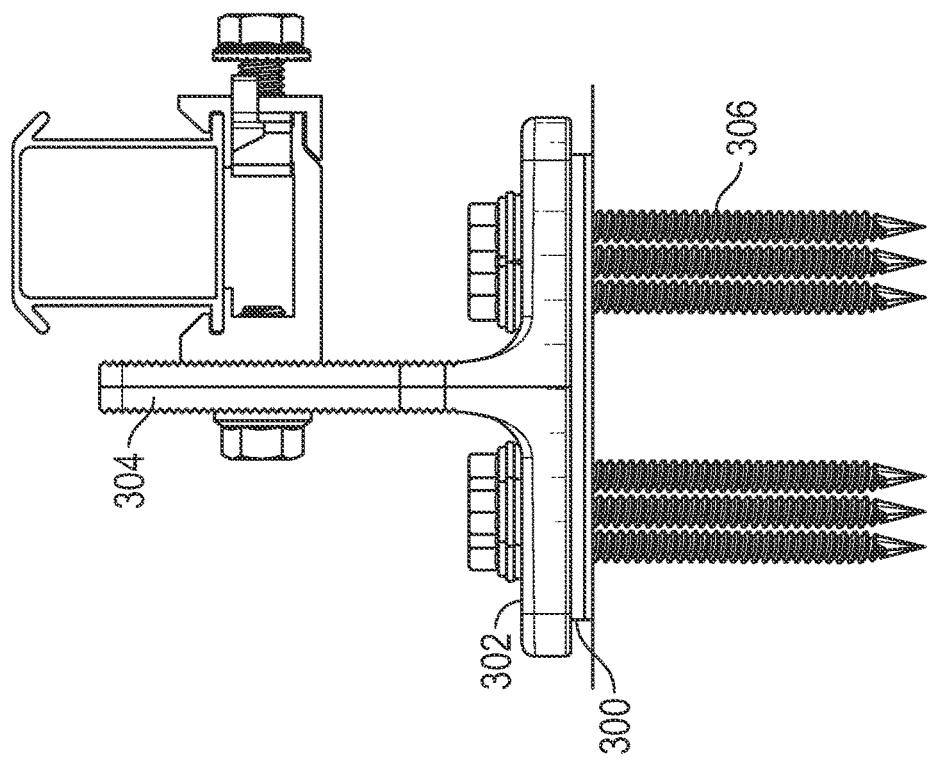
FIG. 18b is a side view of the photovoltaic mount assembly of FIG. 13 with an exemplary rail attachment.
Figure 18A:
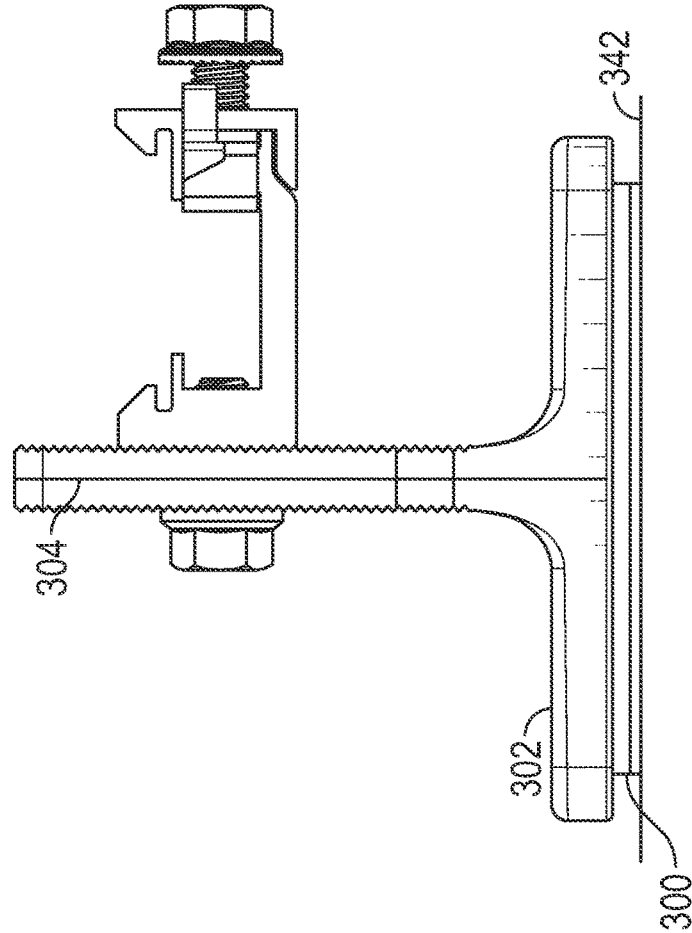
FIG. 18a is a side view of the photovoltaic mount assembly of FIG. 13.
Figure 18C:
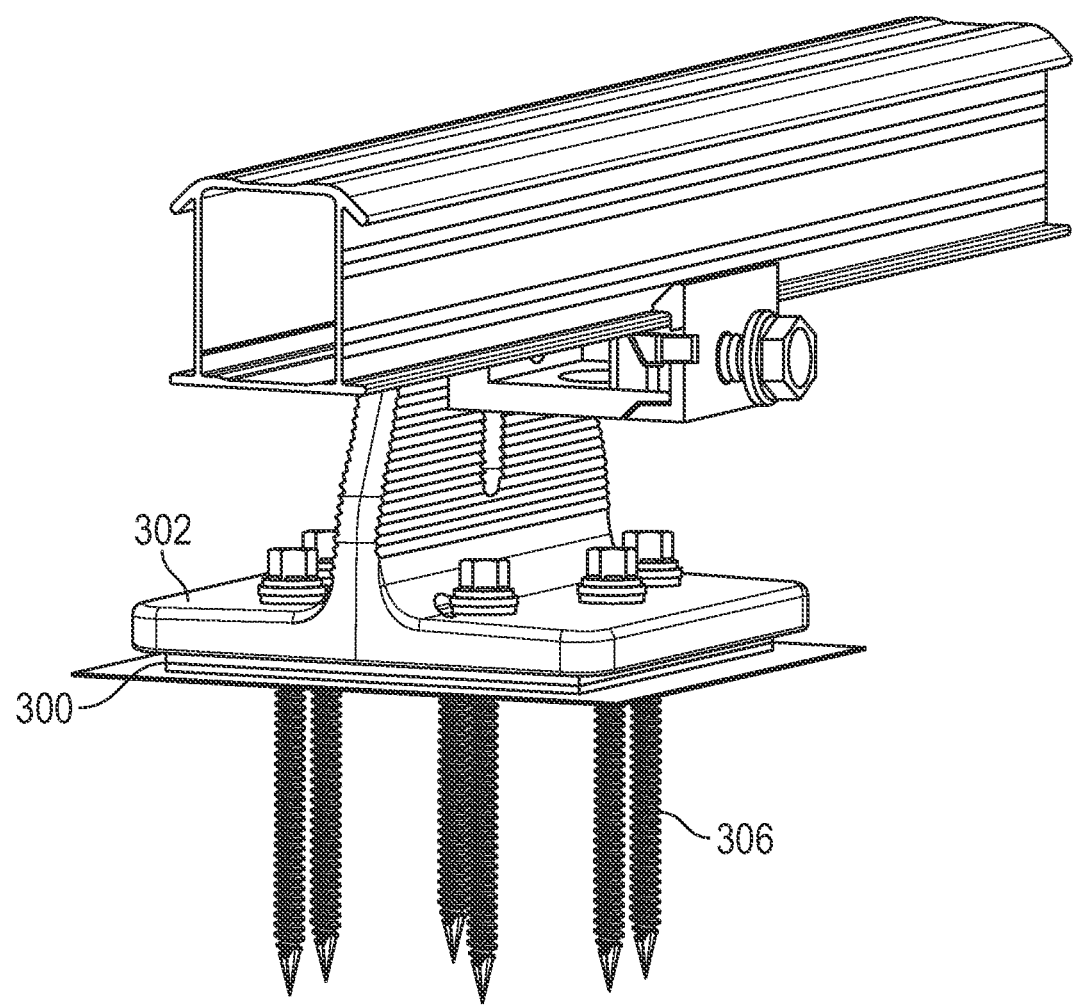
FIG. 18c is an isometric view of the photovoltaic mount assembly of FIG. 13 with an exemplary rail attachment.
Figure 19:
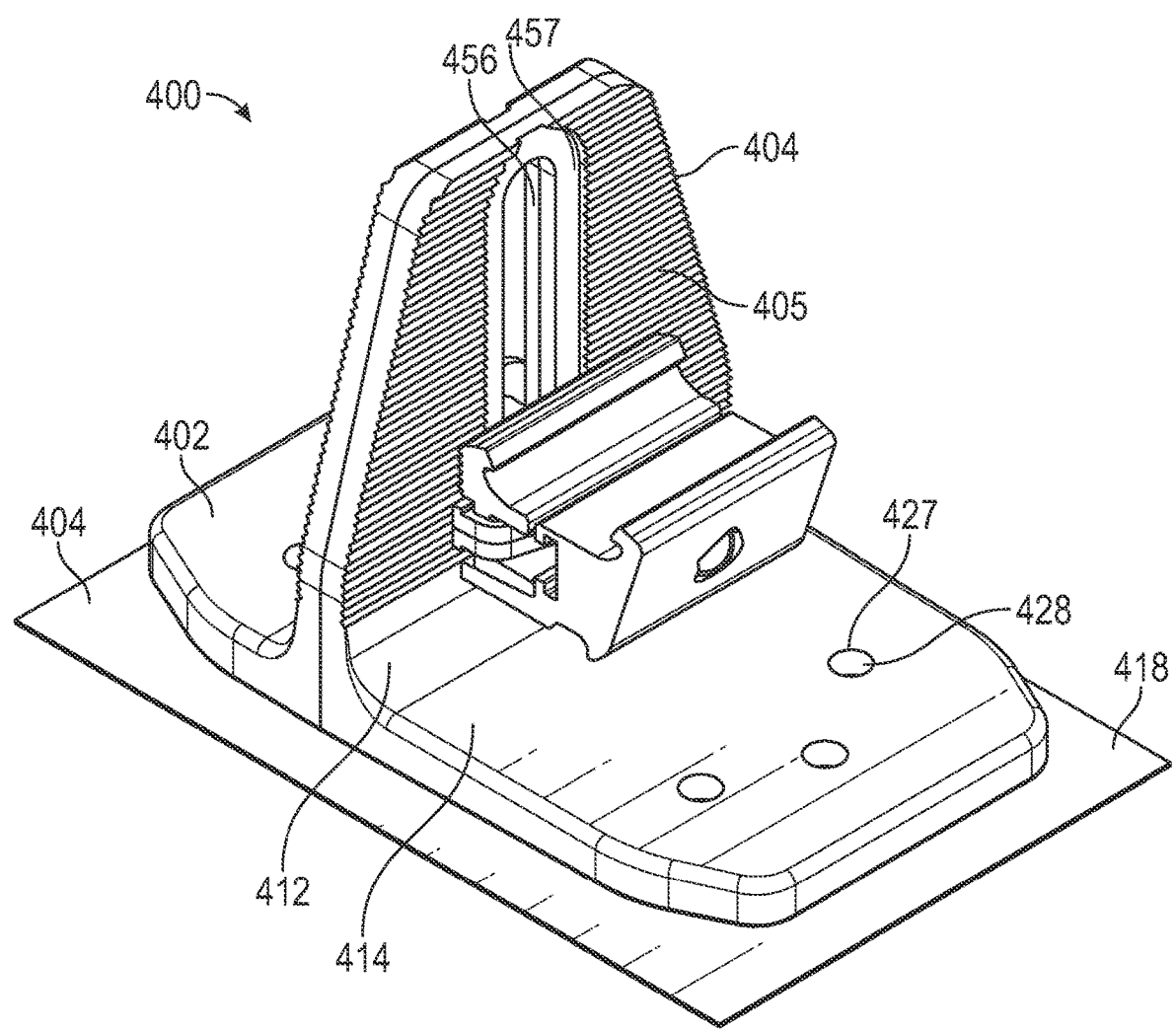
FIG. 19 is a partial exploded view of a photovoltaic mount assembly in accordance with another aspect of the present disclosure.
Figure 20:
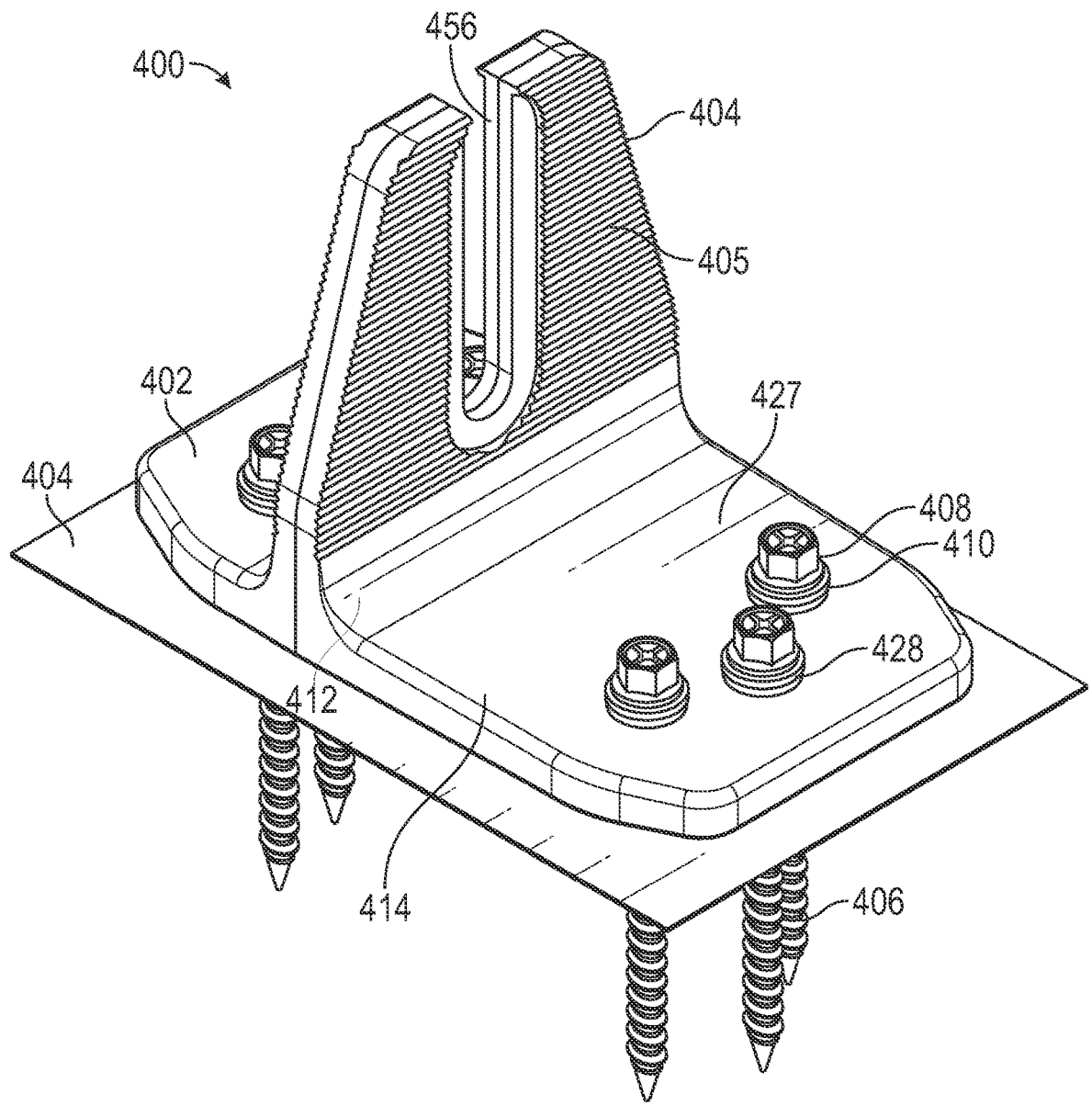
FIG. 20 is a top isometric view of the photovoltaic mount assembly of FIG. 19 with fasteners.

As is shown in FIGS. 15 and 16 the base 302 has 6 through-holes 328 configured to receive fasteners 306. However, there may be more or less through-holes 328. There are 3 holes on each side of the upright guide 304, however there may be more or less holes in other embodiments. In FIG. 15, the through-holes 328 and mount 300 are oriented to enable the attachment of at least two fasteners 306 to the roof structural members if indeed the roof structural members are engaged. This is because each hole has a corresponding aligned hole on the base on the opposite side of the upright guide. These pairs of aligned holes align with the roofing structural members.

IN the other direction, perpendicular to the roof structural members, the holes 328 do not align. Across the mounting surface each hole 328 is at an unaligned location along the mounting surface. This ensures that if one of the fasteners 306 contacts a joint between sheathing members, e.g., Plywood or OSB board, none of the other holes will also contact a sheathing joint. The specific layout of the holes 328 and fasteners 306 ensures that a majority of the fasteners 306 can find a secure mounting location on the sheathing when the mount assembly is sheathing mounted as opposed to rafter mounted, i.e. mounted to the roof structural member.

Containment flange 338 has a bottom surface which can act as a stop as the mount is installed and the base 302 approaches the roof surface. The dual seal pad 340 extends below the bottom surface of the containment flange 338 until the fastener is tightened and the base 302 is forced down to the roof surface compressing the dual seal pad 340 and urging the seal pad 340B onto the roof surface. This compression continues until the containment flange contacts the roof surface and the downward travel of the base 302 is sufficiently resisted. Thus, the containment flange 338 acts as a stop. The containment flange can additionally contain the dual seal pad 340 and the seal pad 340B to contain the flow or spread of the seal pad 340B material within the cavity 326, substantially beneath the base 302 and importantly around the areas of the through-hole portions 327 to substantially waterproof locations of potential surface attachment points of the mount 300.

Next, referring to FIGS. 19-24, a flashing-free mount assembly 400 in accordance with another aspect of the present disclosure is illustrated. The mount assembly 400 includes a base 402 formed with a substantially rectangular-shaped footprint with rounded corners. However, it is to be understood that base 402 is not limited to such a shape, and may be, e.g., oval, triangular, square, etc. The base 402 may be formed of any material of appropriate strength such as, e.g., aluminum, steel, plastic, polymer, etc.

Figure 21:
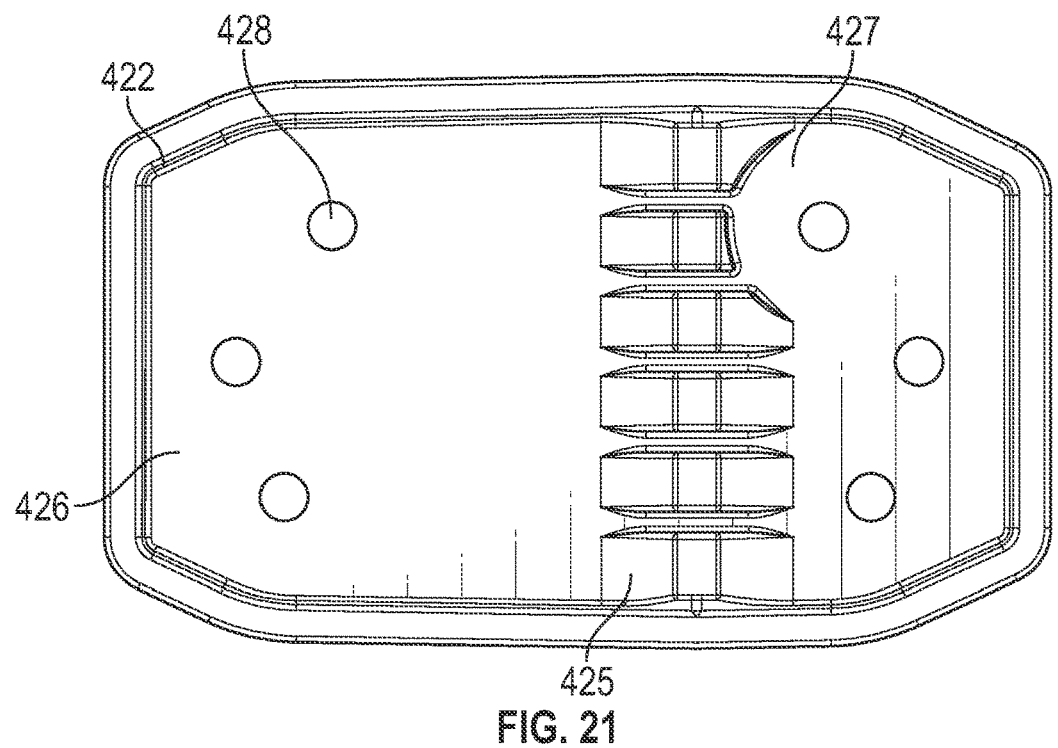
FIG. 21 is a bottom view of the photovoltaic mount assembly of FIG. 19.

Extending upward from the base 402 is an upright guide 404 that forms a member extending from opposing sides of the base 402, which in turn forms an aperture 456 therebetween. The aperture 456, may include a recess 457 which surrounds the aperture 456 and is configured to allow for a rail attachment connection. The guide 404 may extend from any portion of the base 402. The guide 404 may be a substantially U-shaped guide 404 that forms a pair of members extending from opposing sides of the base 402, which in turn forms the aperture therebetween, as illustrated in FIG. 21. The guide 404 may be located in the center of the base 402 or offset from the center. The aperture 456 is sized and configured to accommodate a fastener (e.g., a nut and bolt assembly) couplable to a rail mount such that a photovoltaic rail guide can be selectively coupled to the mount assembly 400. Additionally, it is to be understood that the member of the guide 404 may include a plurality of horizontal ridges 405 extending along an inner and/or an outer face thereof, with such horizontal ridges acting to retain the fastener more securely when tightened against the guide 404.

The base 402 further comprises a top surface 414. A substantially flat ledge 412 may be formed on top surface 414, with an upper opening of a through-hole portion 428 being located within the ledge 412. As will be described in further detail below, the through-hole portion 427 includes a through-hole 428 and configured to accommodate a fastener 406.

Figure 22:
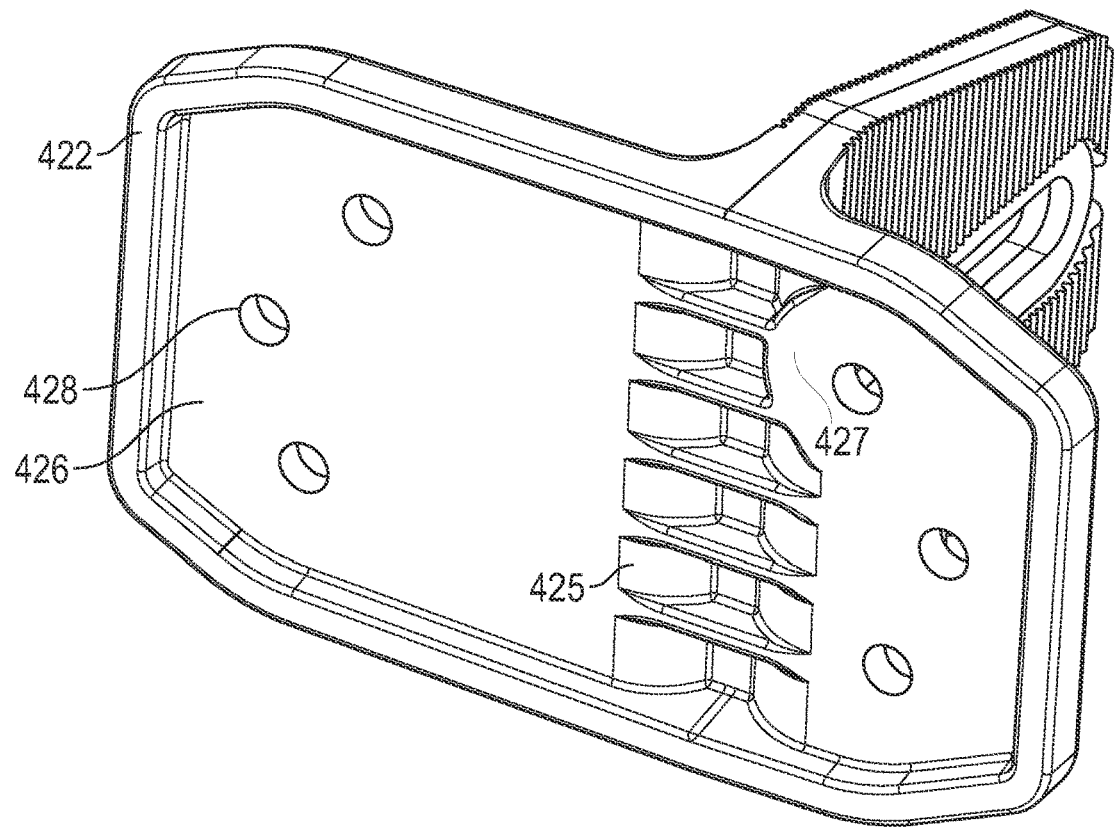
FIG. 22 is a bottom isometric view of the photovoltaic mount assembly of FIG. 19.
Figure 23:
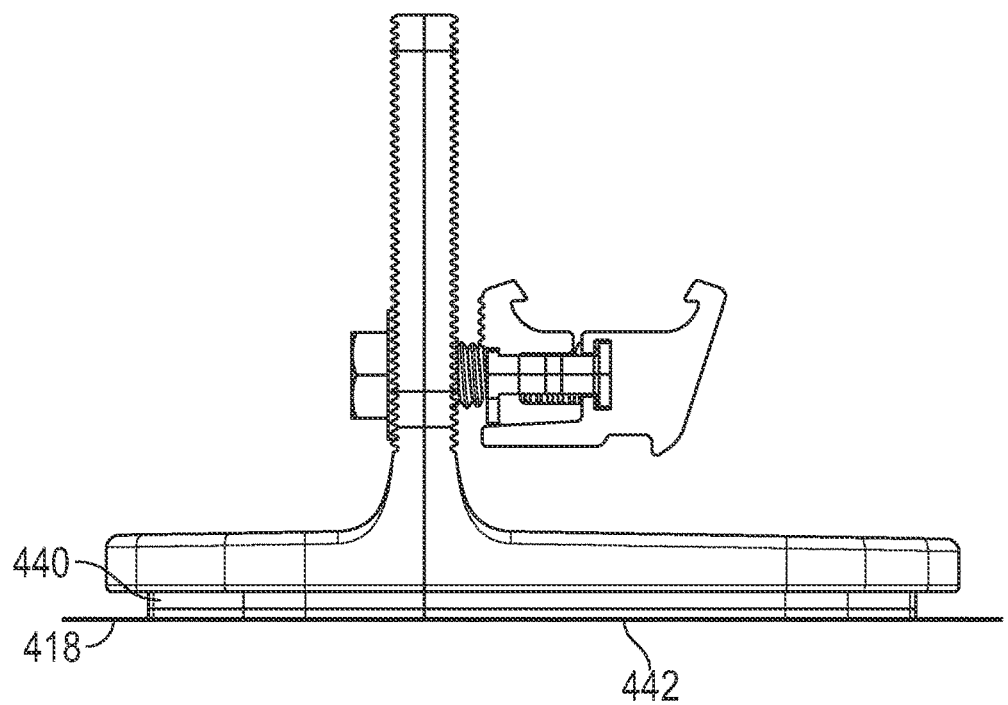
FIG. 23 is a side view of the photovoltaic mount assembly of FIG. 19.
Figure 24:
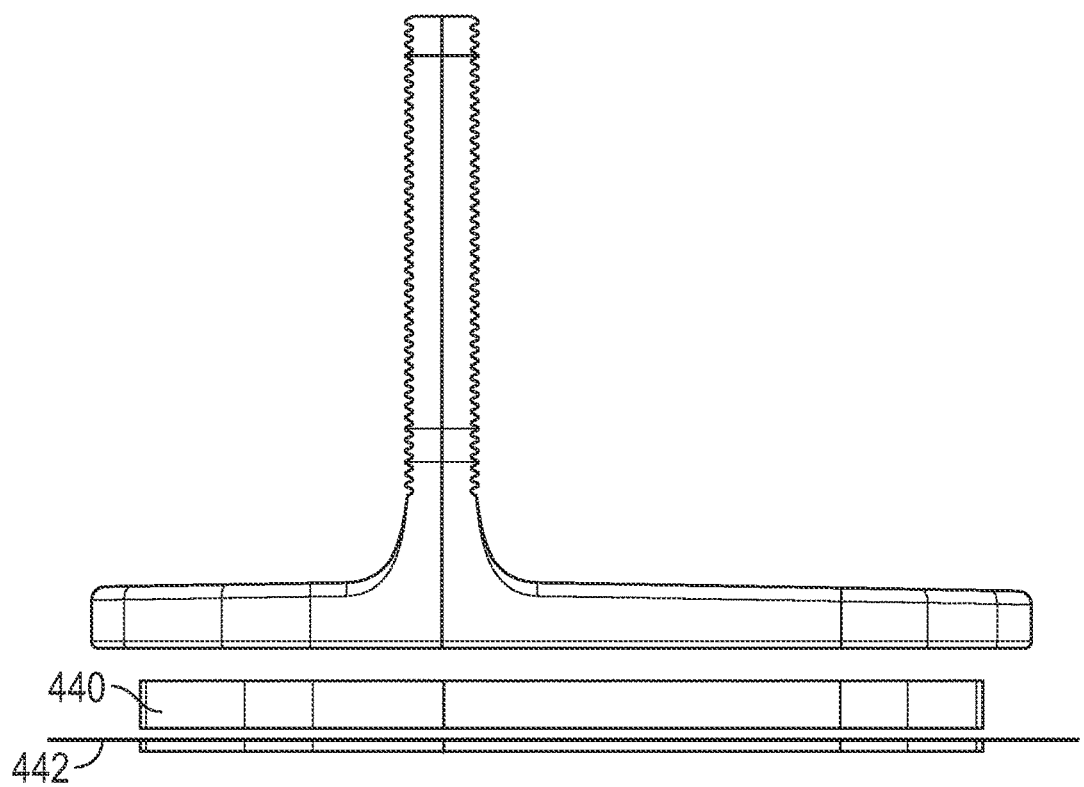
FIG. 24 is an exploded side view of the photovoltaic mount assembly of FIG. 19.
Figure 25:
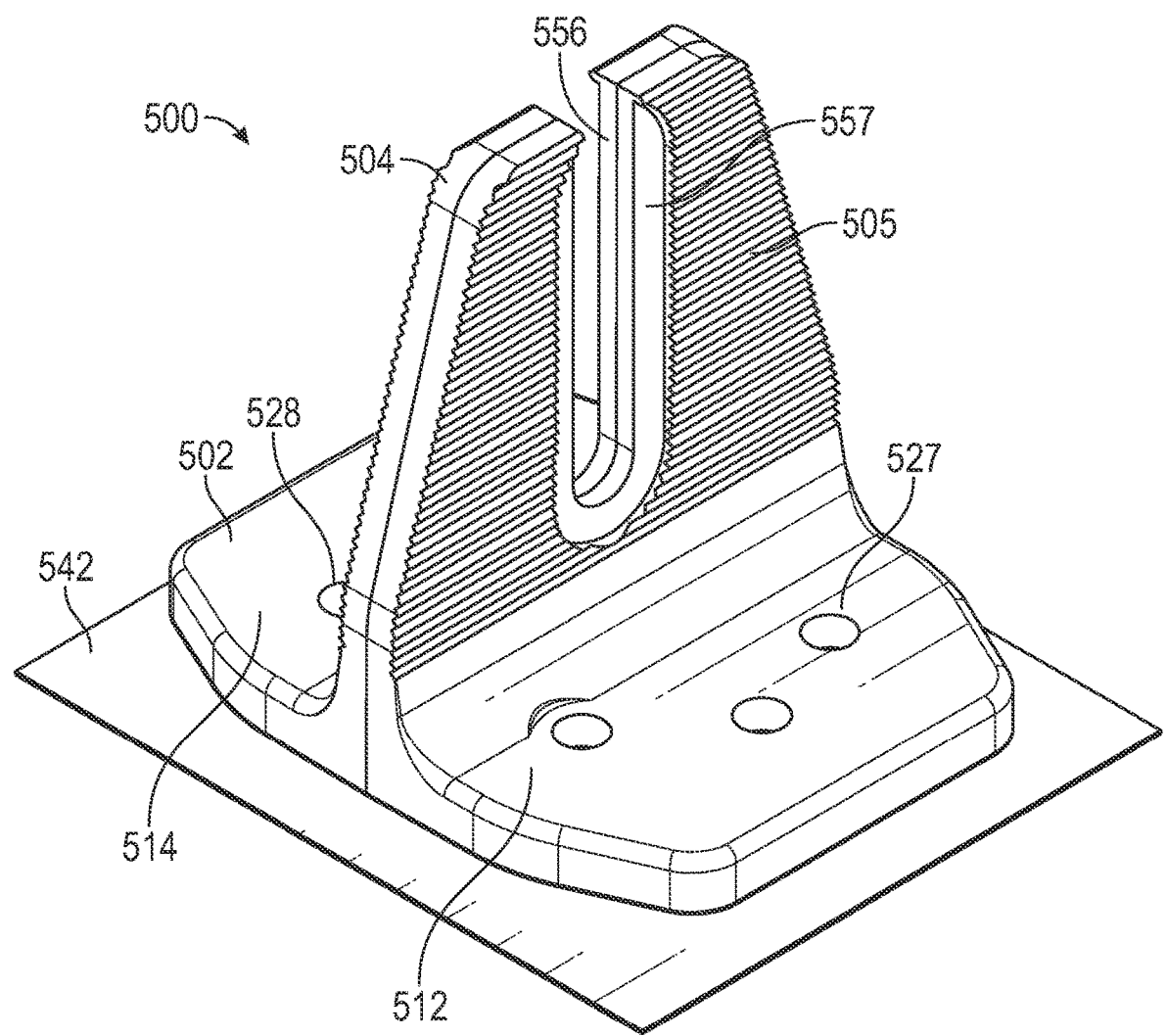
FIG. 25 is a top isometric view of a photovoltaic mount assembly in accordance with another aspect of the present disclosure.
Figure 26:
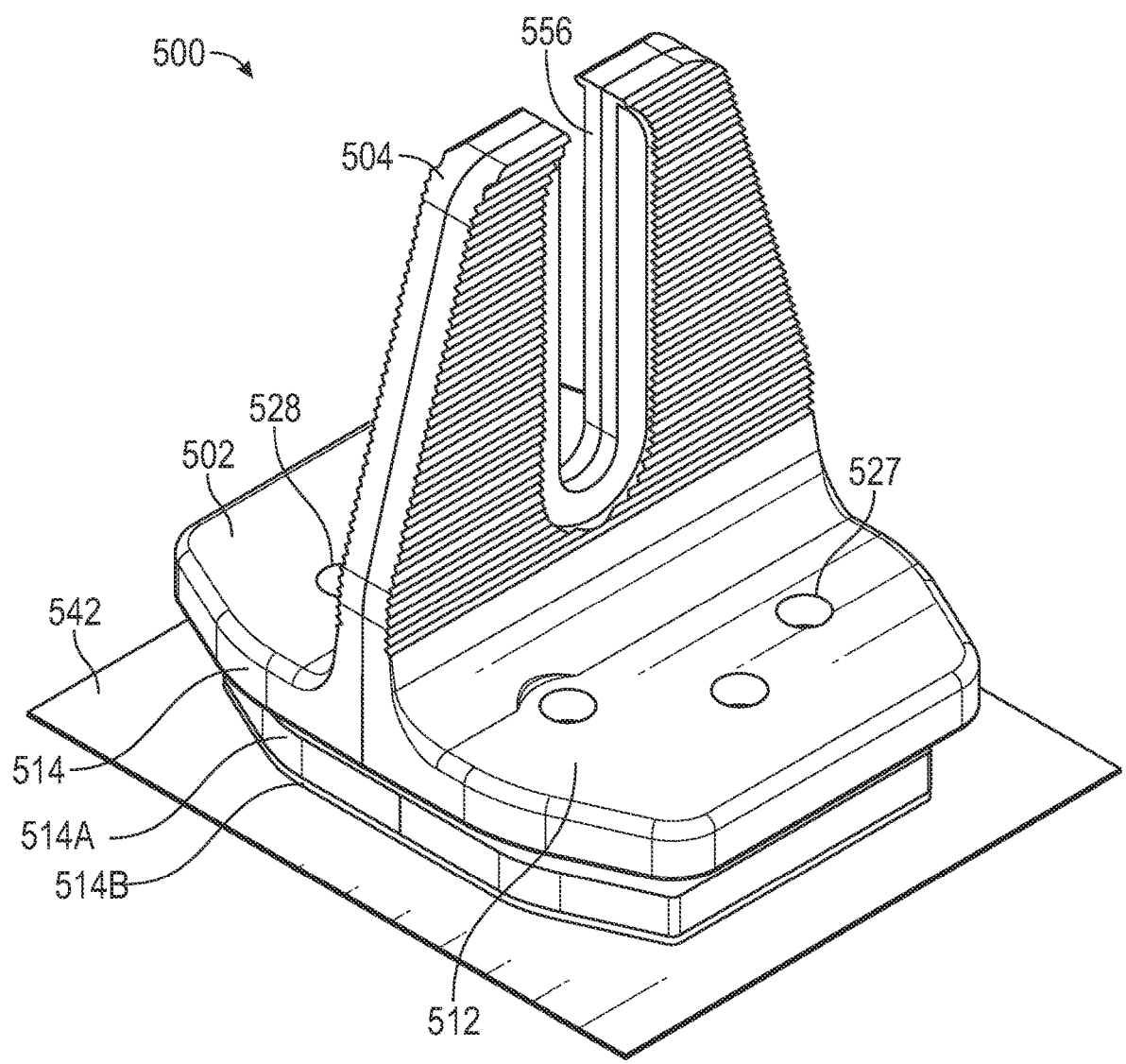
FIG. 26 is a partial exploded view of the photovoltaic mount assembly of FIG. 25.

As is shown in FIGS. 21-22, the base 402 also includes a containment flange 438, which substantially surrounds a cavity 426 formed within the base 402. The through-hole portion 428 extends at least partially into the cavity 426. As will be described in further detail below, the cavity 426 is configured to hold a volume of water-resistant sealant (not shown) therein. The containment flange 438 may aid in the control of the applied pressure by acting as a stop along the perimeter when the sealant is applied. The cavity 426 may further include a cavity upper portion 425 which extend from beneath the guide 404. The cavity upper portion 425 may increase the strength of the guide 404. The lower opening of a through-hole portion 427 may interfere and remove sections of the cavity upper portion 425.

Affixed to the bottom surface of the base 402 above the cavity 426 is a dual pad seal 440 which substantially fills cavity 426 within the inner face 422 of the containment flange 438 of base 402. The dual pad seal 440 may substantially enclosing the cavity 426. The dual pad seal 440 may be formed of any appropriate material such as, e.g., foam, rubber, butyl, sealant tape, mastic, etc. The dual pad seal 440 includes a removable film layer 442, with the film layer 442 including a user-accessible pull tab 418. The film layer 442 is configured to protect an adhesive surface of the compression/seal pad 440 until the mount assembly 400 is to be mounted to a roof surface. That is, when an installer is prepared to mount the mount assembly 400 in a desired location on a roof surface, the film layer 442 can be peeled away from the dual pad seal 440, thereby exposing the adhesive surface of dual pad seal 440. With the adhesive surface exposed, the installer can then simply apply the base 402 to a desired location on the roof surface (i.e., a "peel-and-stick" arrangement).

The mount assembly 400 further includes a fastener 406 and a washer 410. The washer 410 may be a two-part sealing washer comprised of a rigid portion and a compressible polymeric portion. The fastener 406 may be any appropriate fastener suitable for roof-mount applications such as, e.g., a threaded lag bolt, a threaded screw, a nail, a stake, etc. In the embodiment shown in FIG. 21, fastener 406 is a threaded lag bolt having a hexagonal head 408. However, it is to be understood that alternative driving head shapes and/or configurations could be utilized in accordance with the present disclosure. The fastener 406 is sized so as to pass through the through-hole 428 of the base 402. While FIG. 21 only illustrates multiple fasteners 406 in the through-holes 428, it is to be understood that the mount assembly in accordance with other embodiments could incorporate any amount of fastener and/or through-hole.

As is shown in FIGS. 21-22 the base 402 has 6 through-holes 428 configured to receive fasteners 406. However, there may be more or less through-holes 428. There are 3 holes on each side of the upright guide 404, however there may be more or less holes in other embodiments. In FIG. 21, the through-holes 428 and mount 400 are oriented to enable the attachment of at least two fasteners 406 to the roof structural members if indeed the roof structural members are engaged.

When the mount 400 is rotated, the holes 428 do not align. Across the mounting surface each hole 428 is at unaligned location along the mounting surface. This ensures that if one of the fasteners 406 contacts a joint between sheathing members, e.g., Plywood or OSB board. The specific layout of the holes 428 and fasteners 406 ensures that a majority of the fasteners 406 can find a secure mounting location on the sheathing.

Containment flange 438 has a bottom surface which can act as a stop as the mount is installed and the base 402 approaches the roof surface. The dual seal pad 440 extends below the bottom surface of the containment flange 438 until the fastener is tightened and the base 402 is forced down to the roof surface compressing the dual seal pad 440 and urging the seal pad 440B onto the roof surface. This compression continues until the containment flange contacts the roof surface and the downward travel of the base 402 is sufficiently resisted. Thus, the containment flange 438 acts as a stop. The containment flange can additionally contain the dual seal pad 440 and the seal pad 440B to contain the flow or spread of the seal pad 440B material within the cavity 426, substantially beneath the base 402 and importantly around the areas of the through-hole portions 427 to substantially waterproof the mount 400 located at the potential surface attachment points.

The dual seal pad 440 includes a removable film layer 442, with the film layer 442 including a user-accessible pull tab 418. The film layer 442 is configured to protect an adhesive surface of the dual seal pad 440 until the mount assembly 400 is to be mounted to a roof surface. That is, when an installer is prepared to mount the mount assembly 400 in a desired location on a roof surface, the film layer 442 can be peeled away from the dual seal pad 440, thereby exposing the adhesive surface of dual seal pad 440. The seal pad 440 may be the Eternabond™ or any synthetic resins, thermoplastics, butyl, and non-curing rubber with a built-in primer or applicable primer. With the adhesive surface exposed, the installer can then simply apply the base 402A, 402A to a desired location on the roof surface (i.e., a "peel-and-stick" arrangement). The base 402A, 402A rest on the dual seal pad 440 when assembled and the bases 402A, 402A are fixed to the roof or surface. The dual seal pad 440 separates the bases 402A, 402B from the roof or surface, or at least partially.

Figure 27:
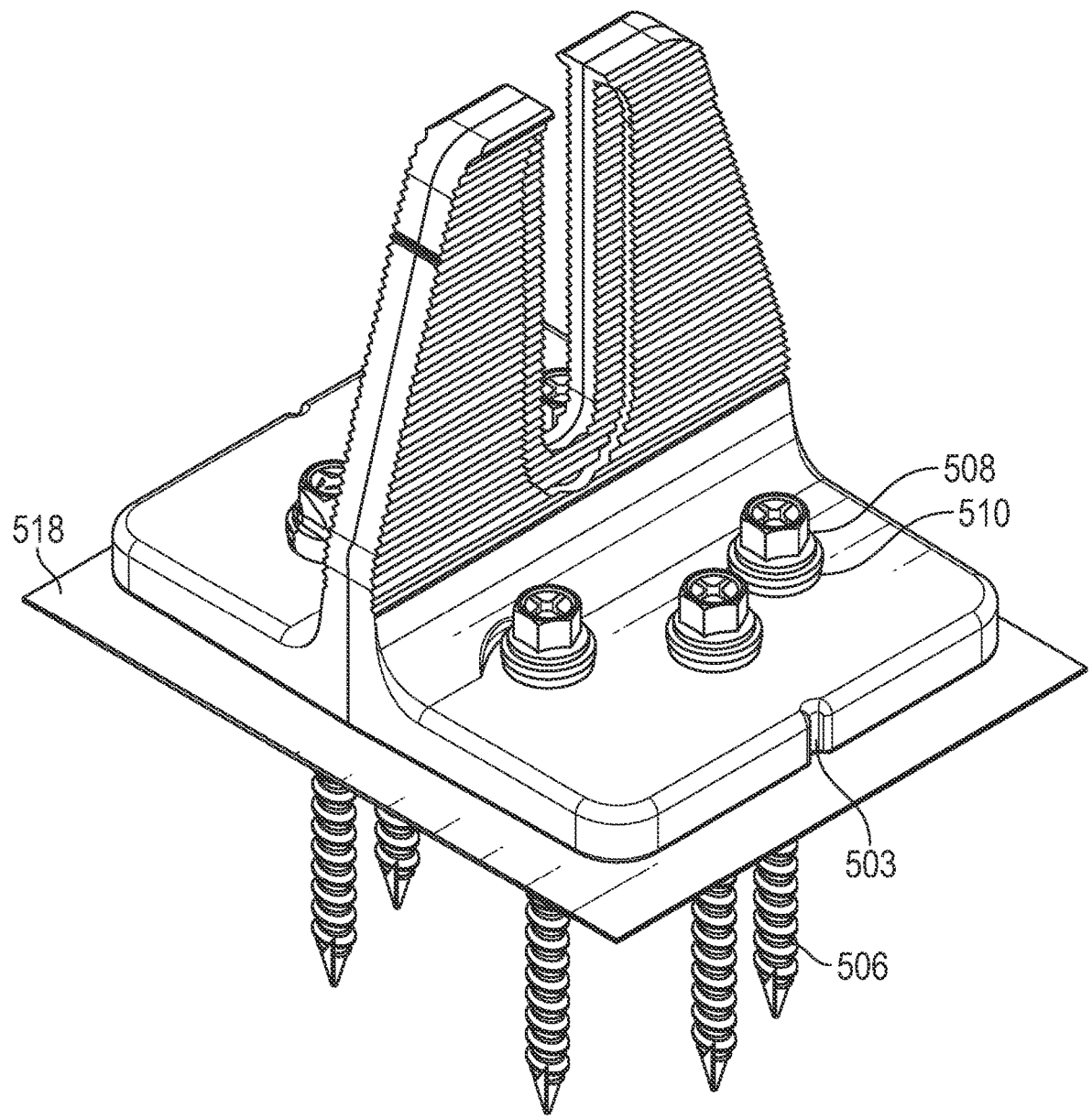
FIG. 27 is a is a top isometric view of the photovoltaic mount assembly of FIG. 25 with fasteners.
Figure 28:
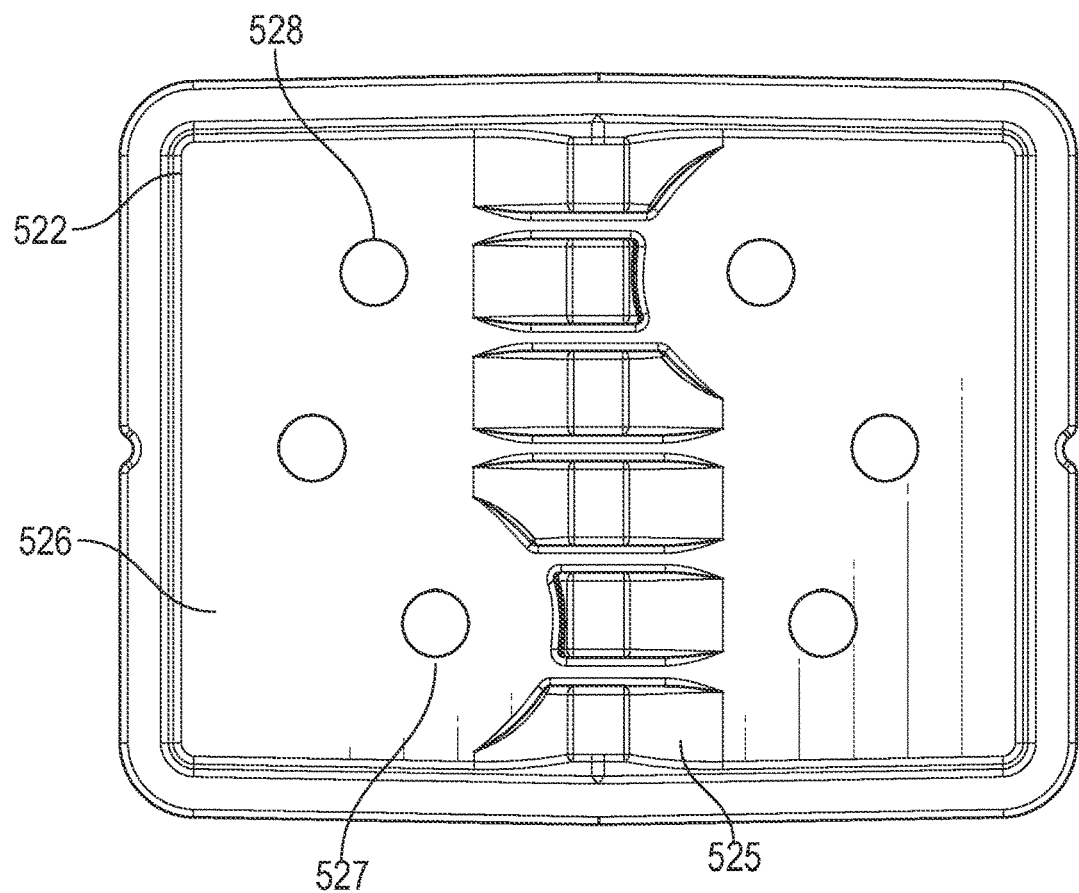
FIG. 28 is a bottom view of the photovoltaic mount assembly of FIG. 25 with an alternative base shape.

Next, referring to FIGS. 25-31, a flashing-free mount assembly 500 in accordance with another aspect of the present disclosure is illustrated. The mount assembly 500 includes a base 502 formed with a substantially rectangular-shaped footprint with rounded corners. However, it is to be understood that base 502 is not limited to such a shape, and may be, e.g., oval, triangular, square, etc. As illustrated in FIG. 28, the base 502 may be square with rounded corners. The base 502 may be formed of any material of appropriate strength such as, e.g., aluminum, steel, plastic, polymer, etc. The perimeter of the base 502 may include notches 503 as illustrated in FIG. 28, configured to aid an installer in locating the mount at a desired location, for instance along a chalk line identifying the center of a rafter or other desired location of the mount assembly.

Extending upward from the base 502 is an upright guide 504 that forms a member extending from opposing sides of the base 502, which in turn forms an aperture 556 therebetween. The aperture 556 is sized and configured to accommodate a fastener (e.g., a nut and bolt assembly) couplable to a rail mount such that a photovoltaic rail guide can be selectively coupled to the mount assembly 500. The aperture 556 may be surrounded by a recess 557 configured to aid in a roof attachment. The upright guide 504 may be substantially U-shaped that forms a pair of members extending from opposing sides of the base 502, which in turn forms the aperture therebetween. Additionally, it is to be understood that the member of the guide 504 may include a plurality of horizontal ridges 505 extending along an inner and/or an outer face thereof, with such horizontal ridges acting to retain the fastener more securely when tightened against the guide 504.

The base 502 further comprises a top surface 514. A substantially flat ledge 512 may be formed on top surface 514, with an upper opening of a through-hole portion 527 being located within the ledge 512. As will be described in further detail below, the through-hole portion 527 includes a through-hole 528 and configured to accommodate a fastener 506.

Figure 29:
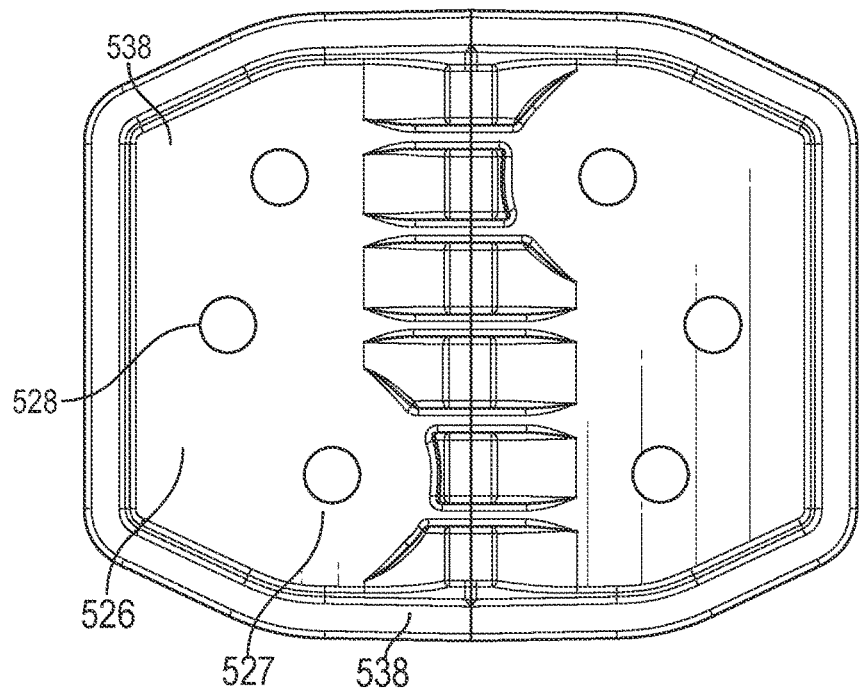
FIG. 29 is a bottom view of the photovoltaic mount assembly of FIG. 25.
Figure 30:
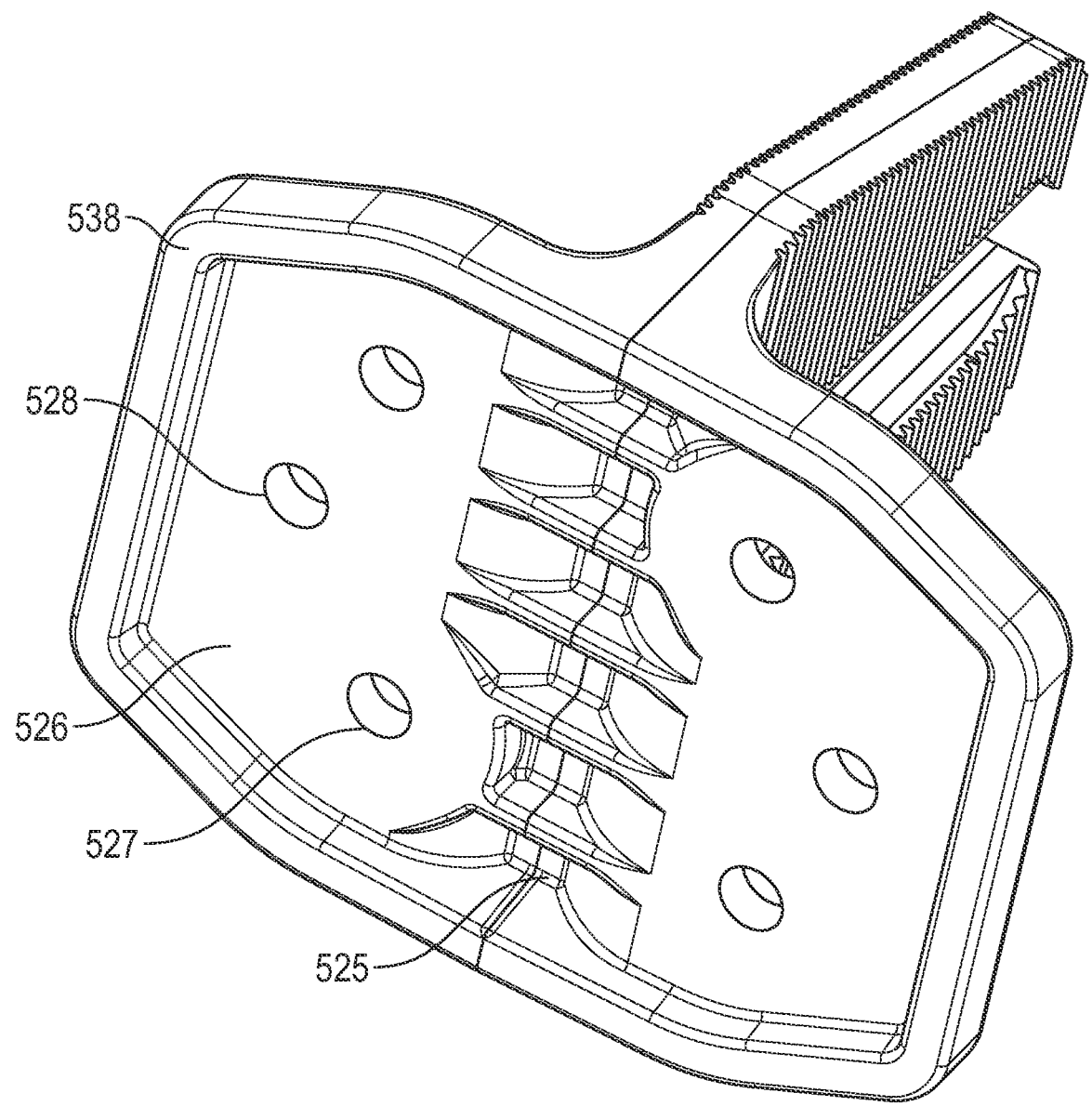
FIG. 30 is a bottom isometric view of the of the photovoltaic mount assembly of FIG. 25.
Figure 31:
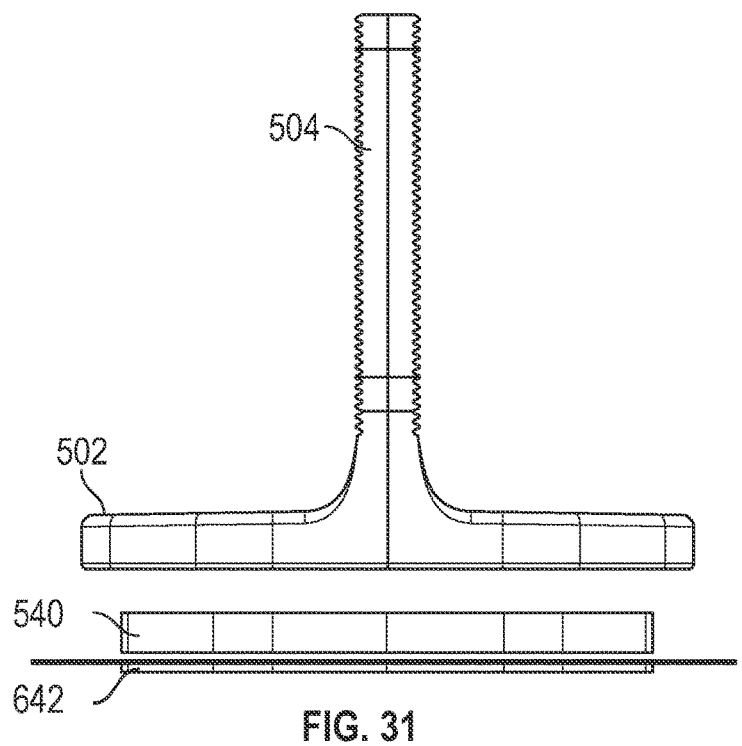
FIG. 31 is a partial exploded side view of the photovoltaic mount assembly of FIG. 25.

As is shown in FIGS. 29-30, the base 502 also includes a containment flange 538, which substantially surrounds a cavity 526 formed within the base 502. The through-hole portion 527 extends at least partially into the cavity 526. As will be described in further detail below, the cavity 526 is configured to hold a volume of water-resistant sealant (not shown) therein. The containment flange 538 may aid in the control of the applied pressure by acting as a stop along the perimeter when the sealant is applied.

Affixed to the bottom surface of the base 502 above the cavity 526 is a dual pad seal 540 which substantially fills cavity 526 within the inner face 522 of the containment flange 538 of base 502 . . . . The cavity 526 may have an upper portion 525. The dual pad seal 540 may be formed of any appropriate material such as, e.g., foam, rubber, butyl, sealant tape, mastic, etc. The dual pad seal 540 may include a compression pad, a seal pad, and a removable film layer 542, with the film layer 542 including a user-accessible pull tab 518. The film layer 542 is configured to protect an adhesive surface of the dual pad seal 540 until the mount assembly 500 is to be mounted to a roof surface. That is, when an installer is prepared to mount the mount assembly 500 in a desired location on a roof surface, the film layer 542 can be peeled away from the dual pad seal 540, thereby exposing the adhesive surface of dual seal pad 540. With the adhesive surface exposed, the installer can then simply apply the base 502 to a desired location on the roof surface (i.e., a "peel-and-stick" arrangement).

The mount assembly 500 further includes a fastener 506 and a washer 510. The washer 510 may be a two-part sealing washer comprised of a rigid portion and a compressible polymeric portion. The fastener 506 may be any appropriate fastener suitable for roof-mount applications such as, e.g., a threaded lag bolt, a threaded screw, a nail, a stake, etc. In the embodiment shown in FIGS. 26-31, fastener 506 is a threaded lag bolt having a hexagonal head 508. However, it is to be understood that alternative driving head shapes and/or configurations could be utilized in accordance with the present disclosure. The fastener 506 is sized so as to pass through the through-hole 528 of the base 502. While FIG. 28*a* illustrates six fasteners 506 and through-holes 528, it is to be understood that the mount assembly in accordance with other embodiments could incorporate one or more fasteners and/or through-holes.

The base 502 has 6 through-holes 528 configured to receive fasteners 506. However, there may be more or less through-holes 528. There are 3 holes on each side of the upright guide 504, however there may be more or less holes in other embodiments. In FIG. 27, the through-holes 528 and mount 500 are oriented to enable the attachment of at least two fasteners 506 to the roof structural members if indeed the roof structural members are engaged.

When the mount 500 is rotated, the holes 528 do not align. Across the mounting surface each hole 528 is at unaligned location along the mounting surface. This ensures that if one of the fasteners 506 contacts a joint between sheathing members, e.g., Plywood or OSB board. The specific layout of the holes 528 and fasteners 506 ensures that a majority of the fasteners 506 can find a secure mounting location on the sheathing.

Containment flange 538 has a bottom surface which can act as a stop as the mount is installed and the base 502 approaches the roof surface. The dual seal pad 540 extends below the bottom surface of the containment flange 538 until the fastener is tightened and the base 502 is forced down to the roof surface compressing the dual seal pad 540 and urging the seal pad 540B onto the roof surface. This compression continues until the containment flange contacts the roof surface and the downward travel of the base 502 is sufficiently resisted. Thus, the containment flange 538 acts as a stop. The containment flange can additionally contain the dual seal pad 540 and the seal pad 540B to contain the flow or spread of the seal pad 540B material within the cavity 526, substantially beneath the base 502 and importantly around the areas of the through-hole portions 527 to substantially waterproof the mount 500 located at the potential surface attachment points.

The dual seal pad 540 includes a removable film layer 542, with the film layer 542 including a user-accessible pull tab 518. The film layer 542 is configured to protect an adhesive surface of the dual seal pad 540 until the mount assembly 500 is to be mounted to a roof surface. That is, when an installer is prepared to mount the mount assembly 500 in a desired location on a roof surface, the film layer 542 can be peeled away from the dual seal pad 540, thereby exposing the adhesive surface of dual seal pad 540. The seal pad 540 may be the Eternabond™ or any synthetic resins, thermoplastics, butyl, and non-curing rubber with a built-in primer or applicable primer. With the adhesive surface exposed, the installer can then simply apply the base 502A, 502A to a desired location on the roof surface (i.e., a "peel-and-stick" arrangement). The base 502A, 502A rest on the dual seal pad 540 when assembled and the bases 502A, 502A are fixed to the roof or surface. The dual seal pad 540 separates the bases 502A, 502B from the roof or surface, or at least partially.

Next, referring to FIGS. 32-35, a flashing-free mount assembly 600 in accordance with another aspect of the present disclosure is illustrated. The mount assembly 600 includes a base 602 formed with a substantially rectangular-shaped footprint with two beveled sides. However, it is to be understood that base 602 is not limited to such a shape, and may be, e.g., oval, triangular, square, etc. The base 602 may be formed of any material of appropriate strength such as, e.g., aluminum, steel, plastic, polymer, etc.

Extending upward from the base 602 is an upright guide 604 that forms a member extending from opposing sides of the base 602, which in turn forms an aperture 656 therebetween. The upright guide 604 may extend the width of the base 602. The aperture 656 is sized and configured to accommodate a fastener (e.g., a nut and bolt assembly) couplable to a rail mount such that a photovoltaic rail guide can be selectively coupled to the mount assembly 600. Additionally, it is to be understood that the member of the guide 604 may include a plurality of horizontal ridges 605 extending along an inner and/or an outer face thereof, with such horizontal ridges 605 acting to retain the fastener 606 more securely when tightened against the guide 604.

The base 602 further comprises a top surface 614. An upper opening of a through-hole portion 627 being located within the base 600 may be distanced from the upright guide 604 so that the through-hole portion 628 has a substantially flat portion surrounding the upper opening. As will be described in further detail below, the through-hole portion 627 includes a through-hole 628 and configured to accommodate a fastener 606.

Figure 32:
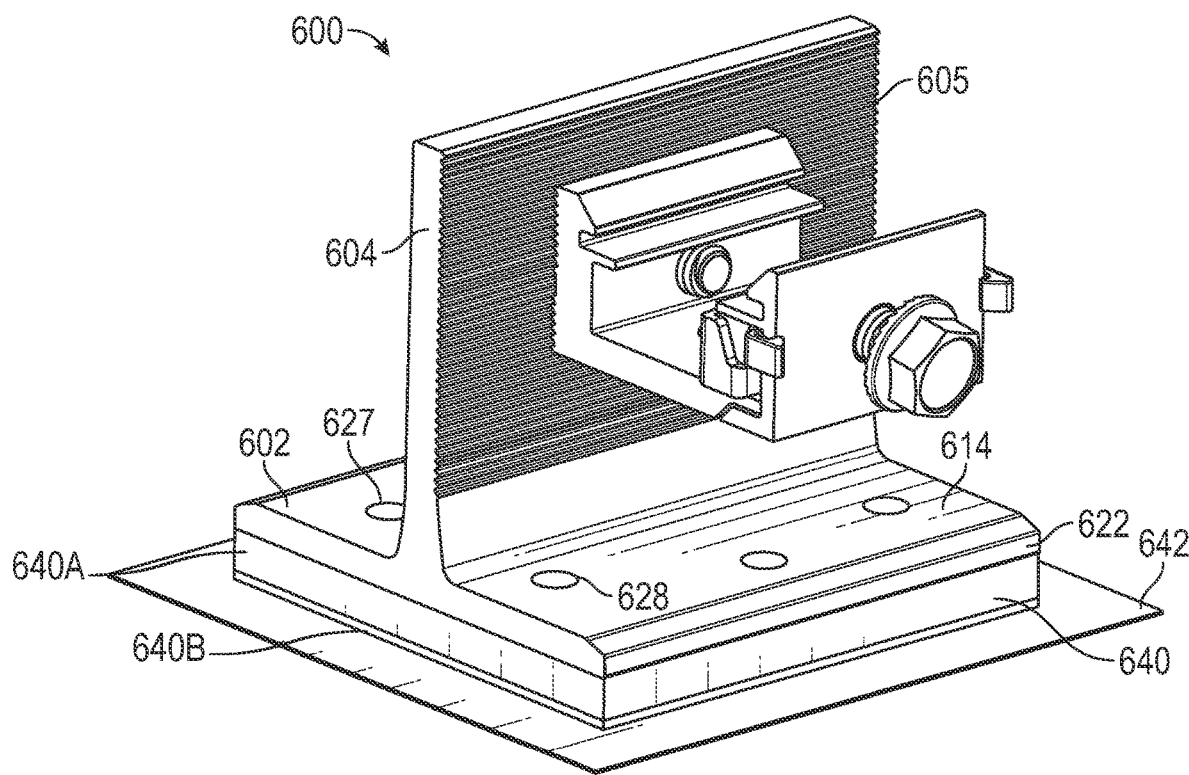
FIG. 32 is a top isometric view of a photovoltaic mount assembly in accordance with another aspect of the present disclosure.

As is shown in FIG. 32, the through-hole portion 628 extends at least partially extends through the base 602. Affixed to the bottom surface of the base 602 above the cavity 626 is a dual pad seal 640 which substantially fills cavity 626 within the inner face 622 of the containment flange 638 of base 602 .... The dual seal pad 640 may include a compression pad and/or a seal pad and may be formed of any appropriate material such as, e.g., foam, rubber, butyl, sealant tape, mastic, etc. The dual seal pad 640 includes a removable film layer 642, with the film layer 642 including a user-accessible pull tab 618. The film layer 642 is configured to protect an adhesive surface of the dual seal pad 640 until the mount assembly 600 is to be mounted to a roof surface. That is, when an installer is prepared to mount the mount assembly 600 in a desired location on a roof surface, the film layer 642 can be peeled away from the dual seal pad 640, thereby exposing the adhesive surface of dual seal pad 640. With the adhesive surface exposed, the installer can then simply apply the base 602 to a desired location on the roof surface (i.e., a "peel-and-stick" arrangement).

The mount assembly 600 further includes at least one fastener 606 and a washer 610. The washer 610 may be a two-part sealing washer comprised of a rigid portion and a compressible polymeric portion. The fastener 606 may be any appropriate fastener suitable for roof-mount applications such as, e.g., a threaded lag bolt, a threaded screw, a nail, a stake, etc. In the embodiment shown in FIG. 33, fastener 606 is a threaded lag bolt having a hexagonal head 608. However, it is to be understood that alternative driving head shapes and/or configurations could be utilized in accordance with the present disclosure. The fastener 606 is sized so as to pass through the through-hole 628 of the base 602. While FIG. 33 only illustrates a number of fastener 606 and through-holes 628, it is to be understood that the mount assembly in accordance with other embodiments could incorporate any amount of fastener and/or through-hole.

Figure 33:
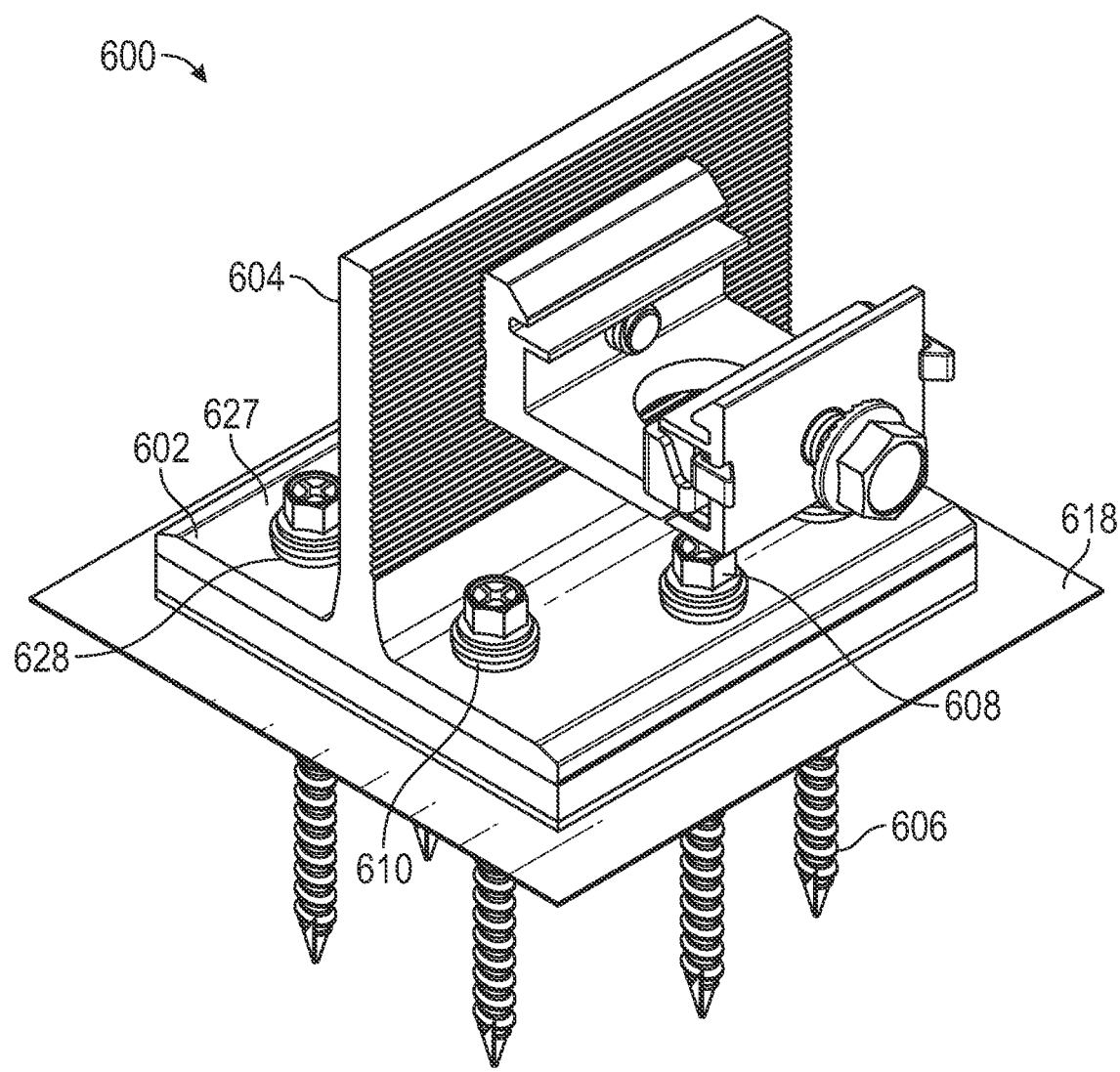
FIG. 33 is a top isometric view of the photovoltaic mount assembly of FIG. 32 with fasteners.
Figure 34:
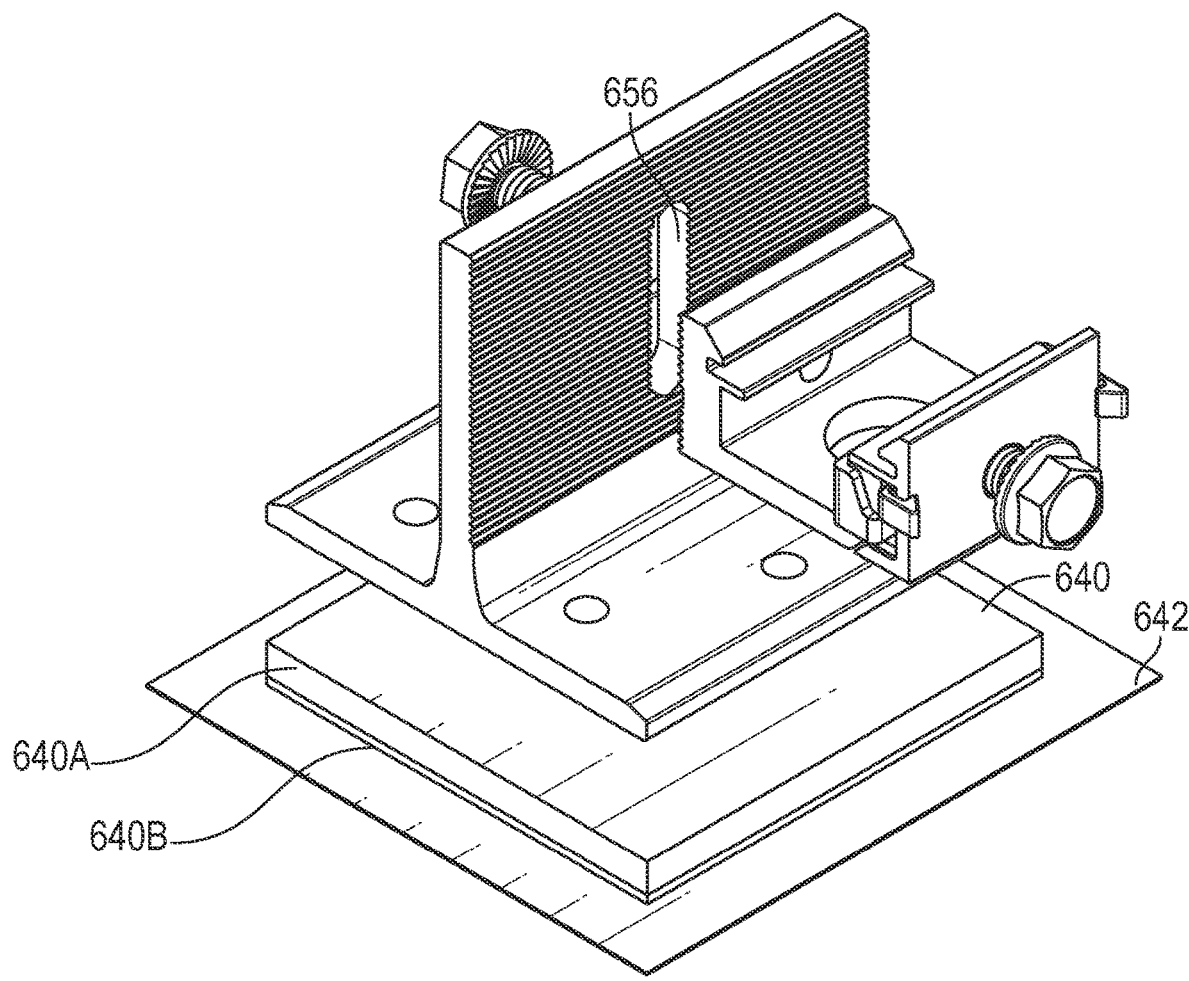
FIG. 34 is a partial exploded isometric view of the photovoltaic mount assembly of FIG. 32.
Figure 35:
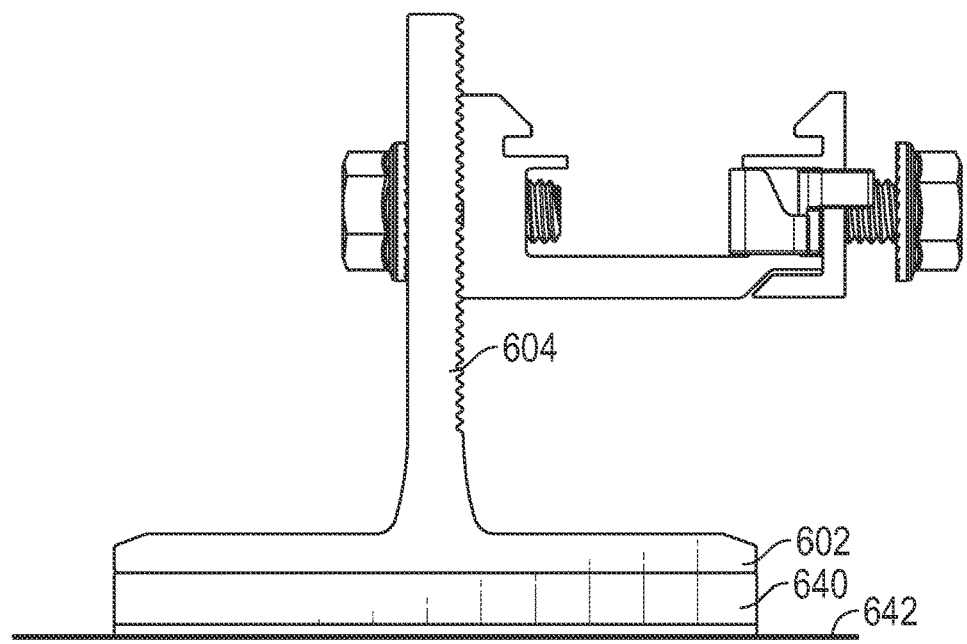
FIG. 35 is a side view of the photovoltaic mount assembly of FIG. 32.

As is shown in FIGS. 33-34 the base 602 has 6 through-holes 628 configured to receive fasteners 606. However, there may be more or less through-holes 628. There are 3 holes on each side of the upright guide 604, however there may be more or less holes in other embodiments. In FIG. 15, the through-holes 628 and mount 600 are oriented to enable the attachment of at least two fasteners 606 to the roof structural members if indeed the roof structural members are engaged.

When the mount 600 is rotated, the holes 628 do not align. Across the mounting surface each hole 628 is at unaligned location along the mounting surface. This ensures that if one of the fasteners 606 contacts a joint between sheathing members, e.g., Plywood or OSB board. The specific layout of the holes 628 and fasteners 606 ensures that a majority of the fasteners 606 can find a secure mounting location on the sheathing.

Containment flange 638 has a bottom surface which can act as a stop as the mount is installed and the base 602 approaches the roof surface. The dual seal pad 640 extends below the bottom surface of the containment flange 638 until the fastener is tightened and the base 602 is forced down to the roof surface compressing the dual seal pad 640 and urging the seal pad 640B onto the roof surface. This compression continues until the containment flange contacts the roof surface and the downward travel of the base 602 is sufficiently resisted. Thus, the containment flange 638 acts as a stop. The containment flange can additionally contain the dual seal pad 640 and the seal pad 640B to contain the flow or spread of the seal pad 640B material within the cavity 626, substantially beneath the base 602 and importantly around the areas of the through-hole portions 627 to substantially waterproof the mount 600 located at the potential surface attachment points.

The dual seal pad 640 includes a removable film layer 642, with the film layer 642 including a user-accessible pull tab 618. The film layer 642 is configured to protect an adhesive surface of the dual seal pad 640 until the mount assembly 600 is to be mounted to a roof surface. That is, when an installer is prepared to mount the mount assembly 600 in a desired location on a roof surface, the film layer 642 can be peeled away from the dual seal pad 640, thereby exposing the adhesive surface of dual seal pad 640. The seal pad 640 may be the Eternabond™ or any synthetic resins, thermoplastics, butyl, and non-curing rubber with a built-in primer or applicable primer. With the adhesive surface exposed, the installer can then simply apply the base 602A, 602A to a desired location on the roof surface (i.e., a "peel-and-stick" arrangement). The base 602A, 602A rest on the dual seal pad 640 when assembled and the bases 602A, 602A are fixed to the roof or surface. The dual seal pad 640 separates the bases 602A, 602B from the roof or surface, or at least partially.

Figure 36:
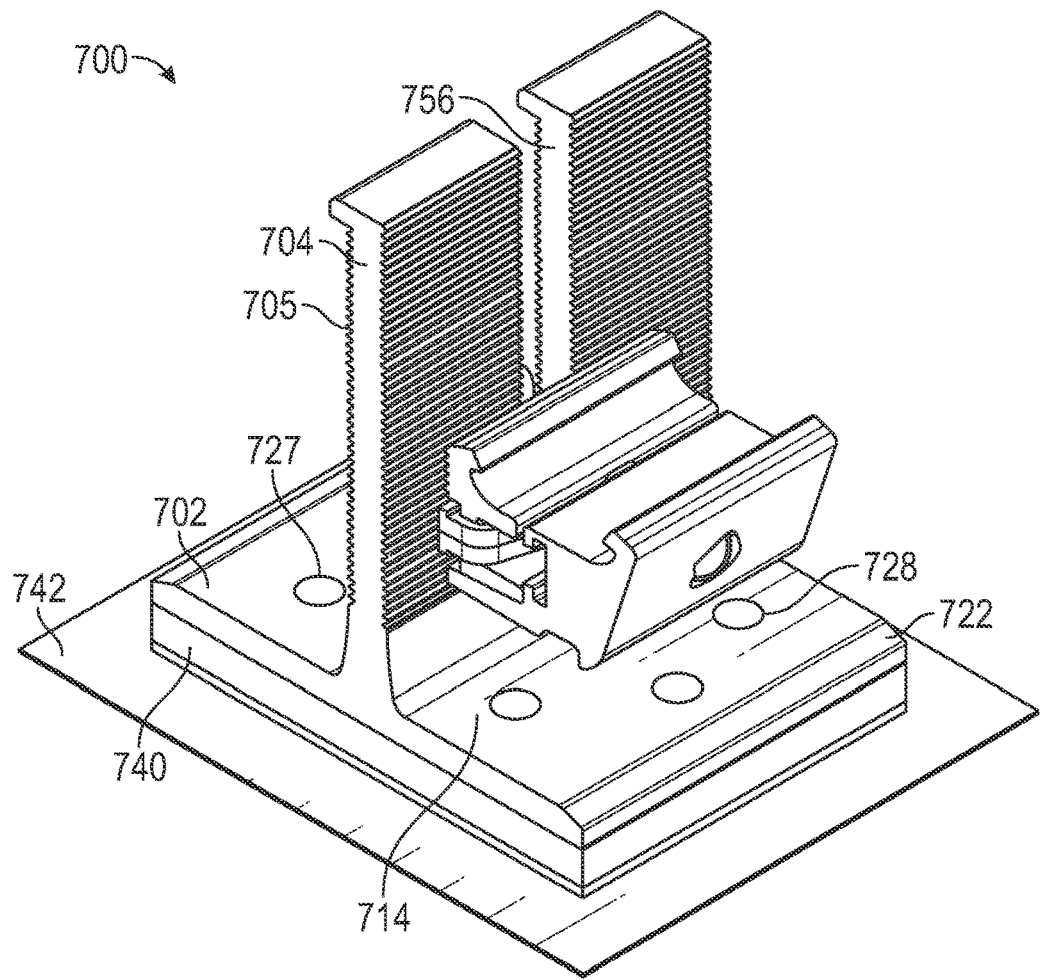
FIG. 36 is a top isometric view of a photovoltaic mount assembly in accordance with another aspect of the present disclosure.
Figure 37:
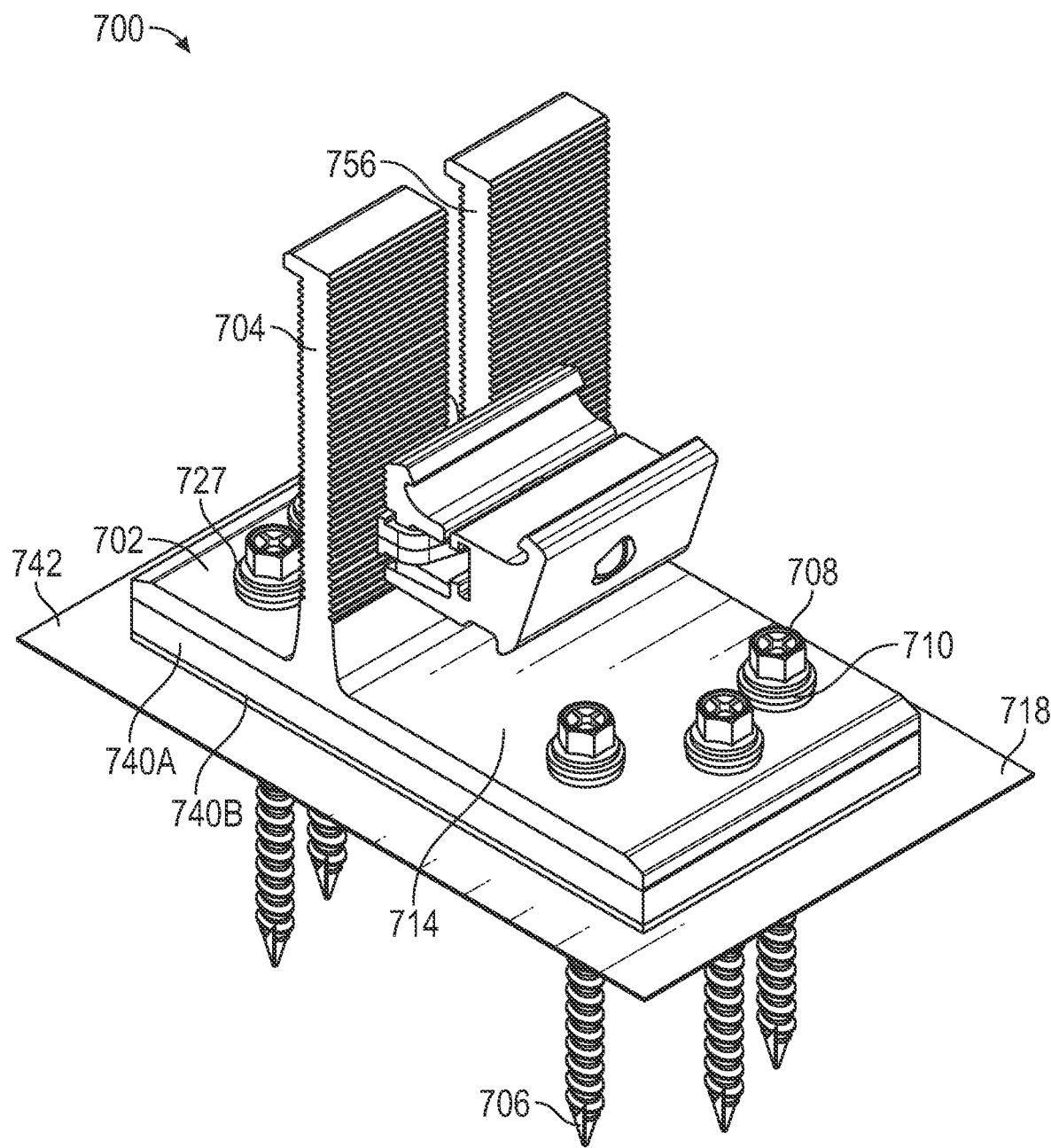
FIG. 37 is a top isometric view of the photovoltaic mount assembly of FIG. 36 with fasteners and an extended base.
Figure 38:
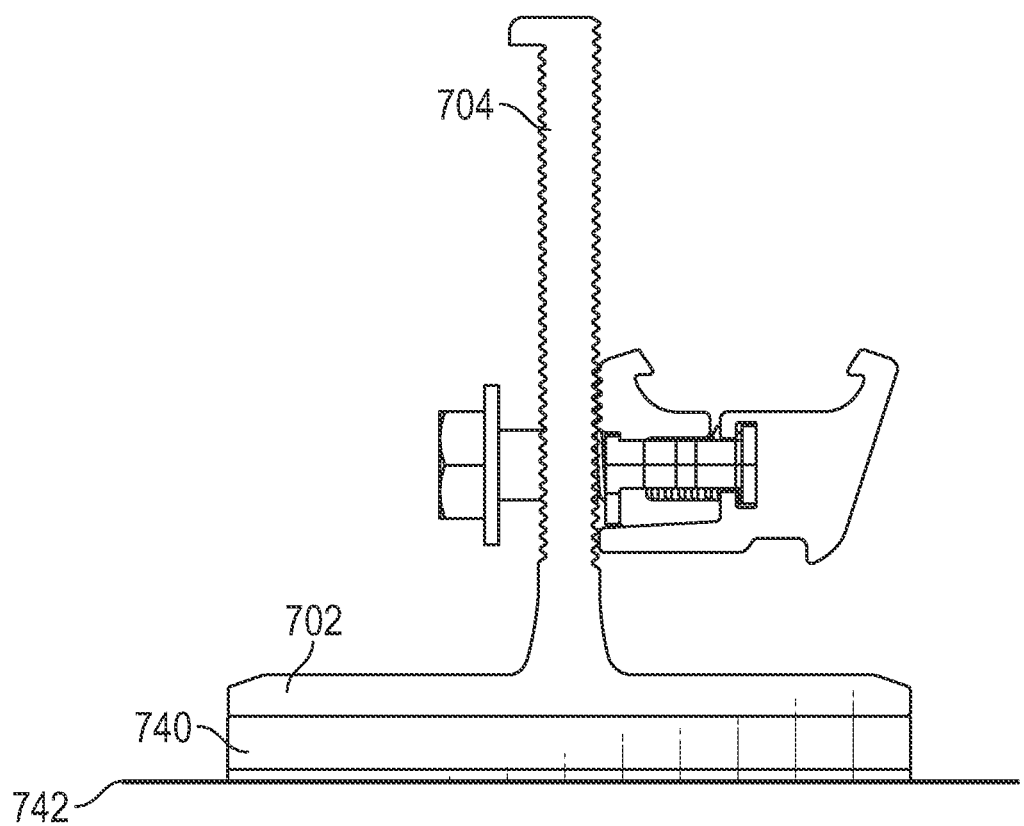
FIG. 38 is a side view of the photovoltaic mount assembly of FIG. 36.
Figure 39:
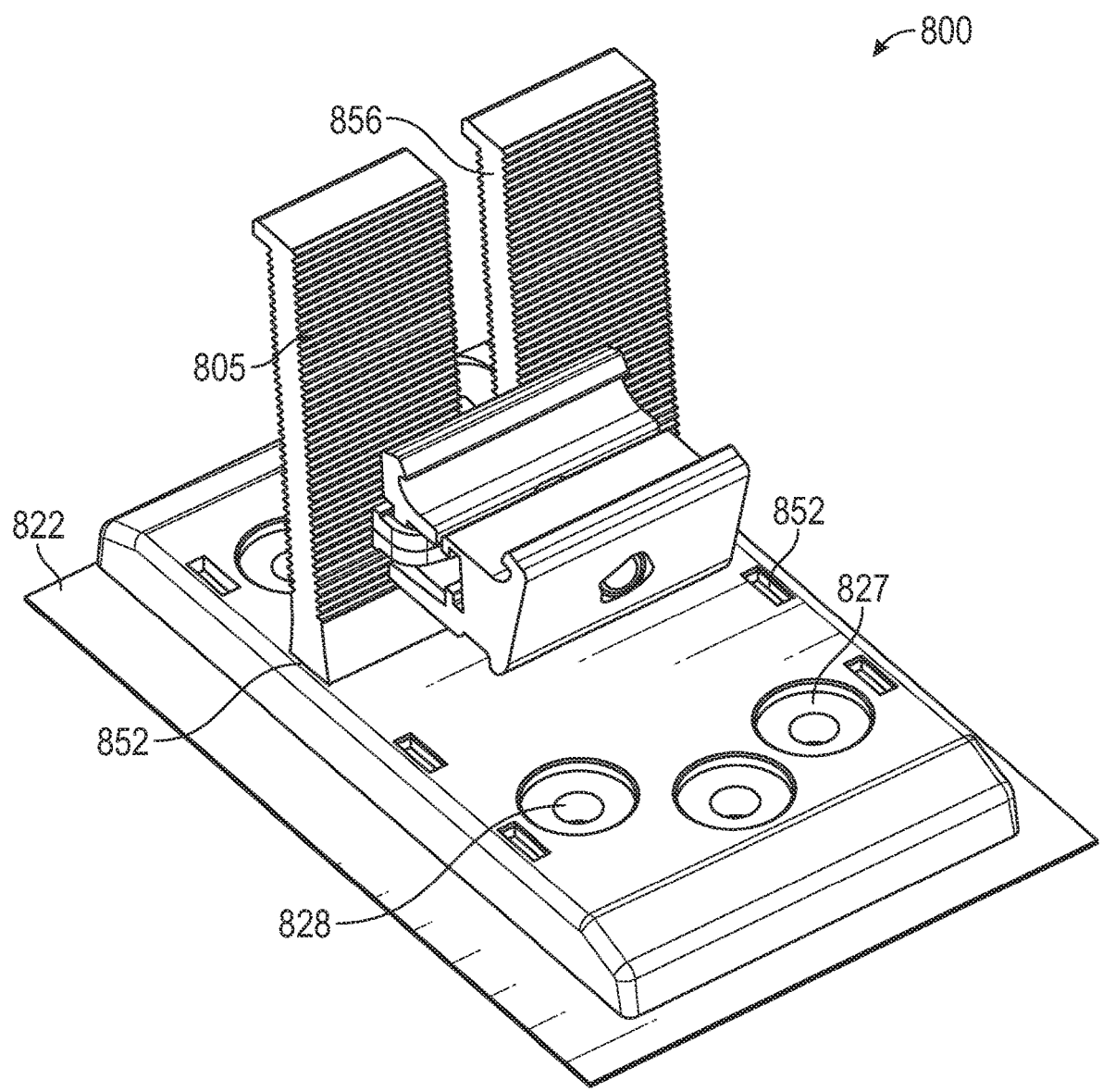
FIG. 39 is a top isometric view of a photovoltaic mount assembly in accordance with another aspect of the present disclosure.
Figure 40:
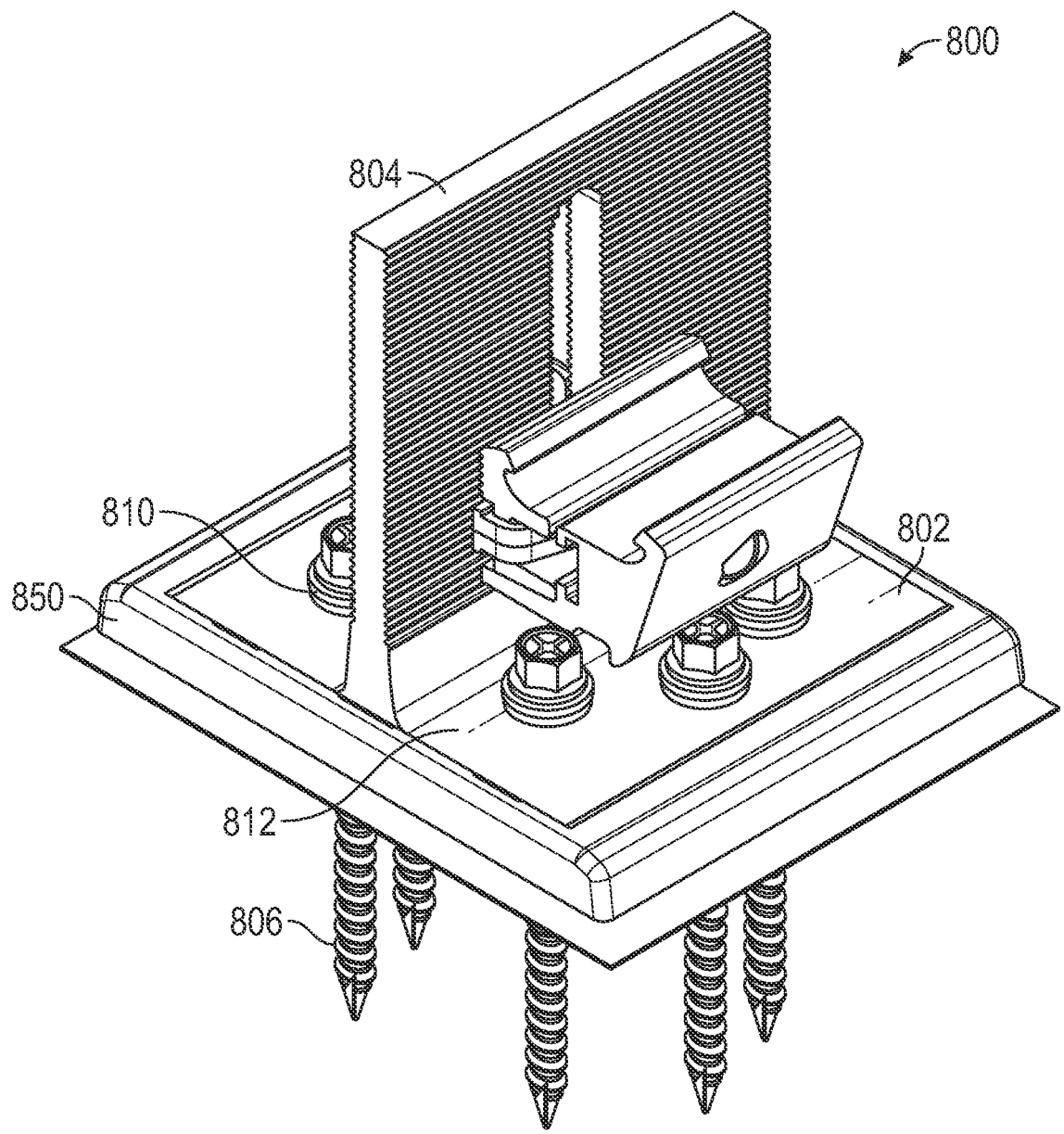
FIG. 40 is a top isometric view of the photovoltaic mount assembly of FIG. 39 with a square shaped base and another cover design.
Figure 41:
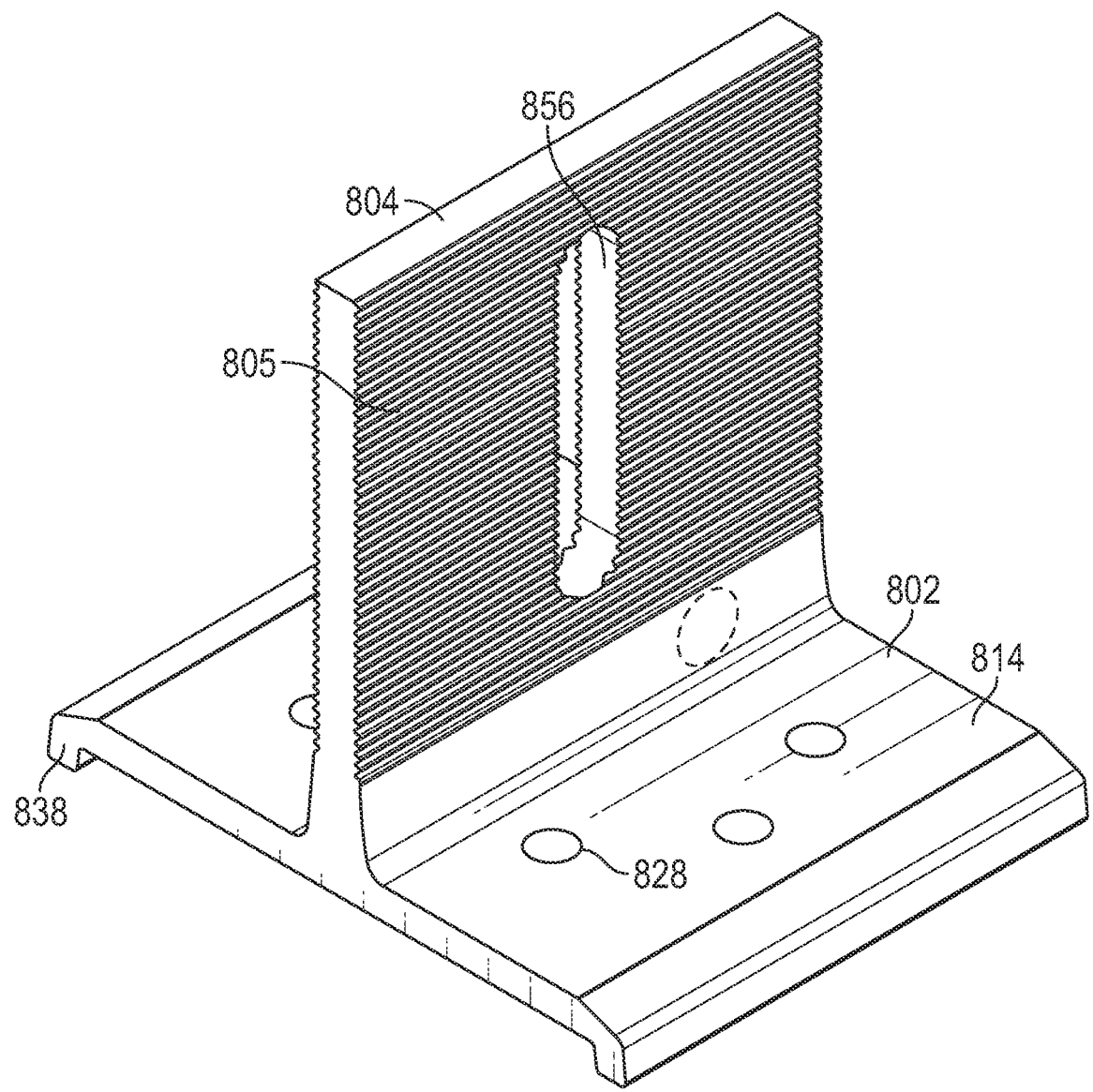
FIG. 41 is a top isometric view of the base and upright guide of the photovoltaic mount assembly of FIG. 39.

Next, referring to FIGS. 36-38, a flashing-free mount assembly 700 in accordance with another aspect of the present disclosure is illustrated. The mount assembly 700 includes a base 702 formed with a substantially rectangular-shaped footprint with two beveled sides. However, it is to be understood that base 702 is not limited to such a shape, and may be, e.g., oval, triangular, square, etc. The base 702 may be formed of any material of appropriate strength such as, e.g., aluminum, steel, plastic, polymer, etc.

Extending upward from the base 702 is an upright guide 704 that forms a member extending from opposing sides of the base 702, which in turn forms an aperture 756 therebetween. The upright guide 704 may be substantially U-shaped that forms a pair of members extending from opposing sides of the base 702, which in turn forms the aperture 756 therebetween. The upright guide 704 may extend the width of the base 702. The aperture 756 is sized and configured to accommodate a fastener (e.g., a nut and bolt assembly) couplable to a rail mount such that a photovoltaic rail guide can be selectively coupled to the mount assembly 700. Additionally, it is to be understood that the member of the guide 704 may include a plurality of horizontal ridges 705 extending along an inner and/or an outer face thereof, with such horizontal ridges 705 acting to retain the fastener more securely when tightened against the guide 704.

The base 702 further comprises a top surface 714. An upper opening of a through-hole portion 727 being located within the base 700 may be distanced from the upright guide 704 so that the through-hole portion 727 has a substantially flat portion surrounding the upper opening. As will be described in further detail below, the through-hole portion 727 includes a through-hole 728 and configured to accommodate a fastener 706.

As is shown in FIG. 37, the through-hole portion 728 extends at least partially extends through the base 702. Affixed below the bottom of base 702 is a dual seal pad 740. The dual seal pad 740 may be formed of any appropriate material such as, e.g., foam, rubber, butyl, sealant tape, mastic, etc. The dual seal pad 740 may include a seal pad, a compression pad, and a removable film layer 742, with the film layer 742 including a user-accessible pull tab 718. The film layer 742 is configured to protect an adhesive surface of the dual seal pad 740 until the mount assembly 700 is to be mounted to a roof surface. That is, when an installer is prepared to mount the mount assembly 700 in a desired location on a roof surface, the film layer 742 can be peeled away from the compression/seal pad 740, thereby exposing the adhesive surface of dual seal pad 740. With the adhesive surface exposed, the installer can then simply apply the base 702 to a desired location on the roof surface (i.e., a "peel-and-stick" arrangement).

The mount assembly 700 further includes at least one fastener 706 and a washer 710. The washer 710 may be a two-part sealing washer comprised of a rigid portion and a compressible polymeric portion. The fastener 706 may be any appropriate fastener suitable for roof-mount applications such as, e.g., a threaded lag bolt, a threaded screw, a nail, a stake, etc. In the embodiment shown in FIG. 38, fastener 706 is a threaded lag bolt having a hexagonal head 708. However, it is to be understood that alternative driving head shapes and/or configurations could be utilized in accordance with the present disclosure. The fastener 706 is sized so as to pass through the through-hole 728 of the base 702. While FIG. 37 only illustrates a single fastener 706 and through-hole 728, it is to be understood that the mount assembly in accordance with other embodiments could incorporate any amount of fasteners and/or through-holes.

The base 702 has 6 through-holes 728 configured to receive fasteners 706. However, there may be more or less through-holes 728. There are 3 holes on each side of the upright guide 704, however there may be more or less holes in other embodiments. In FIG. 37, the through-holes 728 and mount 700 are oriented to enable the attachment of at least two fasteners 706 to the roof structural members if indeed the roof structural members are engaged.

When the mount 700 is rotated, the holes 728 do not align. Across the mounting surface each hole 728 is at unaligned location along the mounting surface. This ensures that if one of the fasteners 706 contacts a joint between sheathing members, e.g., Plywood or OSB board. The specific layout of the holes 728 and fasteners 706 ensures that a majority of the fasteners 706 can find a secure mounting location on the sheathing.

Containment flange 738 has a bottom surface which can act as a stop as the mount is installed and the base 702 approaches the roof surface. The dual seal pad 740 extends below the bottom surface of the containment flange 738 until the fastener is tightened and the base 702 is forced down to the roof surface compressing the dual seal pad 740 and urging the seal pad 740B onto the roof surface. This compression continues until the containment flange contacts the roof surface and the downward travel of the base 702 is sufficiently resisted. Thus, the containment flange 738 acts as a stop. The containment flange can additionally contain the dual seal pad 740 and the seal pad 740B to contain the flow or spread of the seal pad 740B material within the cavity 726, substantially beneath the base 702 and importantly around the areas of the through-hole portions 727 to substantially waterproof the mount 700 located at the potential surface attachment points.

The dual seal pad 740 includes a removable film layer 742, with the film layer 742 including a user-accessible pull tab 718. The film layer 742 is configured to protect an adhesive surface of the dual seal pad 740 until the mount assembly 700 is to be mounted to a roof surface. That is, when an installer is prepared to mount the mount assembly 700 in a desired location on a roof surface, the film layer 742 can be peeled away from the dual seal pad 740, thereby exposing the adhesive surface of dual seal pad 740. The seal pad 740 may be the Eternabond™ or any synthetic resins, thermoplastics, butyl, and non-curing rubber with a built-in primer or applicable primer. With the adhesive surface exposed, the installer can then simply apply the base 702A, 702A to a desired location on the roof surface (i.e., a "peel-and-stick" arrangement). The base 702A, 702A rest on the dual seal pad 740 when assembled and the bases 702A, 702A are fixed to the roof or surface. The dual seal pad 740 separates the bases 702A, 702B from the roof or surface, or at least partially.

Next, referring to FIGS. 39-42, a flashing-free mount assembly 800 in accordance with another aspect of the present disclosure is illustrated. The mount assembly 800 includes a base 802 formed with a substantially square-shaped footprint. However, it is to be understood that base 802 is not limited to such a shape, and may be, e.g., oval, triangular, rectangular, etc. The base 802 may be formed of any material of appropriate strength such as, e.g., aluminum, steel, plastic, polymer, etc.

Extending upward from the base 802 is a substantially U-shaped guide 804 that forms a pair of members extending from opposing sides of the base 802, which in turn forms an aperture therebetween. The aperture is sized and configured to accommodate a fastener (e.g., a nut and bolt assembly) couplable to a rail mount such that a photovoltaic rail guide can be selectively coupled to the mount assembly 800. The upright guide 804 may be substantially U-shaped that forms a pair of members extending from opposing sides of the base 802, which in turn forms the aperture 856 therebetween. Additionally, it is to be understood that one or both of the pair of members of the guide 804 may include a plurality of horizontal ridges 805 extending along an inner and/or an outer face thereof, with such horizontal ridges 805 acting to retain the fastener more securely when tightened against the guide 804.

The base 802 further comprises a top surface 814. A substantially flat ledge 812 is formed on top surface 814, with an upper opening of a through-hole portion 827 being located within the ledge 812. As will be described in further detail below, the through-hole portion 827 includes a through-hole 828 and configured to accommodate a fastener.

As is shown in FIGS. 39, 40, and 44-46, the mount assembly 800 may include a covering 850. The covering 850 may be formed or shaped to cover the base 802 while allowing the guide 804 to extend through a cut out 852. The covering 850 may be formed on the top surface 814, with the upper opening of the through-hole portion 827 being located within the ledge 812, being accessible through a cut out 852. The covering 850 may at least cover the top surface 814 and may also be formed to drape or cover the sides of the base 802. Attachment cut out 854 may be used to fixably attach the covering 850 to the base 802. The covering 850 may attach to the base 802 by any other means. The covering 850 may be made of, but not limited to, rubber, plastic, a polymer, or metal.

As is shown in FIG. 41-44, the base 802 also includes a containment flange 838, which substantially surrounds at least two sides to form a cavity 826 within the base 802 with the rim 839 of the plastic cover 850. The through-hole portion 827 extends at least partially into the cavity 826. As will be described in further detail below, the cavity 826 is configured to hold a volume of water-resistant sealant (not shown) therein. The containment flange 838 may aid in the control of the applied pressure by acting as a stop along the perimeter when the sealant is applied. Further, the containment flange 838

Affixed to the bottom surface of the base 802 above the cavity 826 is a dual pad seal 840 which substantially fills cavity 826 within the inner face 822 of the containment flange 838 of base 802 . . . . The dual seal pad 840 may be formed of any appropriate material such as, e.g., foam, rubber, butyl, sealant tape, mastic, etc. The dual seal pad 840 includes a compression pad, a seal pad, and a removable film layer 842, with the film layer 842 including a user-accessible pull tab 818. The film layer 820 is configured to protect an adhesive surface of the dual seal pad 840 until the mount assembly 800 is to be mounted to a roof surface. That is, when an installer is prepared to mount the mount assembly 800 in a desired location on a roof surface, the film layer 842 can be peeled away from the dual seal pad 840, thereby exposing the adhesive surface of dual seal pad 840. With the adhesive surface exposed, the installer can then simply apply the base 802 to a desired location on the roof surface (i.e., a "peel-and-stick" arrangement).

The mount assembly 800 further includes a fastener 806 and a washer 810. The washer 810 may be a two-part sealing washer comprised of a rigid portion and a compressible polymeric portion. The fastener 806 may be any appropriate fastener suitable for roof-mount applications such as, e.g., a threaded lag bolt, a threaded screw, a nail, a stake, etc. In the embodiment shown in FIG. 40, fastener 806 is a threaded lag bolt having a hexagonal head 808. However, it is to be understood that alternative driving head shapes and/or configurations could be utilized in accordance with the present disclosure. The fastener 806 is sized so as to pass through the through-hole 828 of the base 802. While FIG. 42 only illustrates multiple fastener 806 and through-hole 828, it is to be understood that the mount assembly in accordance with other embodiments could incorporate any amount more than one fastener and/or through-hole.

Figure 42:
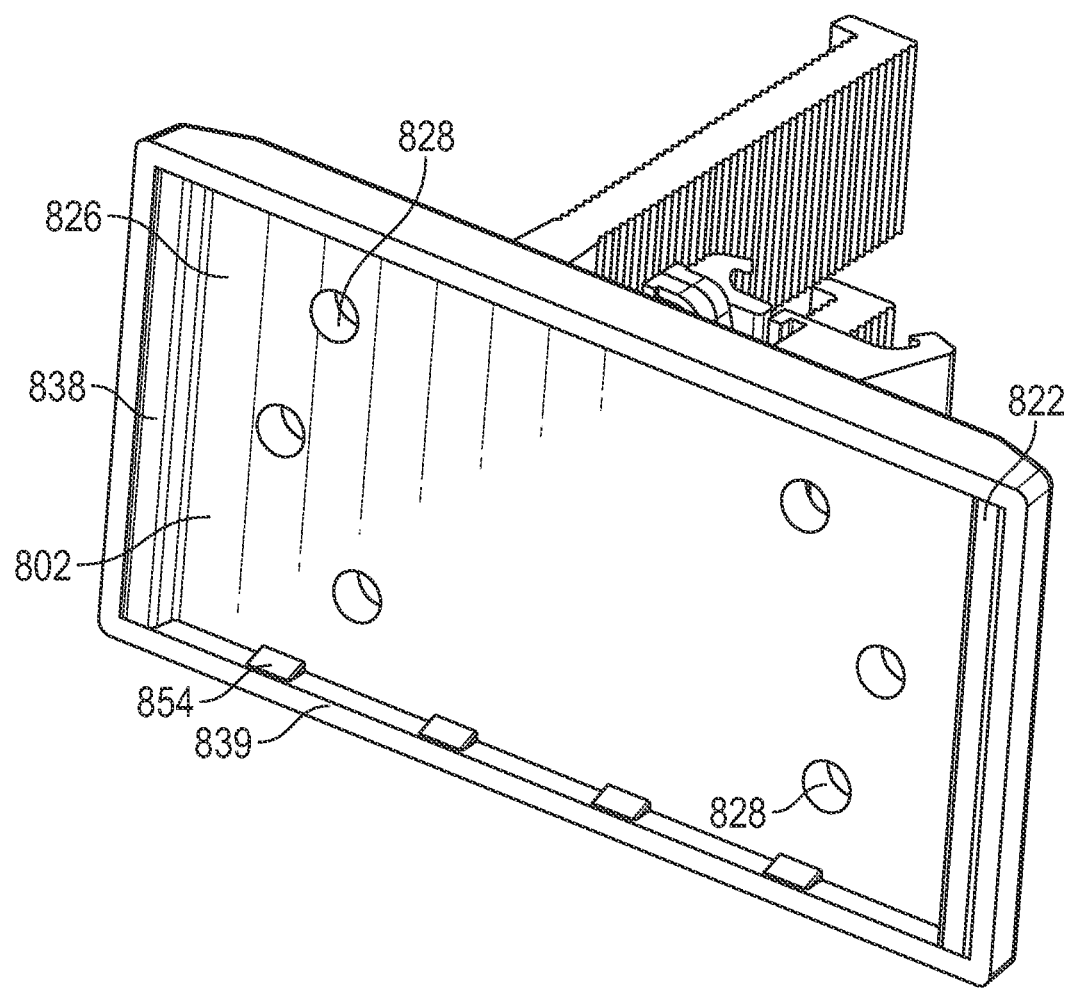
FIG. 42 is a bottom isometric view of the photovoltaic mount assembly of FIG. 39.
Figure 43:
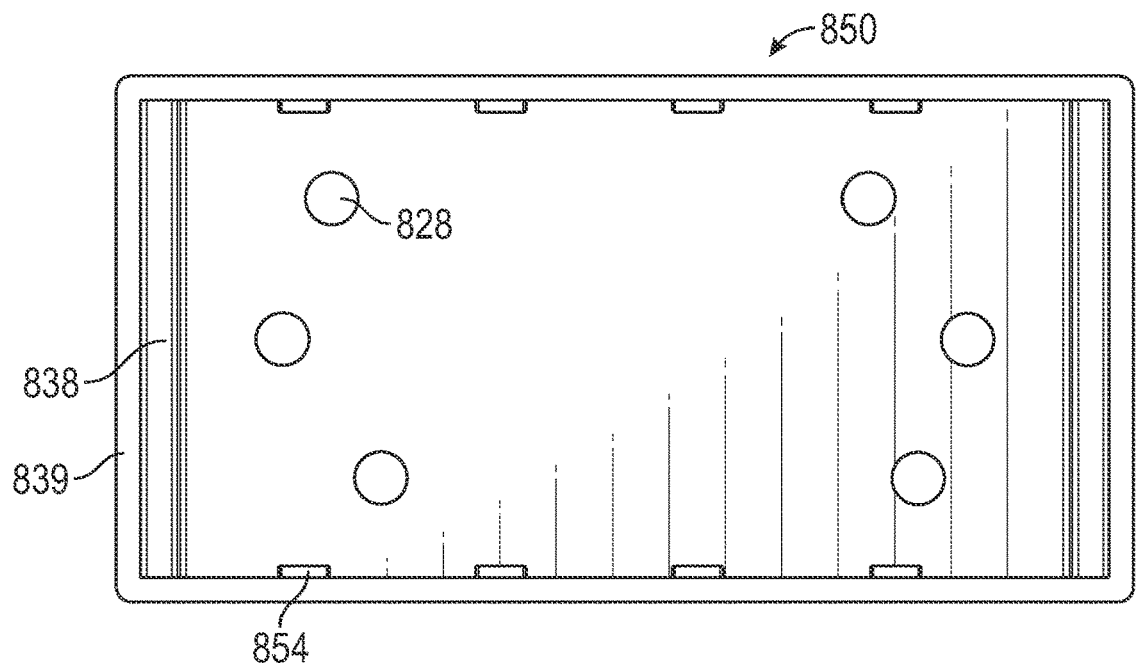
FIG. 43 is a bottom view of the covering of the photovoltaic mount assembly of FIG. 39.
Figure 44:
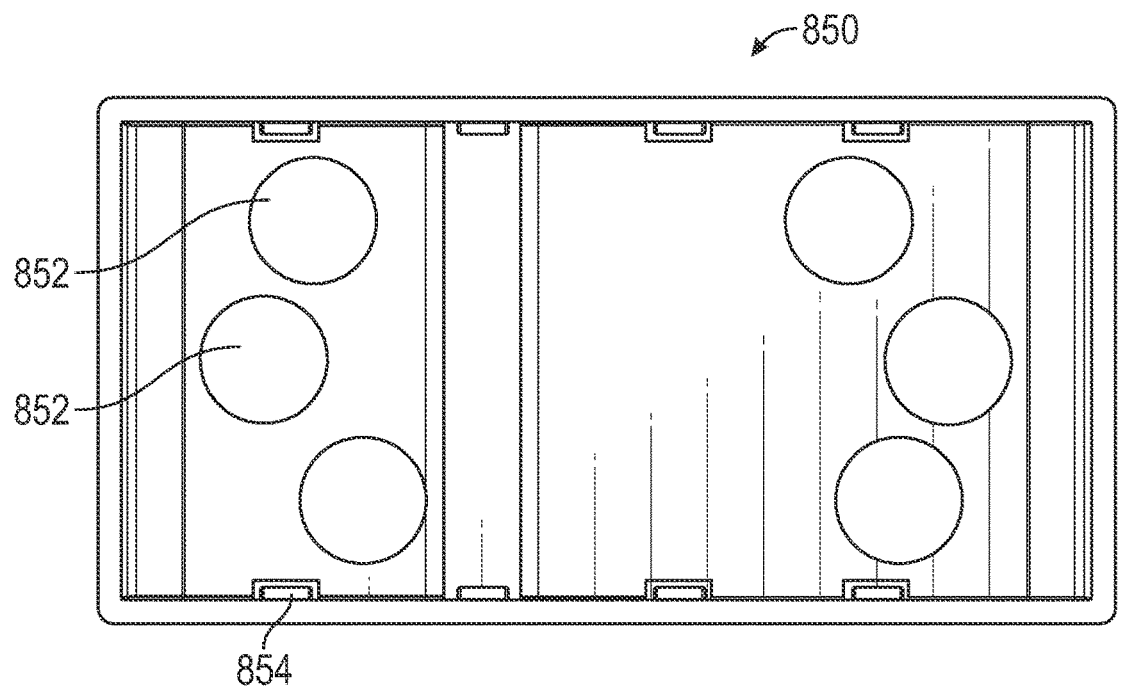
FIG. 44 is a bottom view of an alternative covering of the photovoltaic mount assembly of FIG. 39.
Figure 45:
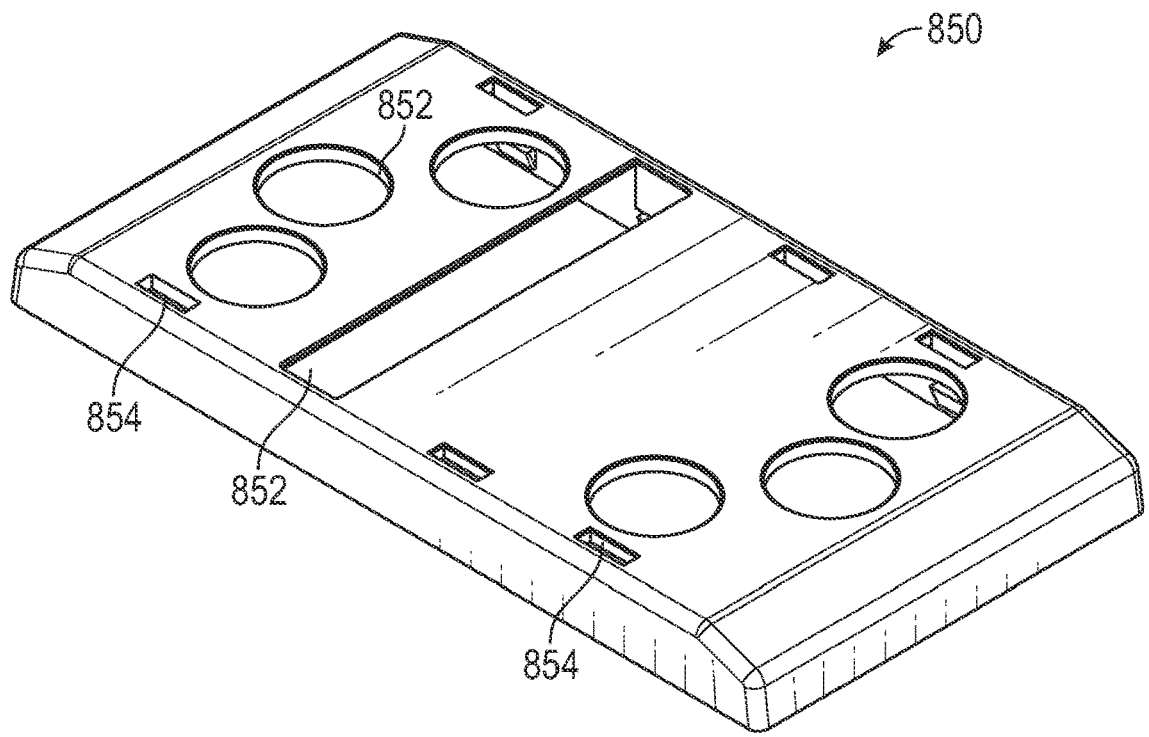
FIG. 45 is a top isometric view of the covering of the photovoltaic mount assembly of FIG. 39.
Figure 46:
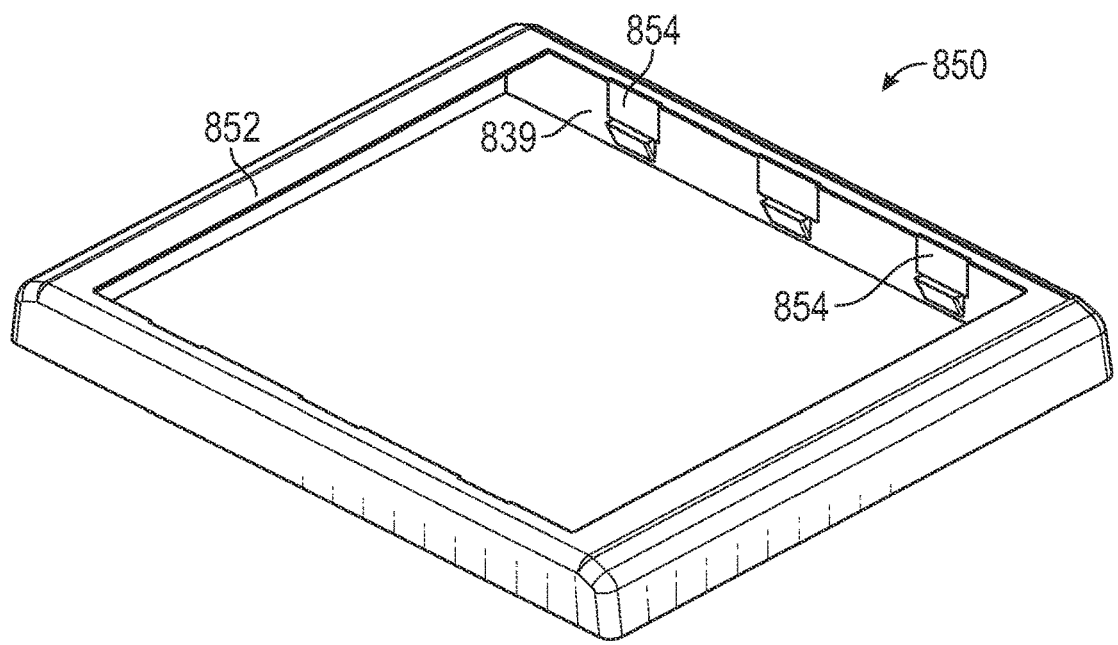
FIG. 46 is a top isometric view of the covering of the photovoltaic mount assembly of FIG. 40.
Figure 47:
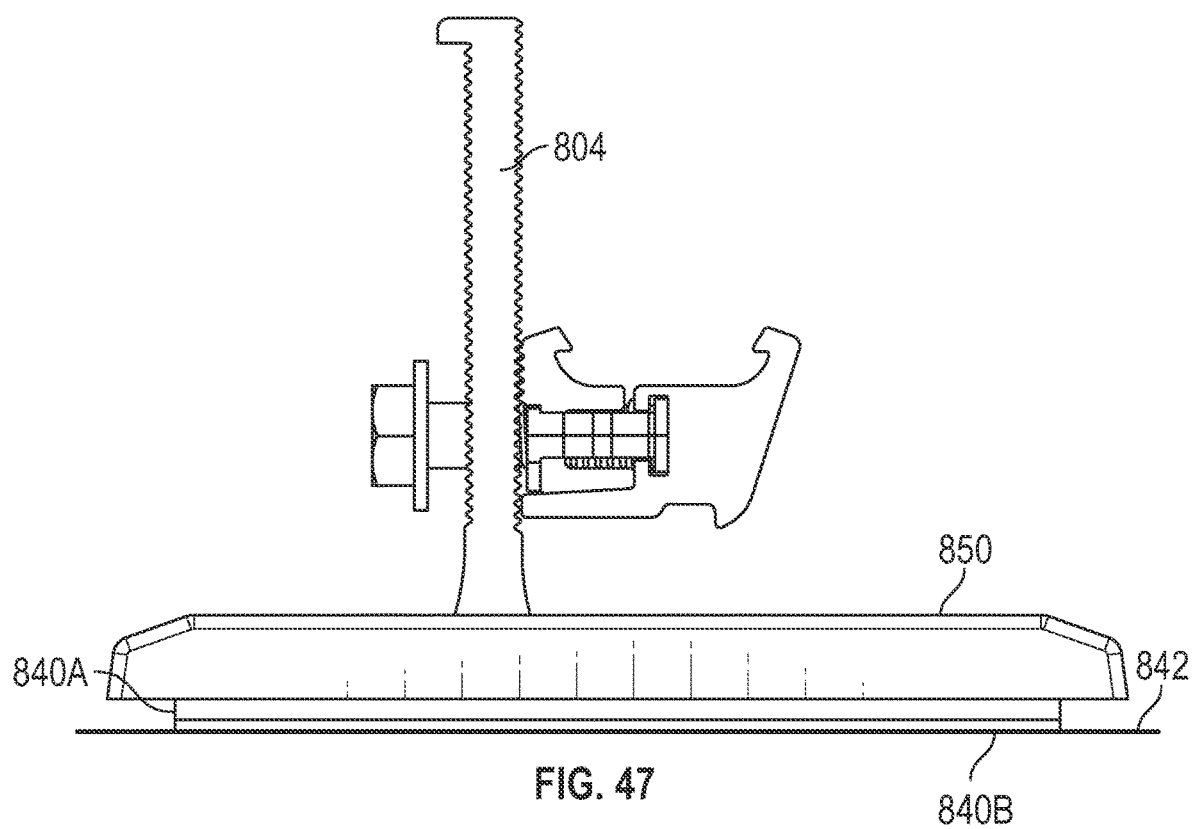
FIG. 47 is a side view of the photovoltaic mount assembly of FIG. 39.
Figure 48:
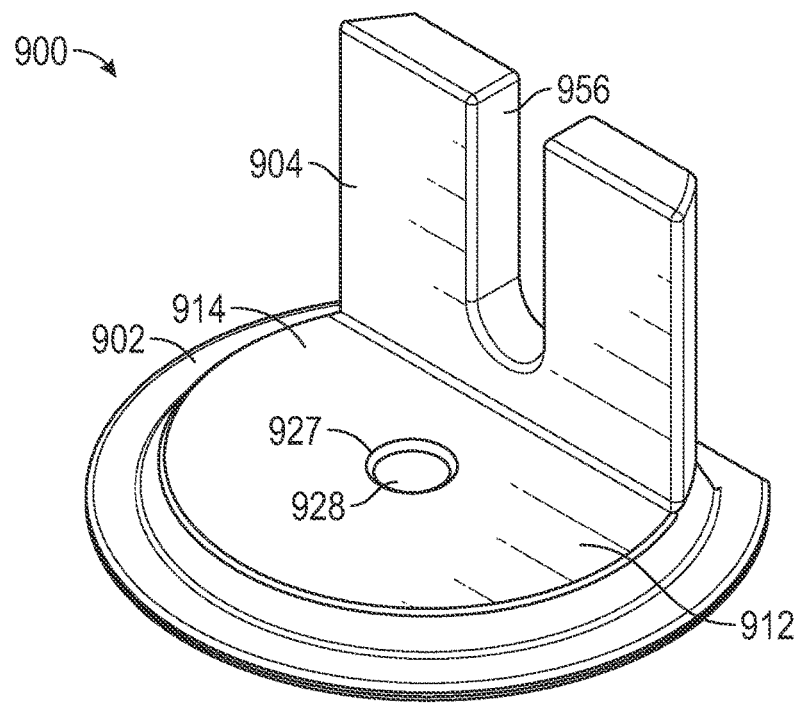
FIG. 48 is a top isometric view of a photovoltaic mount assembly in accordance with another aspect of the present disclosure.
Figure 49:
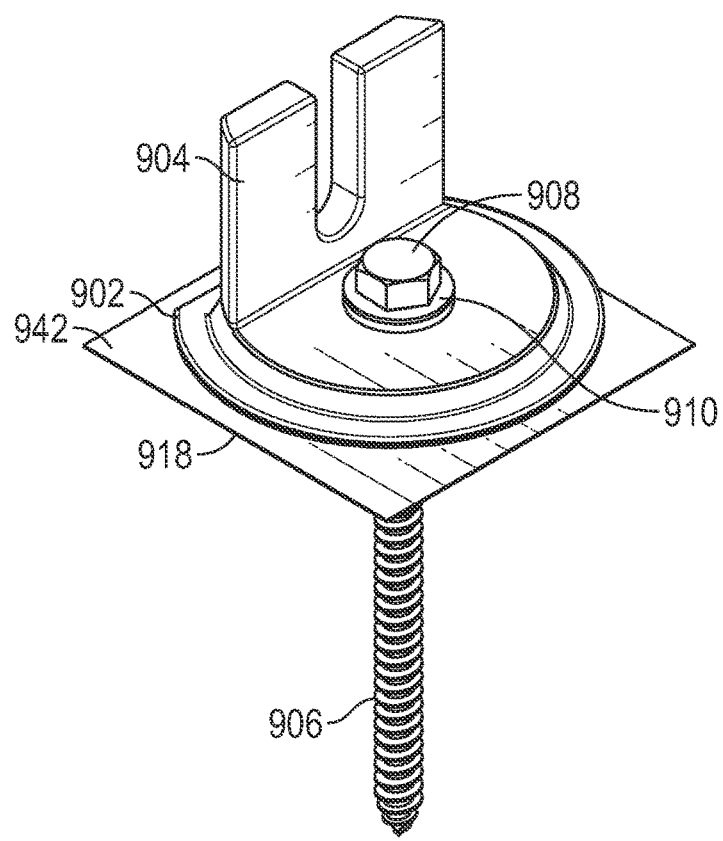
FIG. 49 is a top isometric view of the photovoltaic mount assembly of FIG. 48 with a fastener.

The base 802 has 6 through-holes 828 configured to receive fasteners 806. However, there may be more or less through-holes 828. There are 3 holes on each side of the upright guide 804, however there may be more or less holes in other embodiments. In FIG. 42, the through-holes 828 and mount 800 are oriented to enable the attachment of at least two fasteners 806 to the roof structural members if indeed the roof structural members are engaged.

When the mount 800 is rotated, the holes 828 do not align. Across the mounting surface each hole 828 is at unaligned location along the mounting surface. This ensures that if one of the fasteners 806 contacts a joint between sheathing members, e.g., Plywood or OSB board. The specific layout of the holes 828 and fasteners 806 ensures that a majority of the fasteners 806 can find a secure mounting location on the sheathing.

Containment flange 838 has a bottom surface which can act as a stop as the mount is installed and the base 802 approaches the roof surface. The dual seal pad 840 extends below the bottom surface of the containment flange 838 until the fastener is tightened and the base 802 is forced down to the roof surface compressing the dual seal pad 840 and urging the seal pad 840B onto the roof surface. This compression continues until the containment flange contacts the roof surface and the downward travel of the base 802 is sufficiently resisted. Thus, the containment flange 838 acts as a stop. The containment flange can additionally contain the dual seal pad 840 and the seal pad 840B to contain the flow or spread of the seal pad 840B material within the cavity 826, substantially beneath the base 802 and importantly around the areas of the through-hole portions 827 to substantially waterproof the mount 800 located at the potential surface attachment points.

The dual seal pad 840 includes a removable film layer 842, with the film layer 842 including a user-accessible pull tab 818. The film layer 842 is configured to protect an adhesive surface of the dual seal pad 840 until the mount assembly 800 is to be mounted to a roof surface. That is, when an installer is prepared to mount the mount assembly 800 in a desired location on a roof surface, the film layer 842 can be peeled away from the dual seal pad 840, thereby exposing the adhesive surface of dual seal pad 840. The seal pad 840 may be the Eternabond™ or any synthetic resins, thermoplastics, butyl, and non-curing rubber with a built-in primer or applicable primer. With the adhesive surface exposed, the installer can then simply apply the base 802A, 802A to a desired location on the roof surface (i.e., a "peel-and-stick" arrangement). The base 802A, 802A rest on the dual seal pad 840 when assembled and the bases 802A, 802A are fixed to the roof or surface. The dual seal pad 840 separates the bases 802A, 802B from the roof or surface, or at least partially.

Next, referring to FIGS. 48-53, a flashing-free mount assembly 900 in accordance with another aspect of the present disclosure is illustrated. The mount assembly 900 includes a base 902 formed with a substantially circular-shaped footprint. However, it is to be understood that base 902 is not limited to such a shape, and may be, e.g., oval, triangular, square, etc. The base 902 may be formed of any material of appropriate strength such as, e.g., aluminum, steel, plastic, polymer, etc.

Extending upward from the base 902 is a substantially U-shaped guide 904 that forms a pair of members extending from opposing sides of the base 902, which in turn forms an aperture 956 therebetween. The aperture 956 is sized and configured to accommodate a fastener (e.g., a nut and bolt assembly) couplable to a rail mount such that a photovoltaic rail guide can be selectively coupled to the mount assembly 900. Additionally, it is to be understood that one or both of the pair of members of the guide 904 may include a plurality of horizontal ridges extending along an inner and/or an outer face thereof, with such horizontal ridges acting to retain the fastener more securely when tightened against the guide 904.

The base 902 further comprises a top surface 914. A substantially flat ledge 912 is formed on top surface 914, with an upper opening of a through-hole portion 927 being located within or near the ledge 912. As will be described in further detail below, the through-hole portion 927 includes a through-hole 928 and configured to accommodate a fastener 910.

Figure 50:
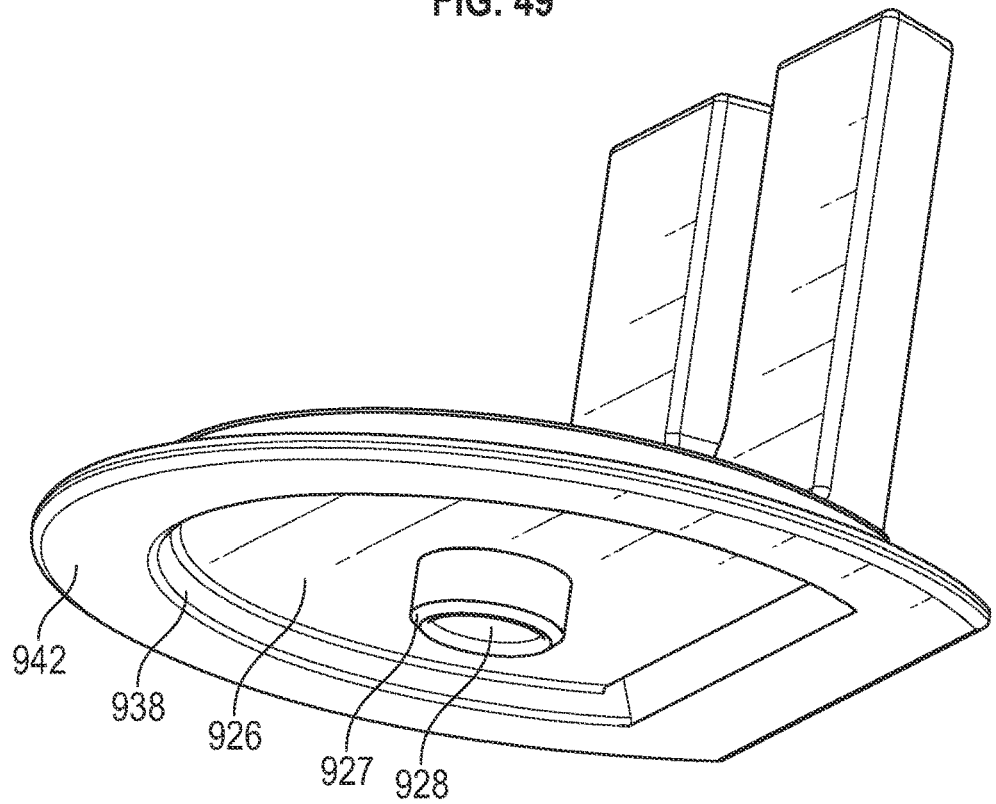
FIG. 50 is a bottom isometric view of the photovoltaic mount assembly of FIG. 48.
Figure 51:
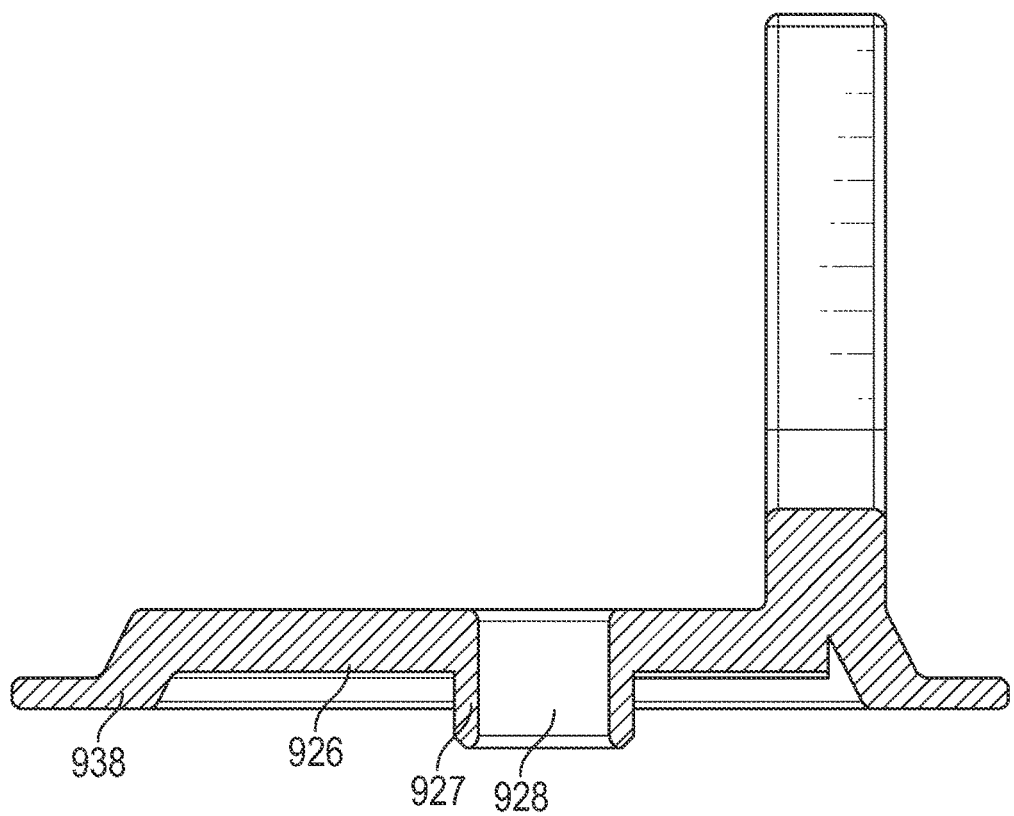
FIG. 51 is a cross sectional of the photovoltaic mount assembly of FIG. 48.
Figure 52:
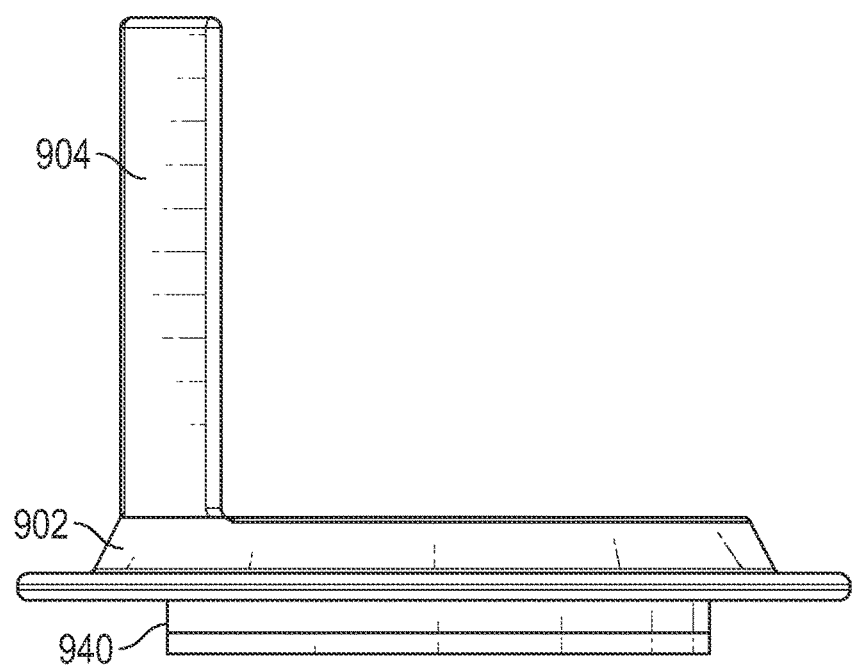
FIG. 52 is side view of the photovoltaic mount assembly of FIG. 48.
Figure 53:
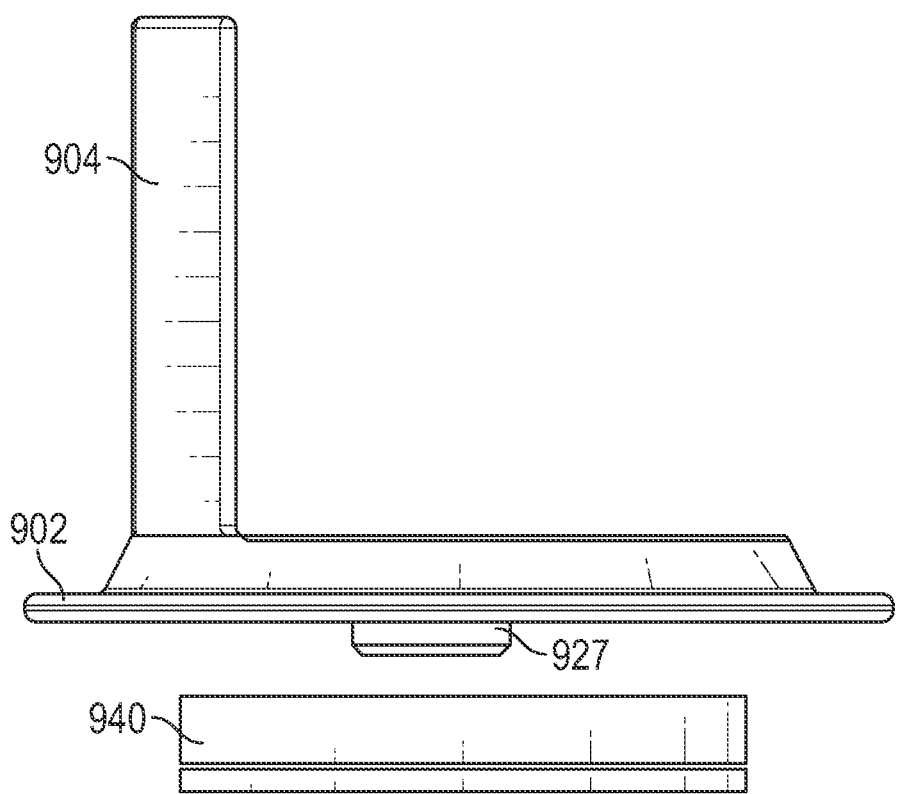
FIG. 53 is a partial exploded side view of the photovoltaic mount assembly of FIG. 48.
Figure 54:
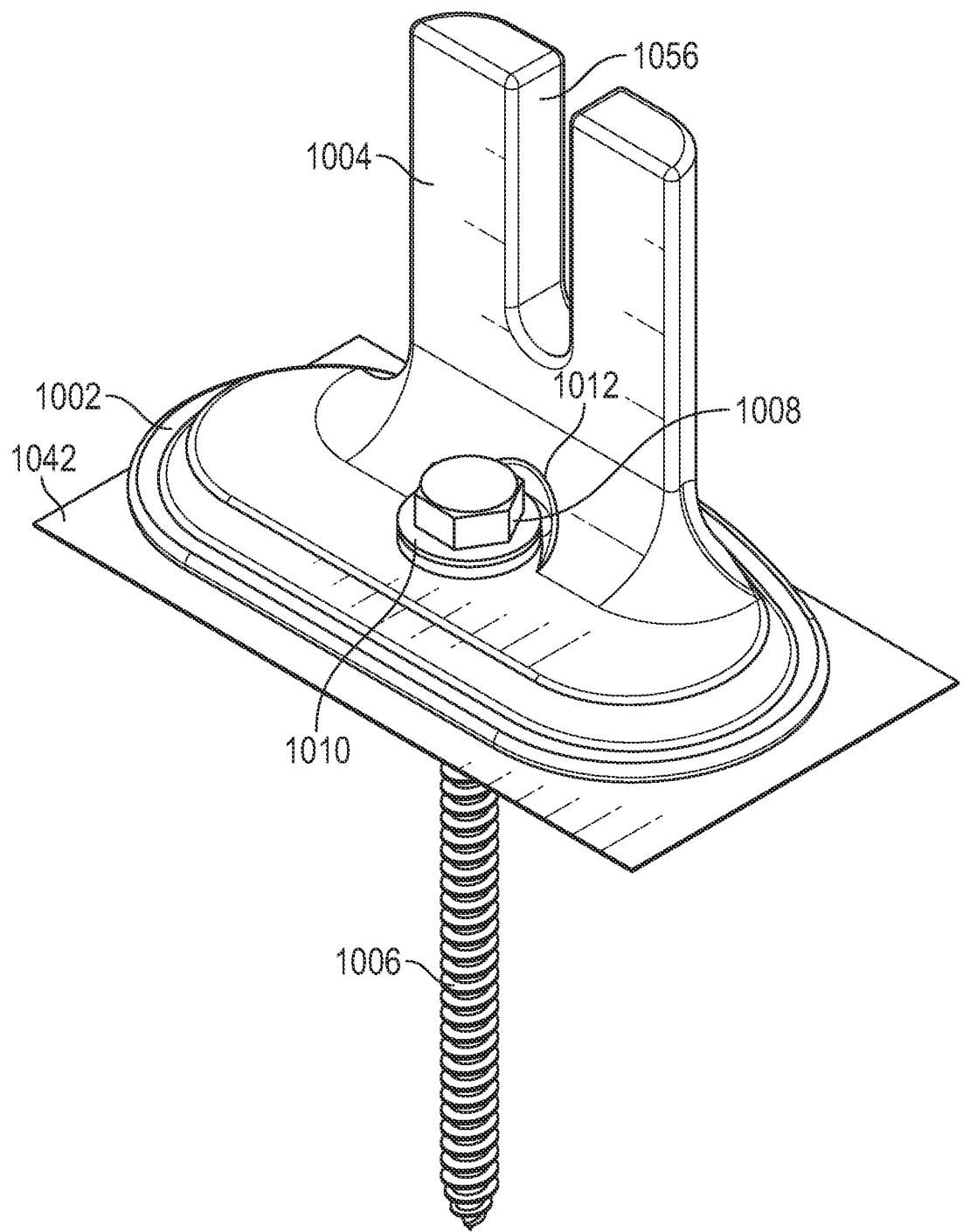
FIG. 54 is a top isometric view of a photovoltaic mount assembly in accordance with another aspect of the present disclosure.

As is shown in FIGS. 50-51, the base 902 also includes a containment flange 938, which substantially surrounds a cavity 926 formed within the base 902. The through-hole portion 927 extends at least partially into the cavity 926. As will be described in further detail below, the cavity 926 is configured to hold a volume of water-resistant sealant (not shown) therein. The containment flange 938 may aid in the control of the applied pressure by acting as a stop along the perimeter when the sealant is applied.

Affixed to the bottom surface of the base 902 above the cavity 926 is a dual pad seal 940 which substantially fills cavity 926 within the inner face 922 of the containment flange 938 of base 902. The dual seal pad 916 may be formed of any appropriate material such as, e.g., foam, rubber, butyl, sealant tape, mastic, etc. The dual seal pad 916 may include a seal pad, a compression pad, and a removable film layer 942, with the film layer 920 including a user-accessible pull tab 918. The film layer 920 is configured to protect an adhesive surface of the dual seal pad 916 until the mount assembly 900 is to be mounted to a roof surface. That is, when an installer is prepared to mount the mount assembly 900 in a desired location on a roof surface, the film layer 920 can be peeled away from the dual seal pad 916, thereby exposing the adhesive surface of the dual seal pad 916. With the adhesive surface exposed, the installer can then simply apply the base 902 to a desired location on the roof surface (i.e., a "peel-and-stick" arrangement).

The mount assembly 900 further includes a fastener 906 and a washer 910. The washer 910 may be a two-part sealing washer comprised of a rigid portion and a compressible polymeric portion. The fastener 906 may be any appropriate fastener suitable for roof-mount applications such as, e.g., a threaded lag bolt, a threaded screw, a nail, a stake, etc. In the embodiment shown in FIG. 53, fastener 906 is a threaded lag bolt having a hexagonal head 908. However, it is to be understood that alternative driving head shapes and/or configurations could be utilized in accordance with the present disclosure. The fastener 906 is sized so as to pass through the through-hole 928 of the base 902. While FIG. 49 only illustrates a single fasteners 906 and through-hole 928, it is to be understood that the mount assembly in accordance with other embodiments could incorporate more than one fastener and/or through-hole.

Figure 60:
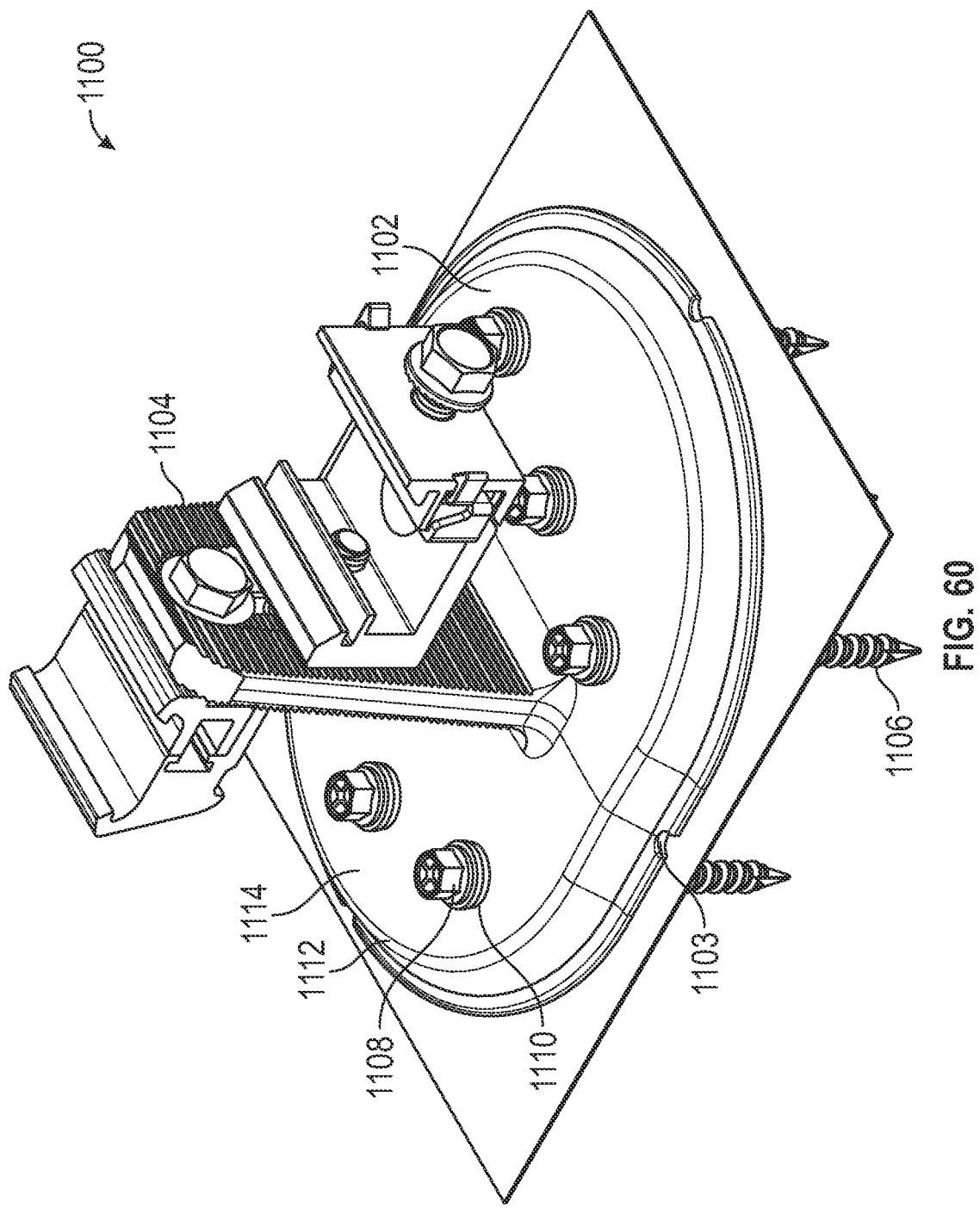
FIG. 60 is a top isometric view of the photovoltaic mount assembly of FIG. 59 with an alternative shaped base.
Figure 61:
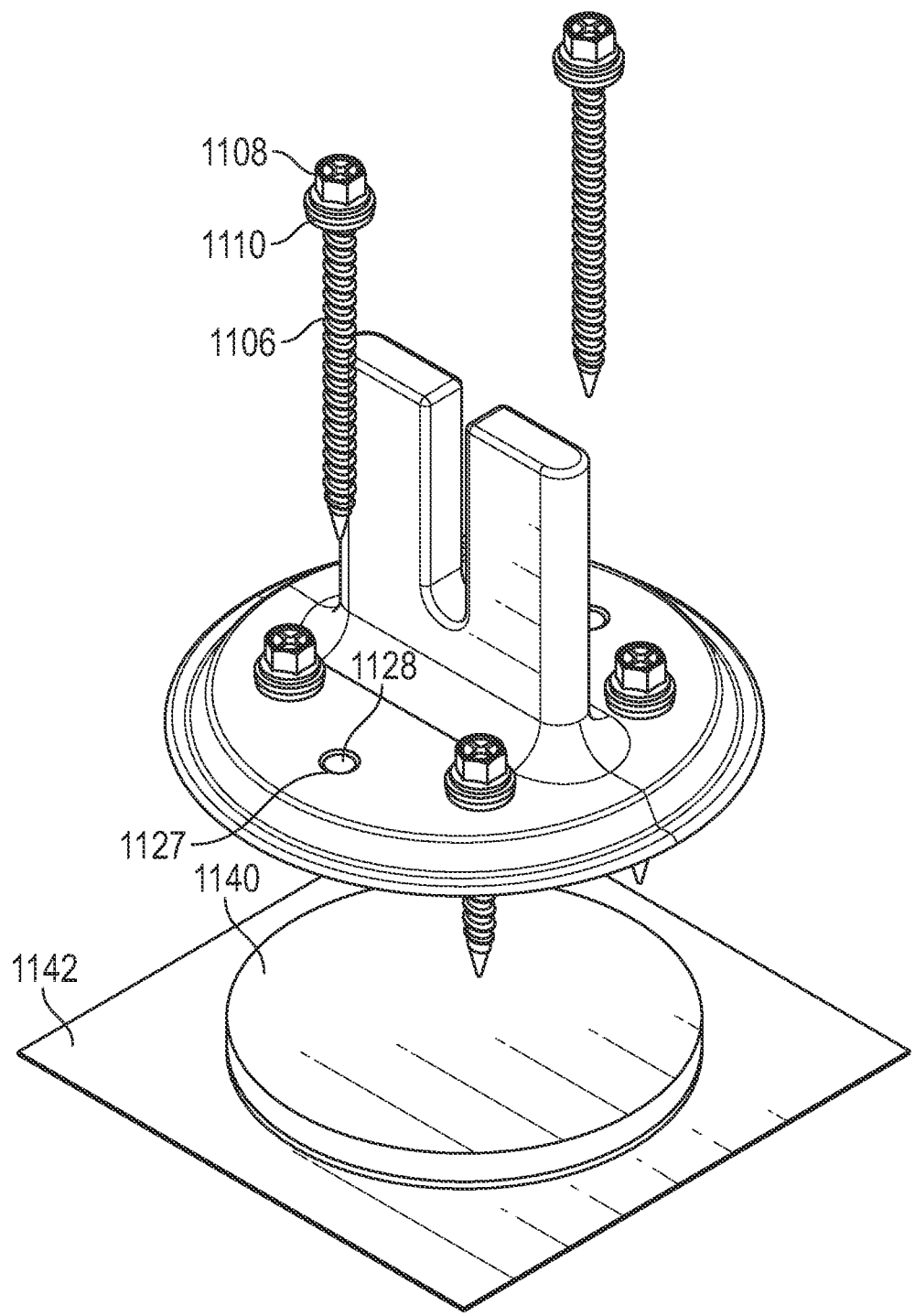
FIG. 61 is a partial exploded top isometric view of the photovoltaic mount assembly of FIG. 59.
Figure 62:
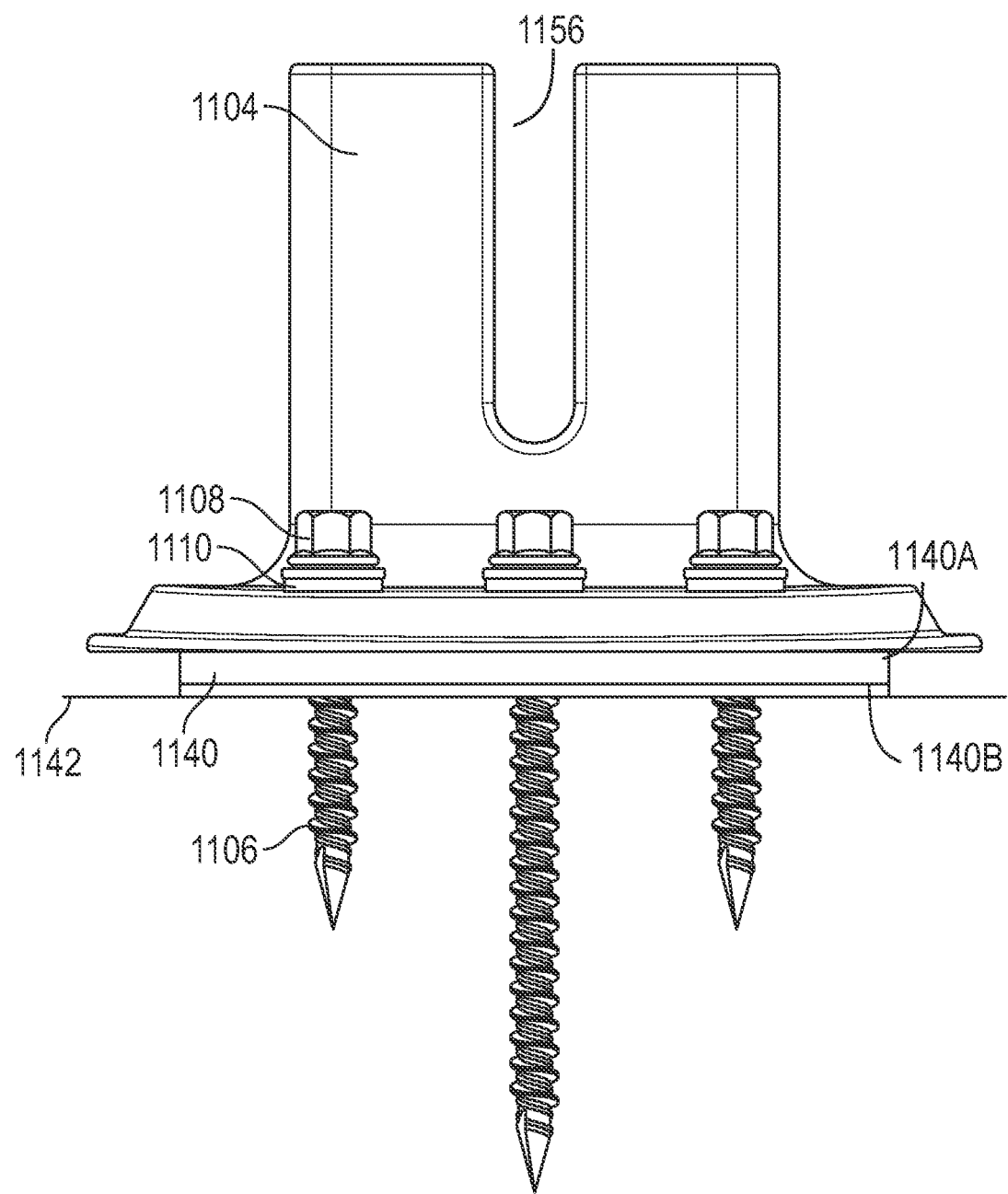
FIG. 62 is a front view of the photovoltaic mount assembly of FIG. 59.

Next, referring to FIGS. 54-58, a flashing-free mount assembly 1000 in accordance with another aspect of the present disclosure is illustrated. The mount assembly 1000 includes a base 1002 formed with a substantially circular-shaped footprint. However, it is to be understood that base 1002 is not limited to such a shape, and may be, e.g., oval, triangular, square, etc. The base 1002 may be formed of any material of appropriate strength such as, e.g., aluminum, steel, plastic, polymer, etc. The perimeter of the base 1002 may include notches 1003 as illustrated in FIG. 60, configured to aid an installer in measuring and marking an appropriate attachment location.

Extending upward from the base 1002 is a substantially U-shaped guide 1004 that forms a pair of members extending from opposing sides of the base 1002, which in turn forms an aperture 1056 therebetween. The aperture 1056 is sized and configured to accommodate a fastener 1006 (e.g., a nut and bolt assembly) couplable to a rail mount such that a photovoltaic rail guide can be selectively coupled to the mount assembly 1000. Additionally, it is to be understood that one or both of the pair of members of the guide 1004 may include a plurality of horizontal ridges extending along an inner and/or an outer face thereof, with such horizontal ridges acting to retain the fastener 1006 more securely when tightened against the guide 1004.

Figure 55:
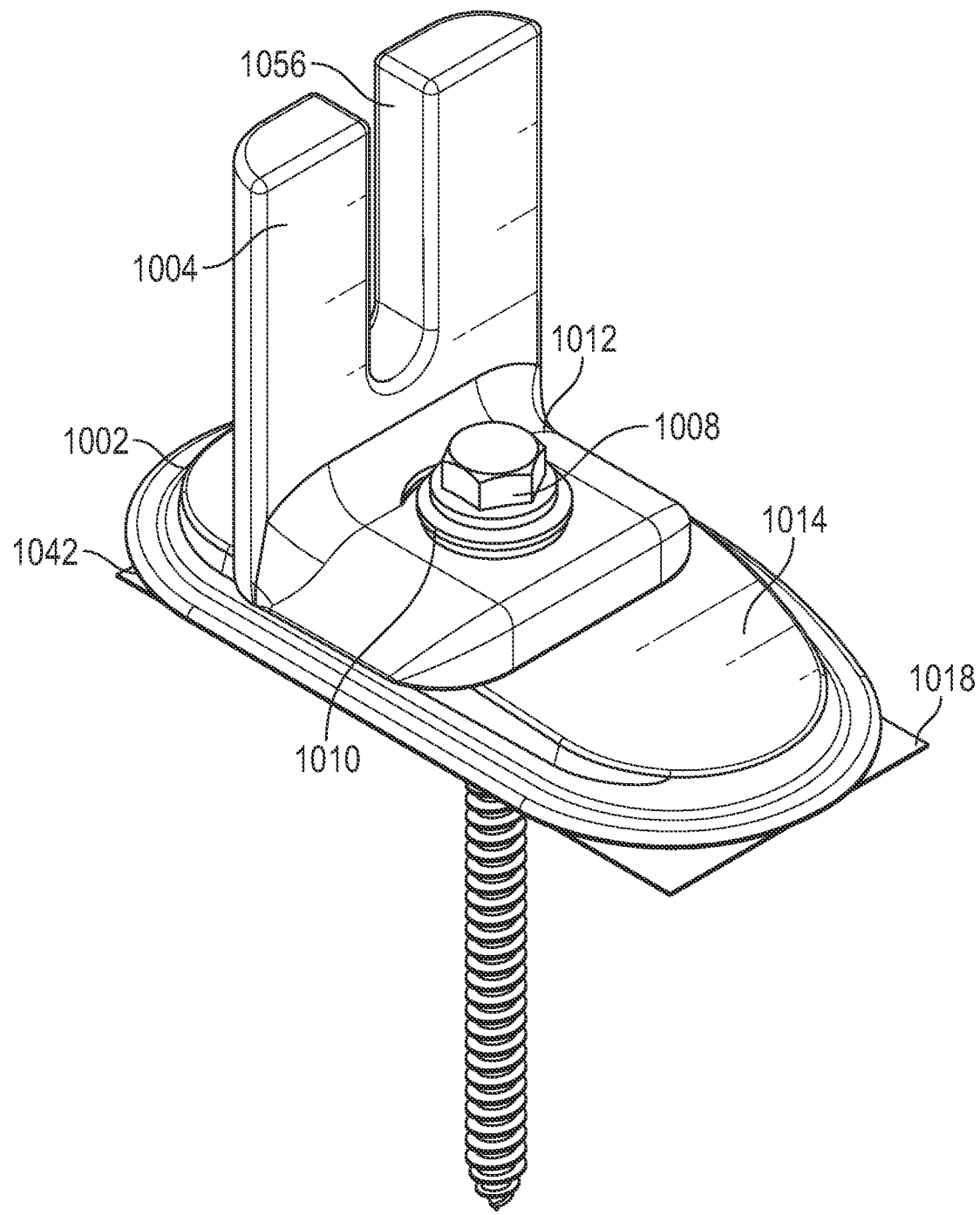
FIG. 55 is a top isometric view of the photovoltaic mount assembly of FIG. 54 with the upright guide rotated.

The base 1002 further comprises a top surface 1014. A substantially flat ledge 1012 is formed on top surface 1014, with an upper opening of a through-hole portion 1027 being located within the ledge 1012. As will be described in further detail below, the through-hole portion 1028 includes a through-hole 1028 and configured to accommodate a fastener. The U-shaped guide 1004 may be separated from base 1002. Guide 1004 may rotate or be removably fixed to base 1002 at the top surface 1014, as illustrated in FIG. 55. This advantageously allows for an increased flexibility and range with attaching a rail or similar device. Further, this advantageously allows for variance and movement due to thermal expansion.

Figure 56:
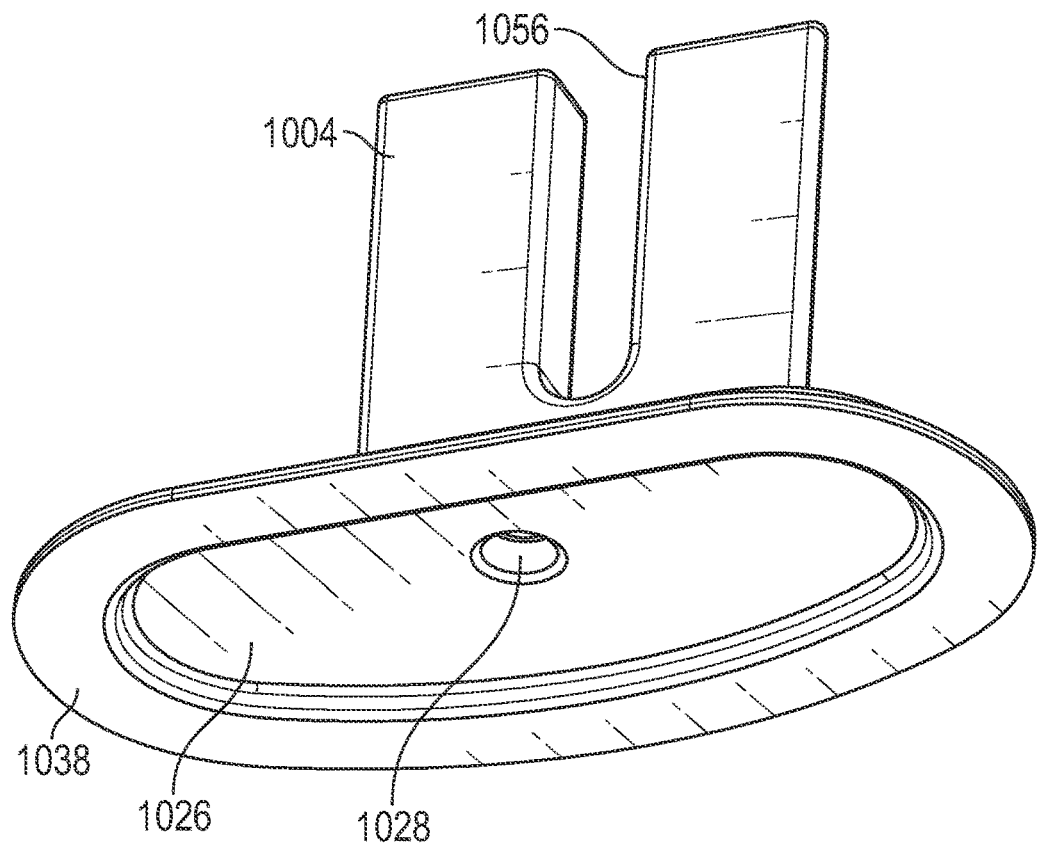
FIG. 56 is a bottom isometric view of the photovoltaic mount assembly of FIG. 54.
Figure 57:
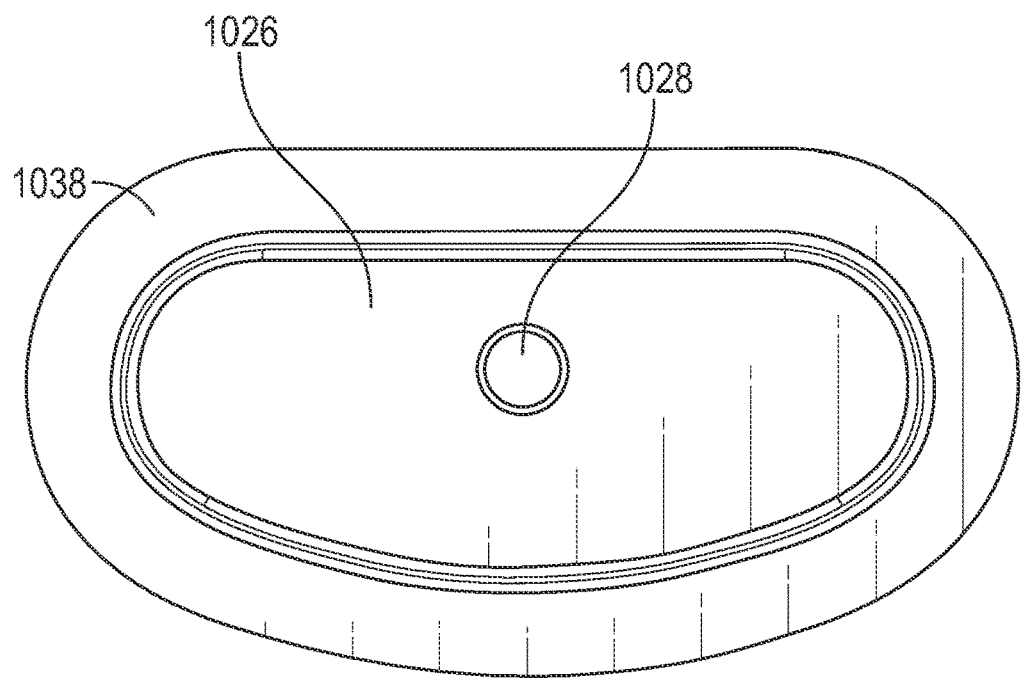
FIG. 57 is a bottom view of the photovoltaic mount assembly of FIG. 54.
Figure 58:
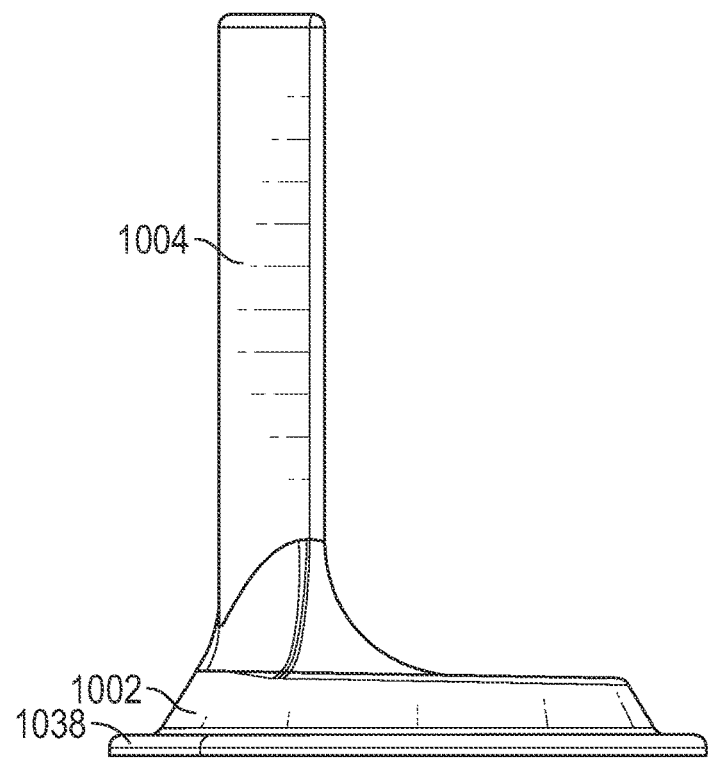
FIG. 58 is a side view of the photovoltaic mount assembly of FIG. 54.
Figure 59:
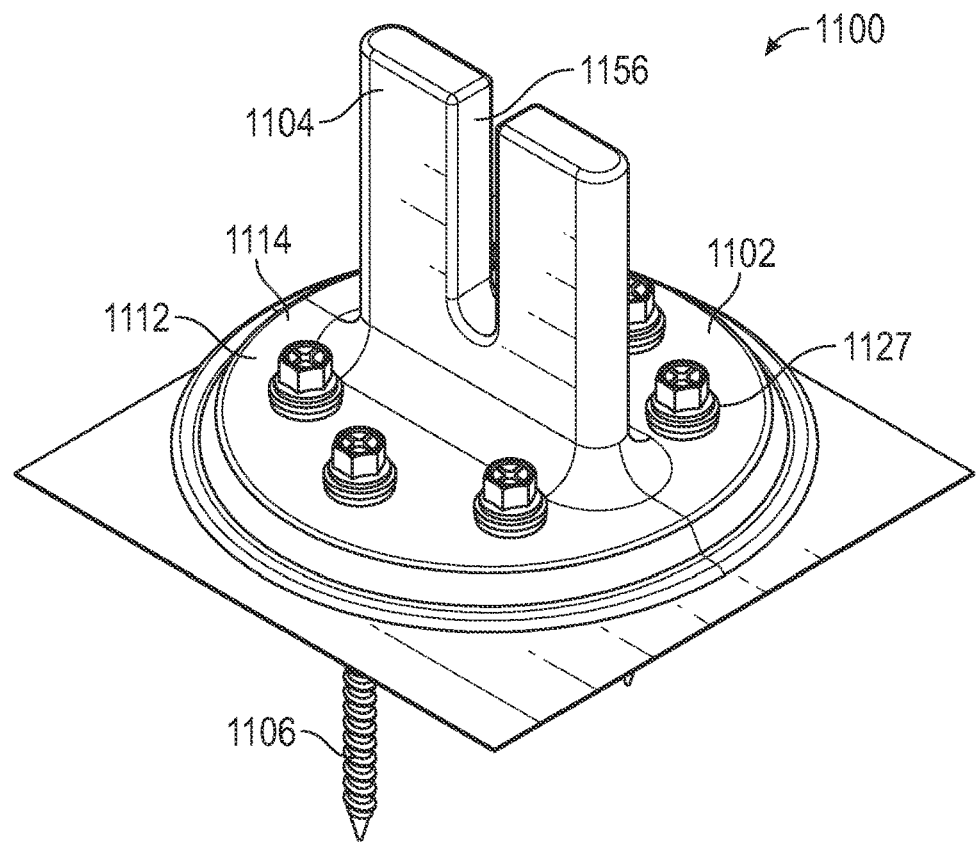
FIG. 59 is a top isometric view of a photovoltaic mount assembly in accordance with another aspect of the present disclosure.

As is shown in FIGS. 56-57 more specifically, the base 1002 also includes a containment flange 1038, which substantially surrounds a cavity 1026 formed within the base 1002. The through-hole portion 1024 extends at least partially into the cavity 1026. As will be described in further detail below, the cavity 1026 is configured to hold a volume of water-resistant sealant (not shown) therein.

Affixed to the bottom surface of the base 1002 above the cavity 1026 is a dual pad seal 1040 which substantially fills cavity 1026 within the inner face 1022 of the containment flange 1038 of base 1002. The dual seal pad 1016 may be formed of any appropriate material such as, e.g., foam, rubber, butyl, sealant tape, mastic, etc. The dual seal pad 1016 may include a seal pad, a compression pad, and a removable film layer 1042, with the film layer 1020 including a user-accessible pull tab 1018. The film layer 1042 is configured to protect an adhesive surface of the dual seal pad 1016 until the mount assembly 1000 is to be mounted to a roof surface. That is, when an installer is prepared to mount the mount assembly 1000 in a desired location on a roof surface, the film layer 1042 can be peeled away from the dual seal pad 1016, thereby exposing the adhesive surface of the dual seal pad 1016. With the adhesive surface exposed, the installer can then simply apply the base 1002 to a desired location on the roof surface (i.e., a "peel-and-stick" arrangement).

The mount assembly 1000 further includes a fastener 1006 and a washer 1010. The washer 1010 may be a two-part sealing washer comprised of a rigid portion and a compressible polymeric portion. The fastener 1006 may be any appropriate fastener suitable for roof-mount applications such as, e.g., a threaded lag bolt, a threaded screw, a nail, a stake, etc. In the embodiment shown in FIG. 53, fastener 1006 is a threaded lag bolt having a hexagonal head 1008. However, it is to be understood that alternative driving head shapes and/or configurations could be utilized in accordance with the present disclosure. The fastener 1006 is sized so as to pass through the through-hole 1028 of the base 1002. While FIG. 55 only illustrates a single fastener 1006 and through-hole 1028, it is to be understood that the mount assembly in accordance with other embodiments could incorporate more than one fastener and/or through-hole.

Next, referring to FIGS. 59-63, a flashing-free mount assembly 1100 in accordance with another aspect of the present disclosure is illustrated. The mount assembly 1100 includes a base 1102 formed with a substantially circular-shaped footprint. However, it is to be understood that base 1102 is not limited to such a shape, and may be, e.g., oval, triangular, square, etc. The base 1102 may be formed of any material of appropriate strength such as, e.g., aluminum, steel, plastic, polymer, etc. As illustrated in FIG. 60, the base 1102 may be an elongated shape. The perimeter of the base 1102 may include notches 1103 as illustrated in FIG. 60, configured to aid an installer in measuring and marking an appropriate attachment location.

Extending upward from the base 1102 is a substantially U-shaped guide 1104 that forms a pair of members extending from opposing sides of the base 1102, which in turn forms an aperture 1156 therebetween. The aperture 1156 is sized and configured to accommodate a fastener (e.g., a nut and bolt assembly) couplable to a rail mount such that a photovoltaic rail guide can be selectively coupled to the mount assembly 1100. Additionally, it is to be understood that one or both of the pair of members of the guide 1104 may include a plurality of horizontal ridges extending along an inner and/or an outer face thereof, with such horizontal ridges acting to retain the fastener more securely when tightened against the guide 1104. The guide 1104 may extend at an upward angle or at approximately 90 degrees.

The base 1102 further comprises a top surface 1114. A substantially flat ledge 1112 is formed on top surface 1114, with an upper opening of a through-hole portion 1127 being located within the ledge 1112. As will be described in further detail below, the through-hole portion 1127 includes a through-hole 1128 and configured to accommodate a fastener. The top surface 1114 may include an aperture 1156 which is sized and configured to accommodate a fastener (e.g., a nut and bolt assembly) couplable to a rail mount such that a photovoltaic rail guide can be selectively coupled to the mount assembly 1100.

Affixed to the bottom surface of the base 1102 above the cavity 1126 is a dual pad seal 1140 which substantially fills cavity 1126 within the inner face 1122 of the containment flange 1138 of base 1102 . . . . The dual seal pad 1140 may be formed of any appropriate material such as, e.g., foam, rubber, butyl, sealant tape, mastic, etc. The dual seal pad 1140 includes a removable film layer 1142, with the film layer 1142 including a user-accessible pull tab 1118. The film layer 1142 is configured to protect an adhesive surface of the dual seal pad 1140 until the mount assembly 1100 is to be mounted to a roof surface. That is, when an installer is prepared to mount the mount assembly 1100 in a desired location on a roof surface, the film layer 1142 can be peeled away from the dual seal pad 1118, thereby exposing the adhesive surface of dual seal pad 1118. With the adhesive surface exposed, the installer can then simply apply the base 1102 to a desired location on the roof surface (i.e., a "peel-and-stick" arrangement).

The mount assembly 1100 further includes a fastener 1106 and a washer 1110. The washer 1110 may be a two-part sealing washer comprised of a rigid portion and a compressible polymeric portion. The fastener 1106 may be any appropriate fastener suitable for roof-mount applications such as, e.g., a threaded lag bolt, a threaded screw, a nail, a stake, etc. In the embodiment shown in FIGS. 59-62, fastener 1106 is a threaded lag bolt having a hexagonal head 1108. However, it is to be understood that alternative driving head shapes and/or configurations could be utilized in accordance with the present disclosure. The fastener 1106 is sized so as to pass through the through-hole 1128 of the base 1102. While FIGS. 59-62 only illustrate a number of fasteners 1106 and through-hole 1128, it is to be understood that the mount assembly in accordance with other embodiments could incorporate more than one fastener and/or through-hole.

Figure 63:
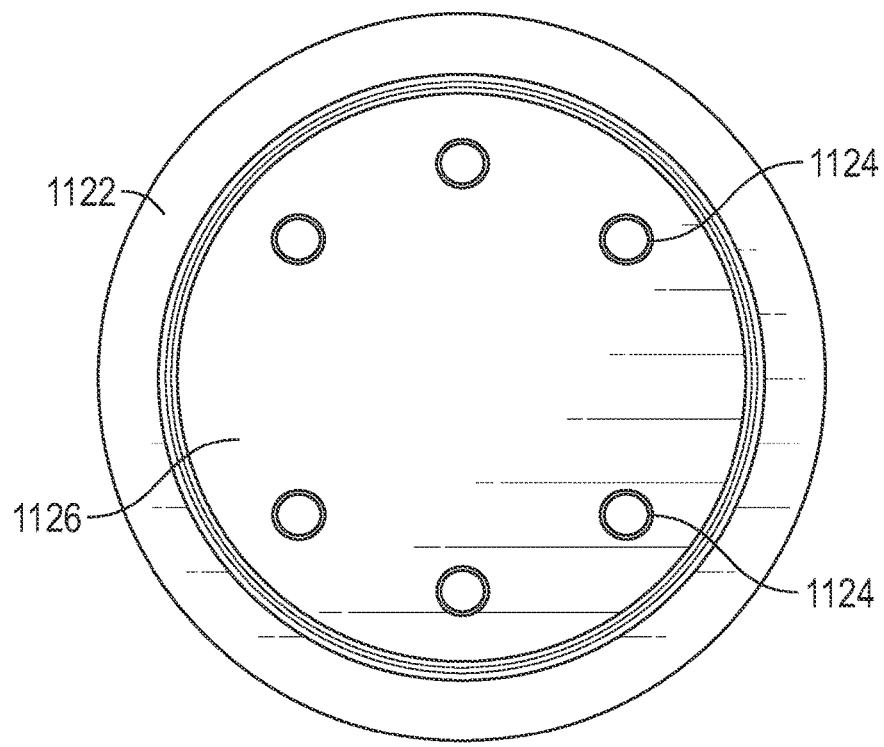
FIG. 63 is a bottom view of the photovoltaic mount assembly of FIG. 59.
Figure 64:
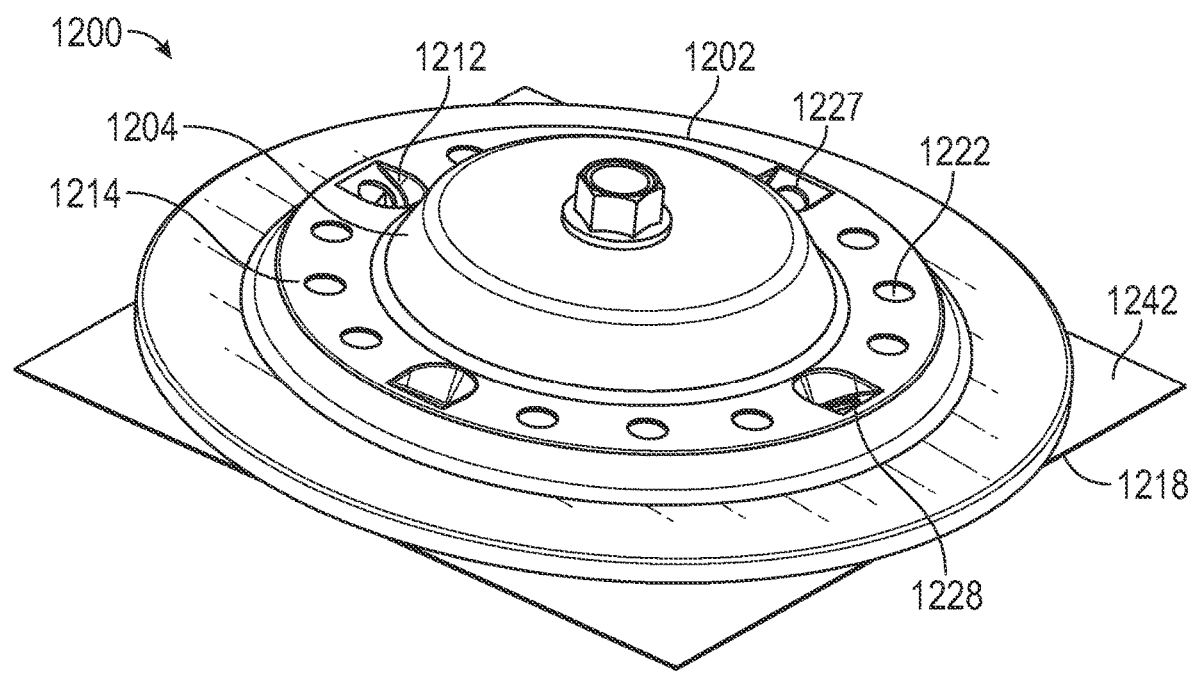
FIG. 64 is a top isometric view of a photovoltaic mount assembly in accordance with another aspect of the present disclosure.
Figure 65:
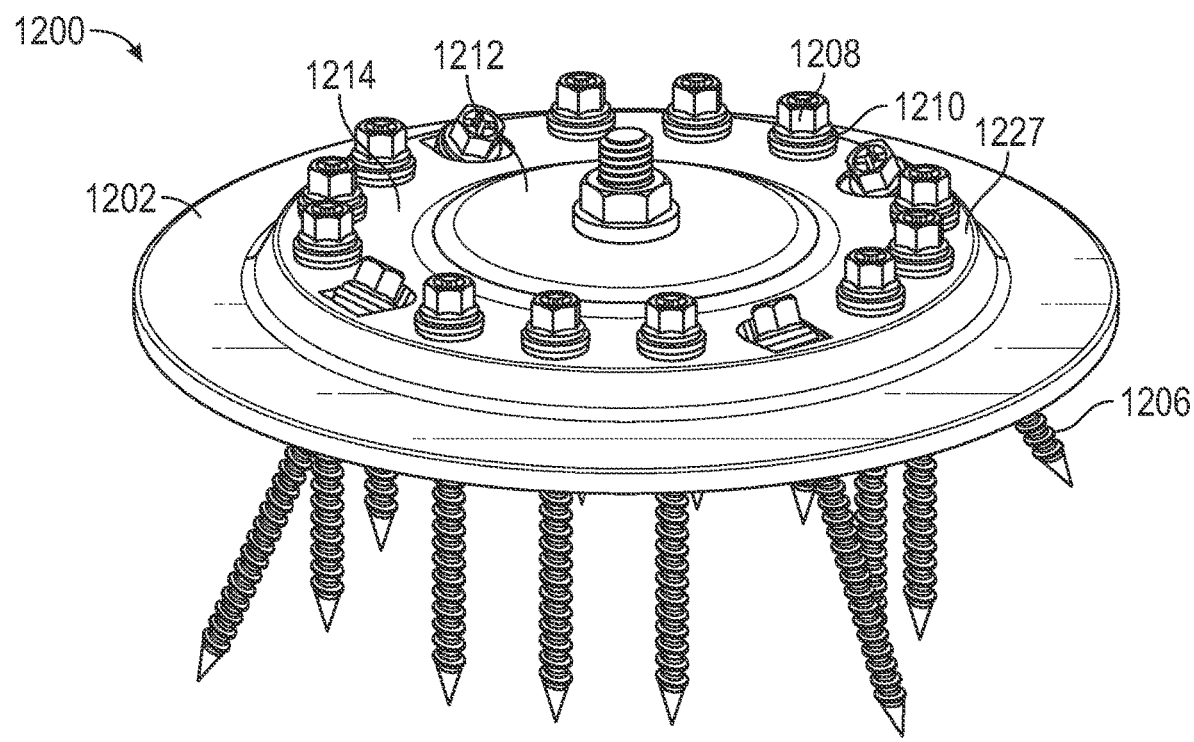
FIG. 65 is a top isometric view of the photovoltaic mount assembly of FIG. 64 with fasteners.

Thee base 1102 has 6 through-holes 1128 configured to receive fasteners 1106. However, there may be more or less through-holes 1128. There are 3 holes on each side of the upright guide 304, however there may be more or less holes in other embodiments. In FIG. 63, the through-holes 1128 and mount 1100 are oriented to enable the attachment of at least two fasteners 1106 to the roof structural members if indeed the roof structural members are engaged.

When the mount 1100 is rotated, the holes 1128 do not align. Across the mounting surface each hole 1128 is at unaligned location along the mounting surface. This ensures that if one of the fasteners 1106 contacts a joint between sheathing members, e.g., Plywood or OSB board. The specific layout of the holes 1128 and fasteners 1106 ensures that a majority of the fasteners 1106 can find a secure mounting location on the sheathing.

Containment flange 1138 has a bottom surface which can act as a stop as the mount is installed and the base 1102 approaches the roof surface. The dual seal pad 1140 extends below the bottom surface of the containment flange 1138 until the fastener is tightened and the base 1102 is forced down to the roof surface compressing the dual seal pad 1140 and urging the seal pad 1140B onto the roof surface. This compression continues until the containment flange contacts the roof surface and the downward travel of the base 1102 is sufficiently resisted. Thus, the containment flange 1138 acts as a stop. The containment flange can additionally contain the dual seal pad 1140 and the seal pad 1140B to contain the flow or spread of the seal pad 1140B material within the cavity 1126, substantially beneath the base 1102 and importantly around the areas of the through-hole portions 1127 to substantially waterproof the mount 1100 located at the potential surface attachment points.

Figure 66:
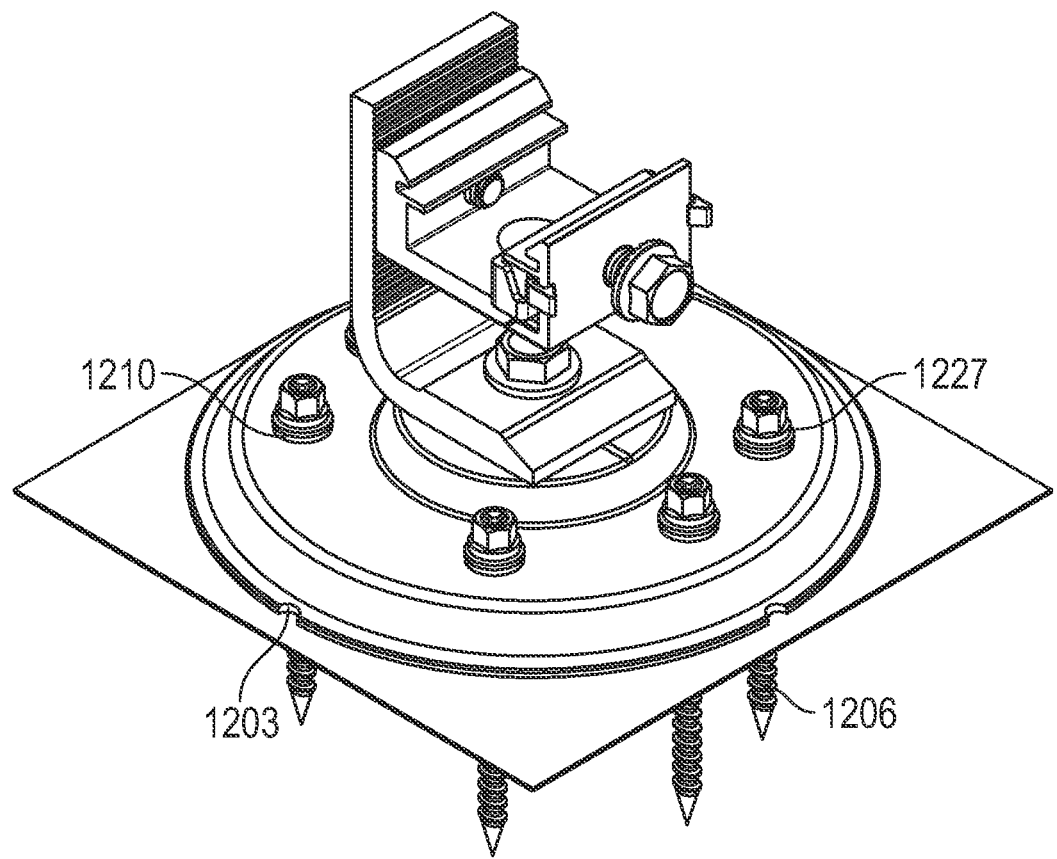
FIG. 66 is a top isometric view of the photovoltaic mount assembly of FIG. 64 with fasteners and an attached mounting bracket.
Figure 67:
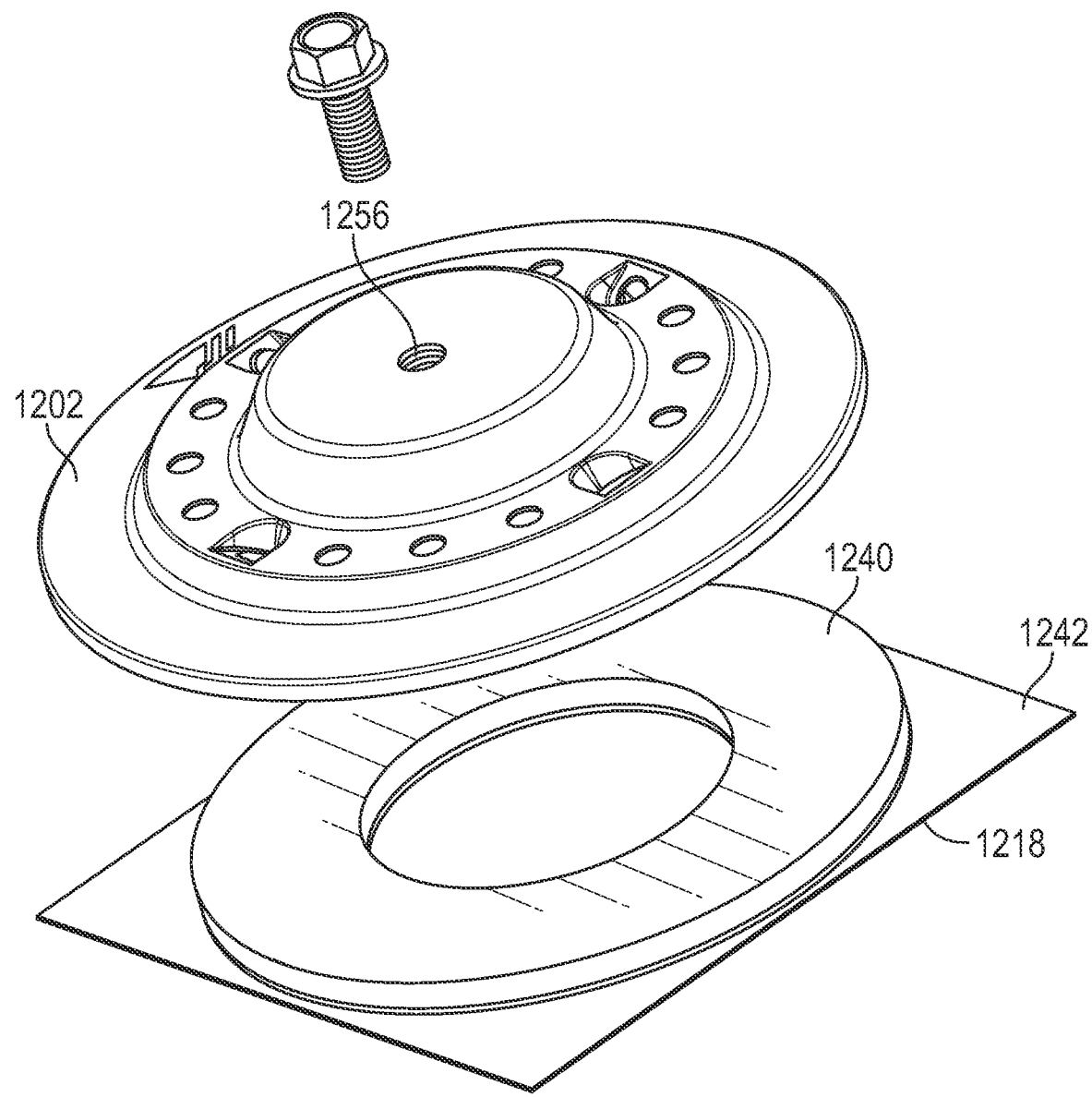
FIG. 67 is a partial exploded top isometric view of the photovoltaic mount assembly of FIG. 64.

Next, referring to FIGS. 64-69, a flashing-free mount assembly 1200 in accordance with another aspect of the present disclosure is illustrated. The mount assembly 1200 includes a base 1202 formed with a substantially circular-shaped footprint. However, it is to be understood that base 1202 is not limited to such a shape, and may be, e.g., oval, triangular, square, etc. As illustrated in FIG. 66, the base may be oblong. The base 1202 may be formed of any material of appropriate strength such as, e.g., aluminum, steel, plastic, polymer, etc. As illustrated in FIG. 66, the base 1102 may be an elongated shape. The perimeter of the base 1202 may include notches 1203 as illustrated in FIG. 66, configured to aid an installer in measuring and marking an appropriate attachment location.

The base 1202 further comprises a middle surface 1214. A substantially flat or angled ledge 1212 may be formed on top surface 1214, with an upper opening of a through-hole portion 1228 being located within the ledge 1212. As will be described in further detail below, the through-hole portion 1228 includes a through-hole 1227 and configured to accommodate a fastener.

Figure 68B:
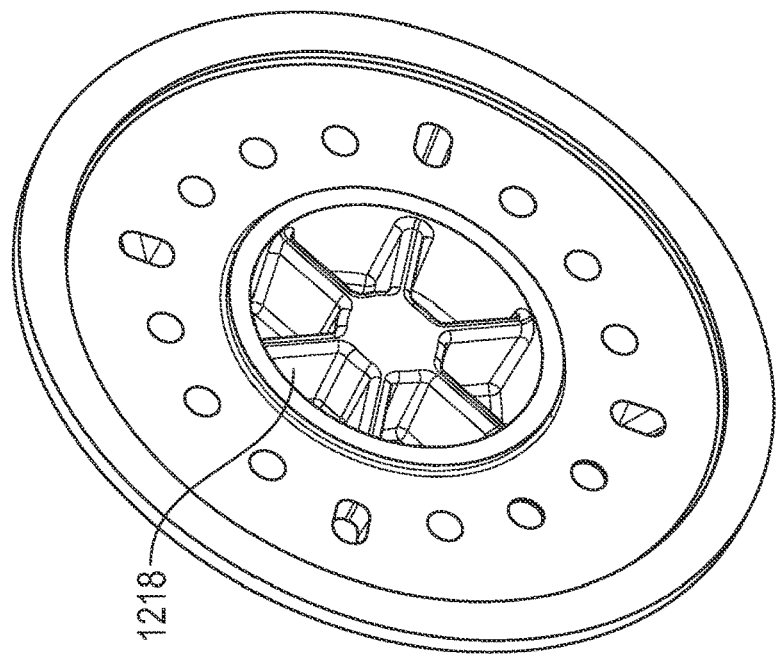
FIG. 68b is a bottom isometric view of the photovoltaic mount assembly of FIG. 64.
Figure 68A:
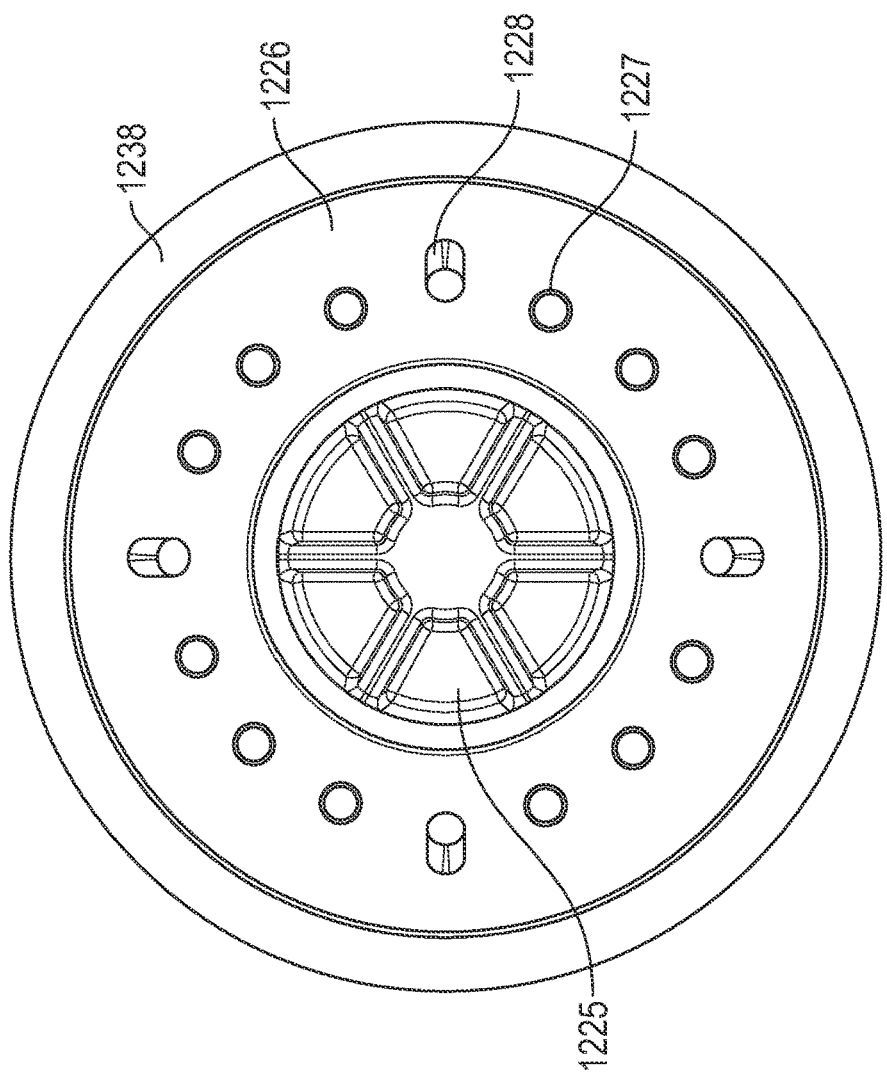
FIG. 68a is a bottom view of the photovoltaic mount assembly of FIG. 64.
Figure 69B:
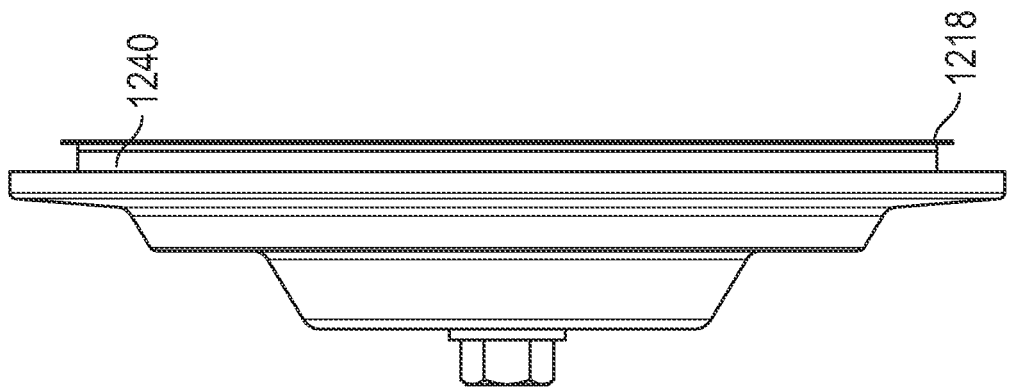
FIG. 69b is a side view of the photovoltaic mount assembly of FIG. 64.
Figure 69A:
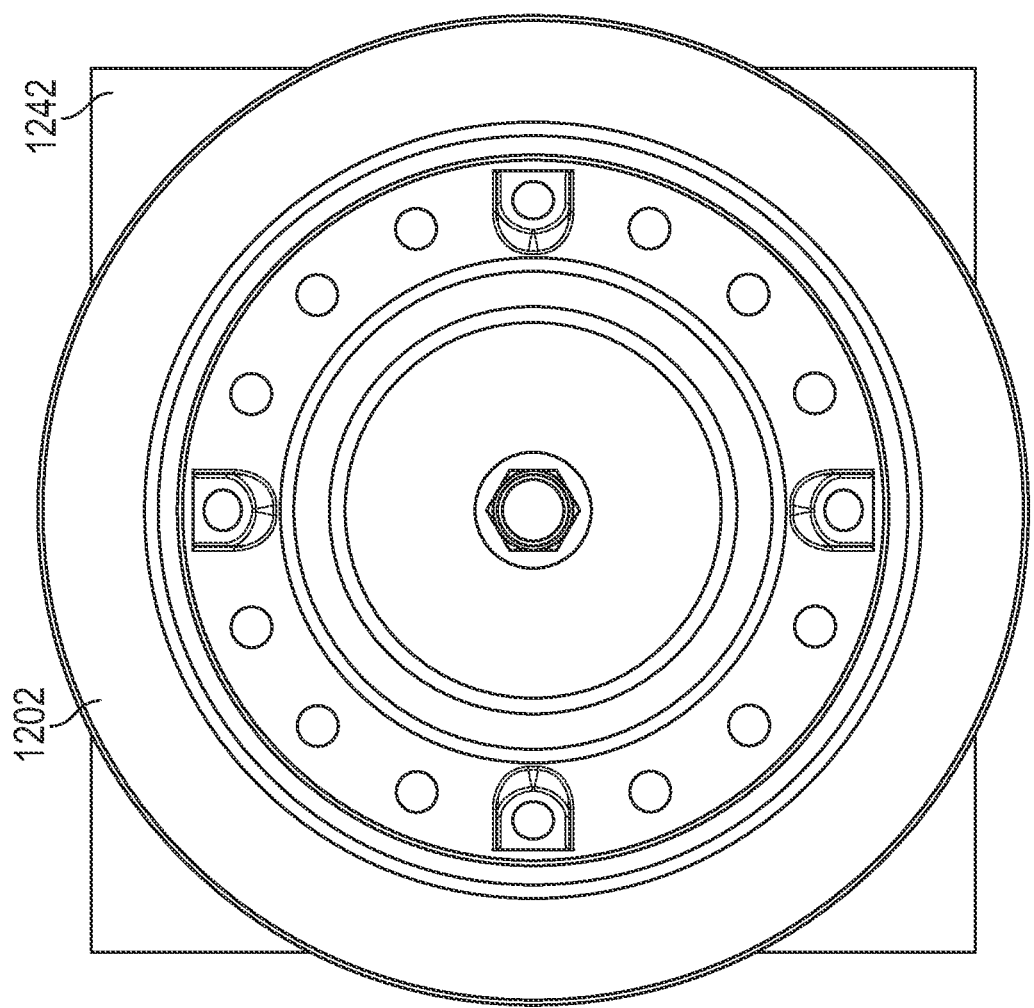
FIG. 69a is a top view of the photovoltaic mount assembly of FIG. 64.

As is shown in FIGS. 68-69, the base 1202 also includes a bottom rim 1222, which substantially surrounds a cavity 1226 formed within the base 1202. The through-hole portion 1228 extends at least partially into the cavity 1226. As will be described in further detail below, the cavity 1226 is configured to hold a volume of water-resistant sealant (not shown) therein. The cavity 1226 may further have an upper cavity 1225 with ribs 1218. The ribs 1218 may increase the strength of the mount assembly 1200. The center of the upper cavity 1225 may include a recessed section which contains the aperture 1256. The cavity 1226 may have an upper portion 1225 with various structural formations to aid in support of the mount assembly 1200. While FIGS. 68*a* and 68*b* illustrate a hexagon shape, it is to be understood that the upper portion 1225 may be any shape and may internally extend past the top surface 1214. The upper portion 1225 may not extend past the top surface 1214.

As is shown in FIGS. 68*a* and 68*b*, the base 1202 also includes a containment flange 1238, which substantially surrounds a cavity 1226 formed within the base 1202. The through-hole portion 1227 extends at least partially into the cavity 1226. As will be described in further detail below, the cavity 1226 is configured to hold a volume of water-resistant sealant (not shown) therein.

Affixed to the bottom surface of the base 1202 above the cavity 1226 is a dual pad seal 1240 which substantially fills cavity 1226 within the inner face 1222 of the containment flange 1238 of base 1202. The dual seal pad 1240 may be formed of any appropriate material such as, e.g., foam, rubber, butyl, sealant tape, mastic, etc. The dual seal pad 1240 includes a removable film layer 1242, with the film layer 1242 including a user-accessible pull tab 1218. The film layer 1242 is configured to protect an adhesive surface of the dual seal pad 1240 until the mount assembly 1200 is to be mounted to a roof surface. That is, when an installer is prepared to mount the mount assembly 1200 in a desired location on a roof surface, the film layer 1242 can be peeled away from the dual seal pad 1240, thereby exposing the adhesive surface of dual seal pad 1240. With the adhesive surface exposed, the installer can then simply apply the base 1202 to a desired location on the roof surface (i.e., a "peel-and-stick" arrangement).

The mount assembly 1200 further includes a fastener 1206 and a washer 1210. The washer 1210 may be a two-part sealing washer comprised of a rigid portion and a compressible polymeric portion. The fastener 1206 may be any appropriate fastener suitable for roof-mount applications such as, e.g., a threaded lag bolt, a threaded screw, a nail, a stake, etc. In the embodiment shown in FIGS. 65-66, fastener 1206 is a threaded lag bolt having a hexagonal head 1208. However, it is to be understood that alternative driving head shapes and/or configurations could be utilized in accordance with the present disclosure. The fastener 1206 is sized so as to pass through the through-hole 1228 of the base 1202. While FIGS. 65-66 only illustrate a single fastener 1206 and through-hole 1228, it is to be understood that the mount assembly in accordance with other embodiments could incorporate more than one fastener and/or through-hole.

Figure 70A:
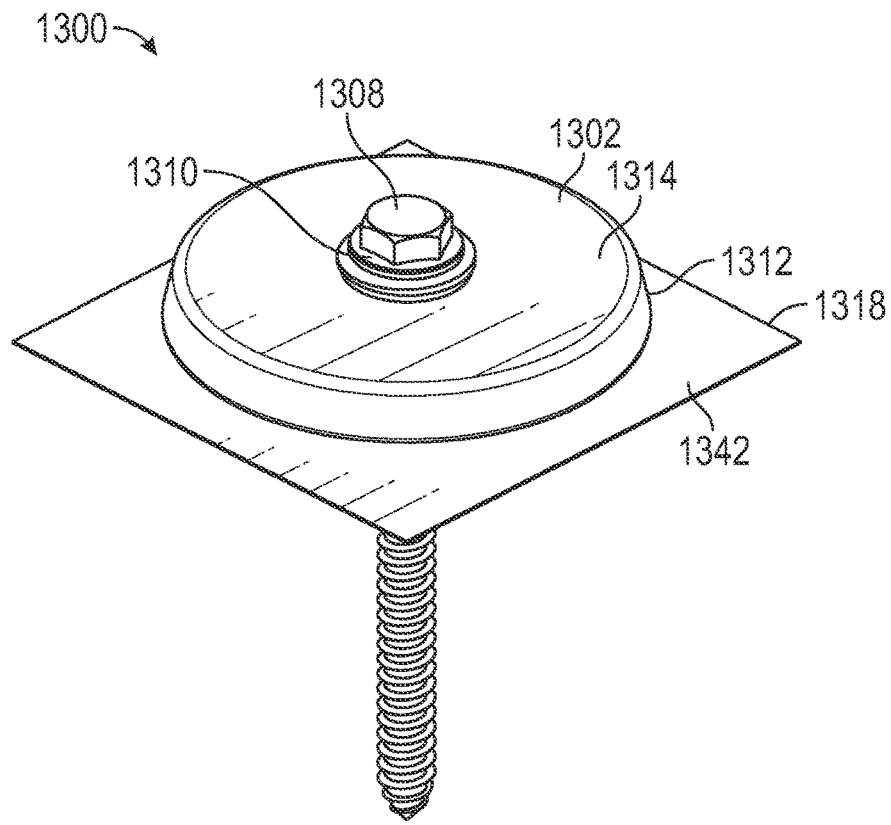
FIG. 70a is a top isometric view of a photovoltaic mount assembly in accordance with another aspect of the present disclosure.
Figure 70B:
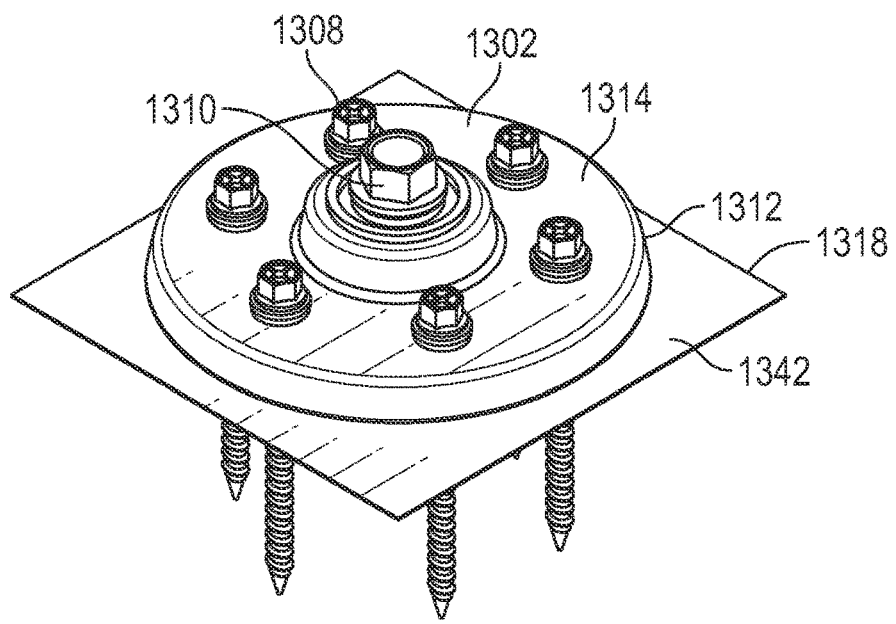
FIG. 70b is a top isometric view of a photovoltaic mount assembly in accordance with another aspect of the present disclosure with fasteners.
Figure 70C:
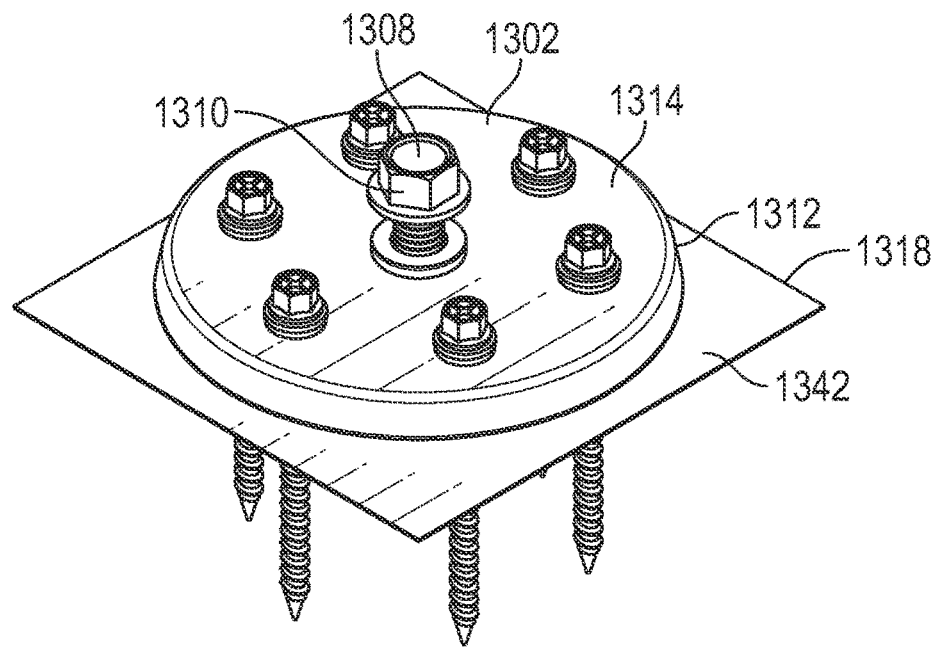
FIG. 70c is a top isometric view of a photovoltaic mount assembly in accordance with another aspect of the present disclosure with fasteners.

Next, referring to FIGS. 70-73, a flashing-free mount assembly 1300 in accordance with another aspect of the present disclosure is illustrated. The mount assembly 1300 includes a base 1302 formed with a substantially rectangular-shaped footprint with rounded corners. However, it is to be understood that base 1302 is not limited to such a shape, and may be, e.g., oval, triangular, square, etc. As illustrated in FIG. 70, the base may be circular. The base 1302 may be formed of any material of appropriate strength such as, e.g., aluminum, steel, plastic, polymer, etc.

The base 1302 further comprises a middle surface 1314. A substantially flat or angled ledge 1312 may be formed on top surface 1314, with an upper opening of a through-hole portion 1328 being located within the ledge 1312. As will be described in further detail below, the through-hole portion 1328 includes a through-hole 1327 and configured to accommodate a fastener.

Figure 71:
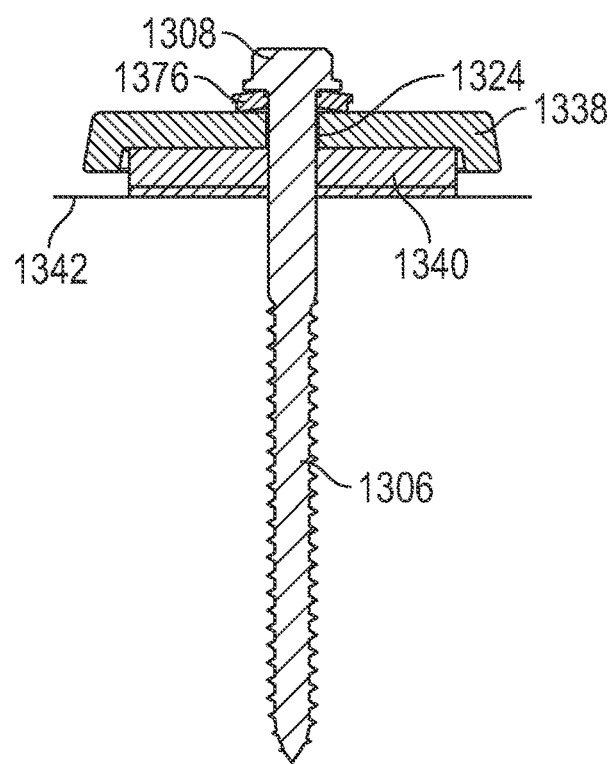
FIG. 71 is a cross sectional view of the photovoltaic mount assembly of FIG. 70.
Figure 72:
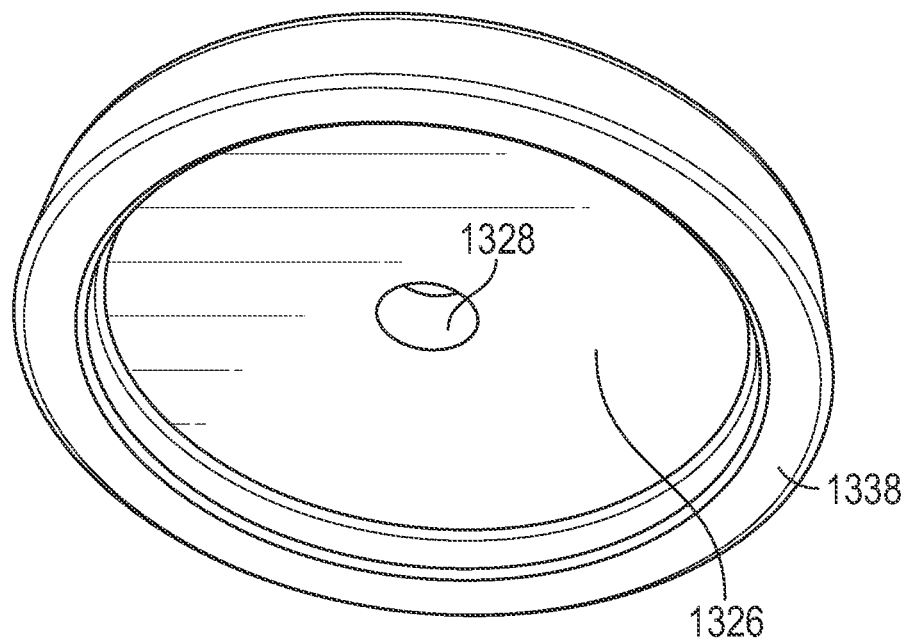
FIG. 72 is a bottom isometric view of the photovoltaic mount assembly of FIG. 70.
Figure 73:
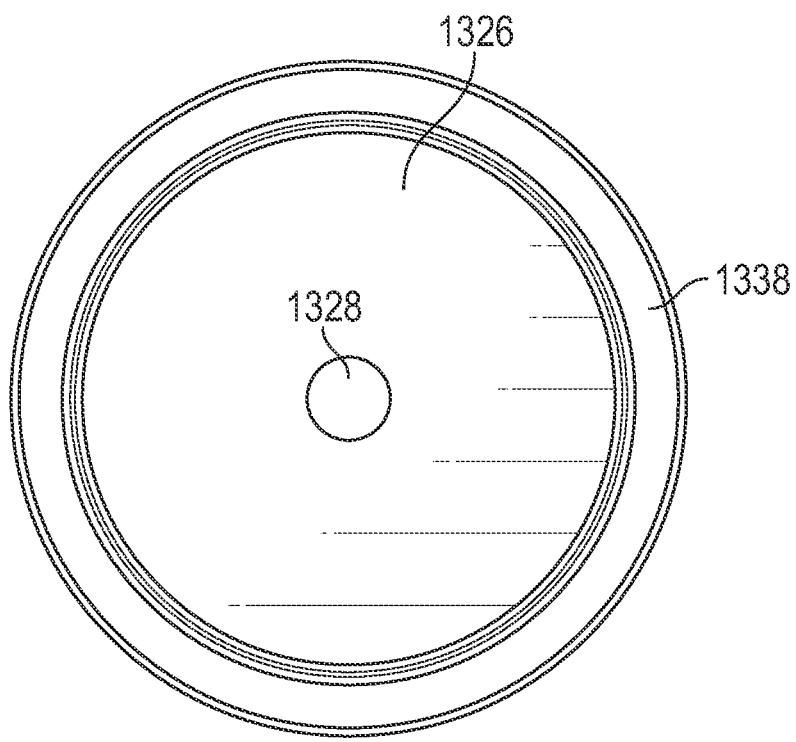
FIG. 73 is a bottom view of the photovoltaic mount assembly of FIG. 70.
Figure 74:
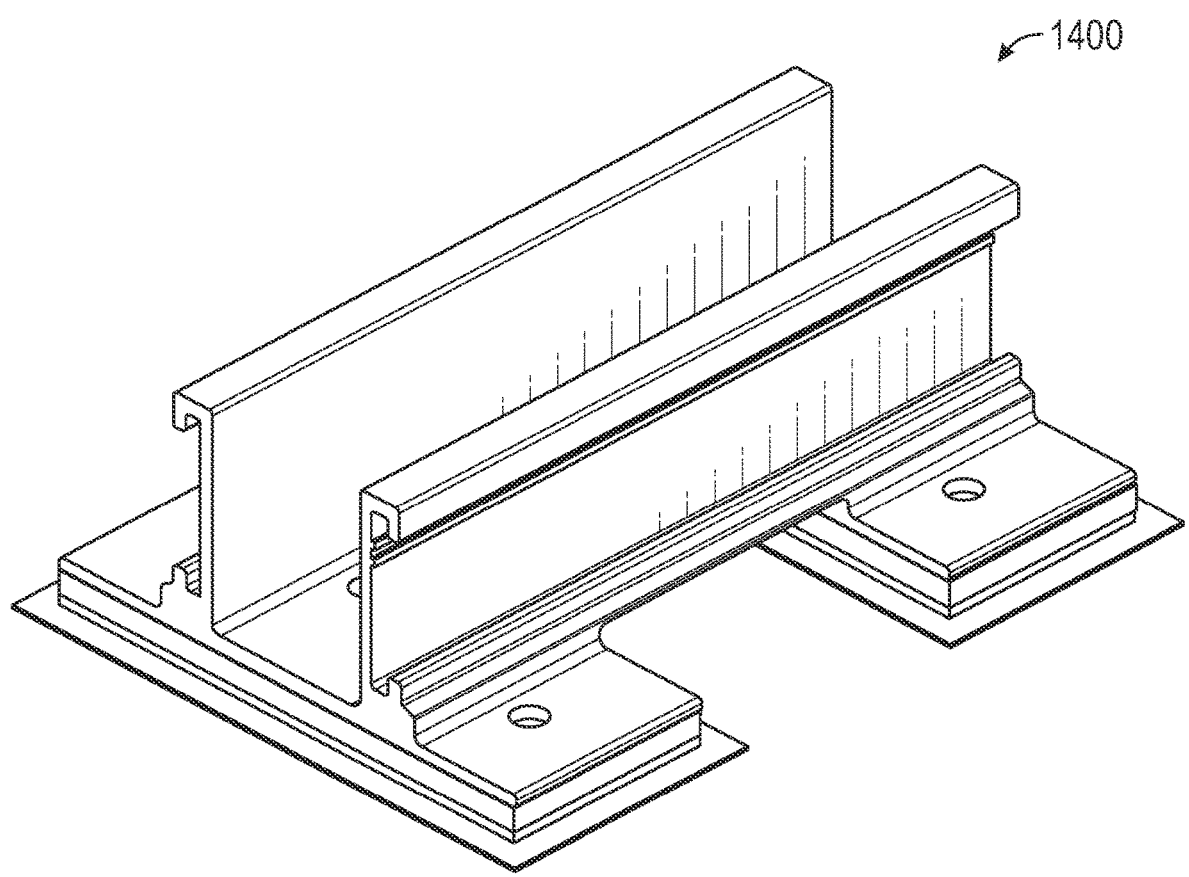
FIG. 74 is a top isometric view of a photovoltaic mount assembly in accordance with another aspect of the present disclosure.

As is shown in FIGS. 71-73, the base 1302 also includes a containment flange 1338, which substantially surrounds a cavity 1326 formed within the base 1302. The through-hole portion 1328 extends at least partially into the cavity 1326. As will be described in further detail below, the cavity 1326 is configured to hold a volume of water-resistant sealant (not shown) therein. The containment flange 1338 may aid in the control of the applied pressure by acting as a stop along the perimeter when the sealant is applied, however the containment flange 1338 is not required and the base 1302 may have a flat edge.

Affixed to the bottom surface of the base 1302 above the cavity 1326 is a dual pad seal 1340 which substantially fills cavity 1326 within the inner face 1322 of the containment flange 1338 of base 1302 . . . . The dual seal pad 1340 may be formed of any appropriate material such as, e.g., foam, rubber, butyl, sealant tape, mastic, etc. The dual seal pad 1340 includes a removable film layer 1342, with the film layer 1342 including a user-accessible pull tab 1318. The film layer 1342 is configured to protect an adhesive surface of the dual seal pad 1340 until the mount assembly 1300 is to be mounted to a roof surface. That is, when an installer is prepared to mount the mount assembly 1300 in a desired location on a roof surface, the film layer 1342 can be peeled away from the dual seal pad 1340, thereby exposing the adhesive surface of dual seal pad 1340. With the adhesive surface exposed, the installer can then simply apply the base 1302 to a desired location on the roof surface (i.e., a "peel-and-stick" arrangement).

The mount assembly 1300 further includes a fastener 1306 and a washer 1310. The washer 1310 may be a two-part sealing washer comprised of a rigid portion and a compressible polymeric portion. The fastener 1306 may be any appropriate fastener suitable for roof-mount applications such as, e.g., a threaded lag bolt, a threaded screw, a nail, a stake, etc. In the embodiment shown in FIG. 71, fastener 1306 is a threaded lag bolt having a hexagonal head 1308. However, it is to be understood that alternative driving head shapes and/or configurations could be utilized in accordance with the present disclosure. The fastener 306 is sized so as to pass through the through-hole 1328 of the base 1302. While FIG. 71 only illustrate a single fastener 306 and through-hole 1328, it is to be understood that the mount assembly in accordance with other embodiments could incorporate more than one fastener and/or through-hole.

The mount assembly 1300 may further include a piston member 1376 piston member 1376 may be located below the hex head 1308 of fastener 1306 and further seal the through-hole 1328 the piston member 1376 is configured to surround the fastener 1306 adjacent the hexagonal head 1308. The piston member 1376 may be any shape, but is preferably substantially tubular. The piston member 1376 may be formed of any appropriate material such as, e.g., rubber, plastic, metal, etc., and is sized such that the overall volume of piston member 1376 is substantially equal to (or slightly greater than) the overall volume of the entry where the fastener 1306 may enter. In this way, not shown, when the fastener 1306 is driven into a roof surface so as to fixedly attach the base 1302 to the roof surface, the piston member 1376 gradually fills a section of the cavity 1326 until a bottom surface of the piston member 1376 contacts the bottom portion 1324 of the cavity 1326 so as to restrict further driving of the fastener 1306 into the roof surface.

Figure 75:
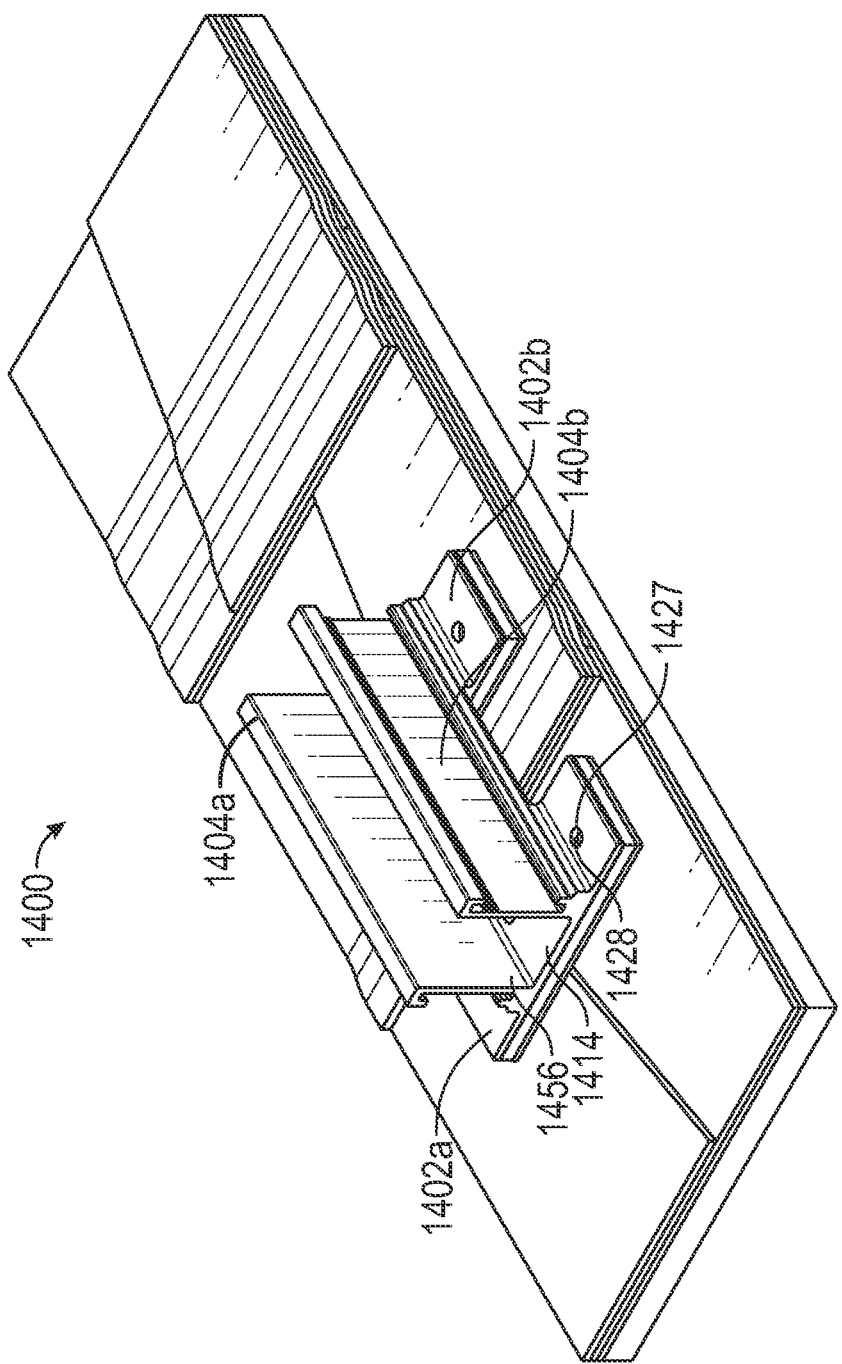
FIG. 75 is a top isometric view of the photovoltaic mount assembly of FIG. 74 on a set of roof shingles.
Figure 76:
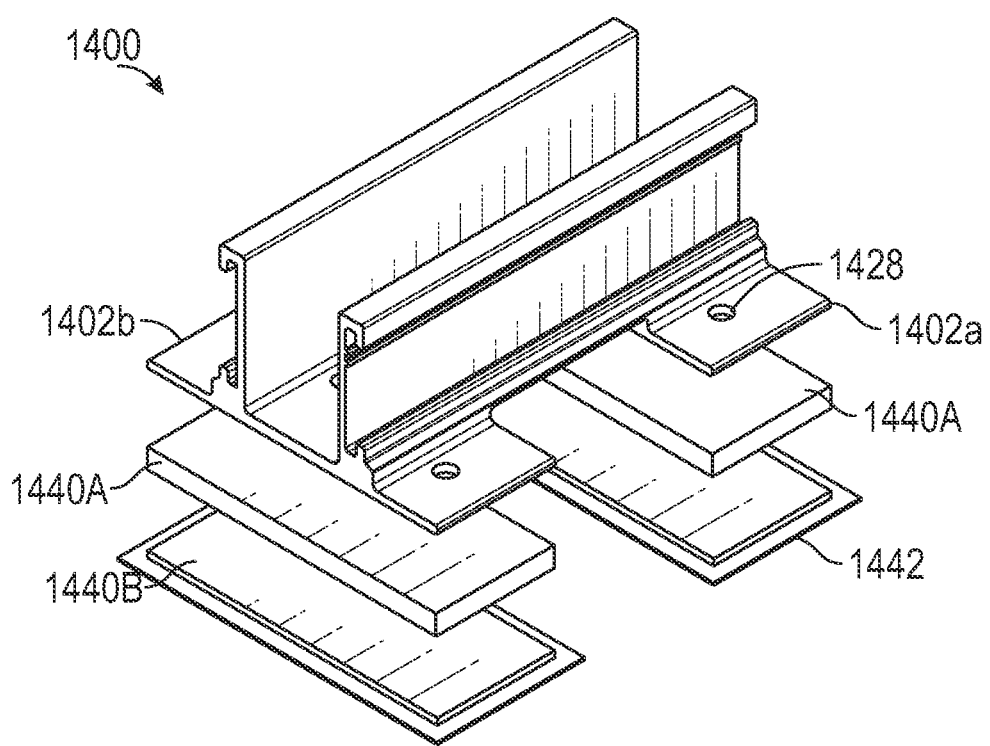
FIG. 76 is a partial exploded top isometric view of the photovoltaic mount assembly of FIG. 74.
Figures 79, 80:
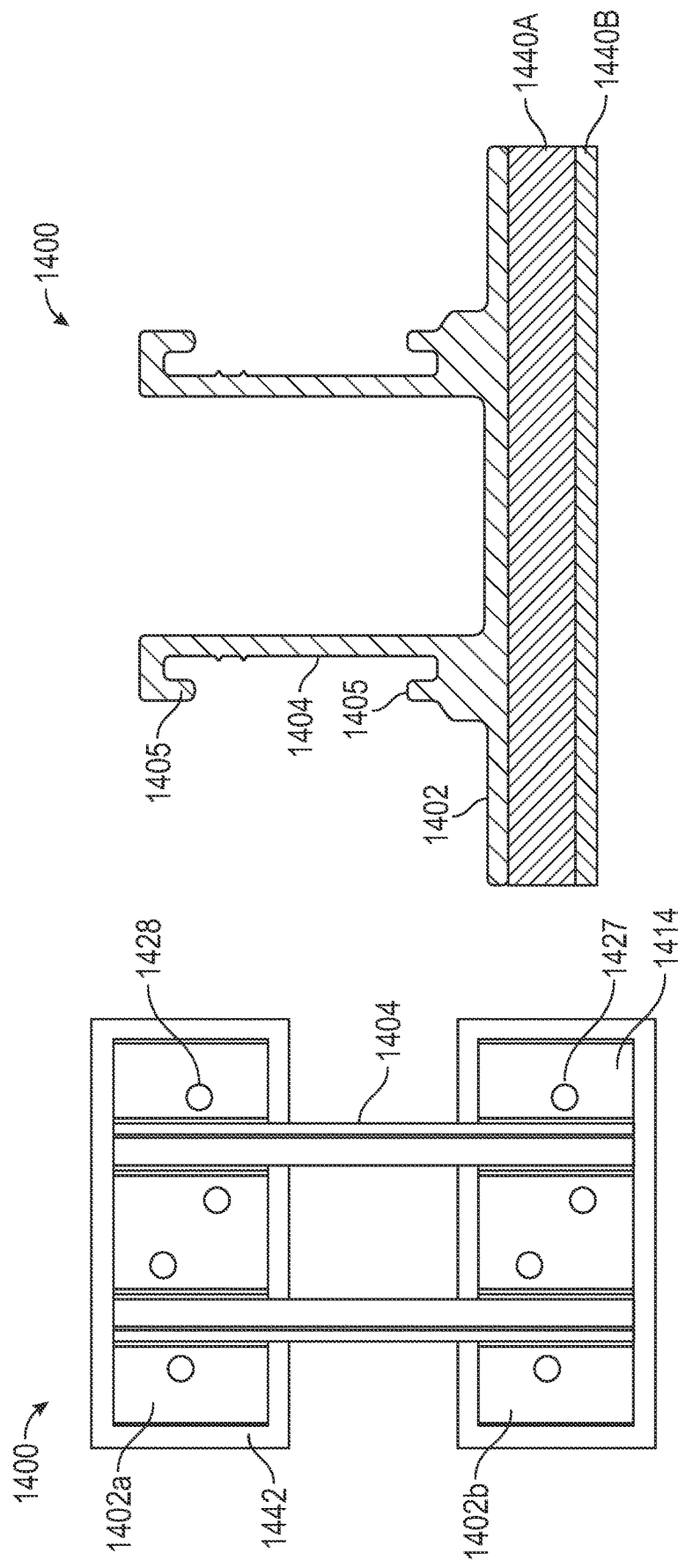
FIG. 79 is a top view of the photovoltaic mount assembly of FIG. 74.
FIG. 80 is a side view of the photovoltaic mount assembly of FIG. 74.

Next, referring to FIGS. 74-85, a flashing-free mount assembly 1400 in accordance with another aspect of the present disclosure is illustrated. The mount assembly 1400 includes a two part base 1402A, 1402A formed with a substantially rectangular-shaped footprint with two beveled sides. However, it is to be understood that base 1402A, 1402A is not limited to such a shape, and may be, e.g., oval, triangular, square, etc. The base 1402A, 1402A may be formed of any material of appropriate strength such as, e.g., aluminum, steel, plastic, polymer, etc. Additionally, the base 1402A, 1402A may consist of multiple parts as shown in FIGS. 76 and 79.

Extending upward from the base 1402 is a two part upright guide 1404, comprised of two guide members 1404A, 1404A connecting the two base parts 1402A, 1402A, which in turn forms an open aperture 1456 therebetween the upright guide 1404. The upright guide 1404 may include attachment points 1405. Attachment points 1405 are illustrated in FIG. 80 as a rolled over section for attaching to a mount or further structure or assembly for connecting to solar modules, however, attachment points 1405 may be any attachment means configured for attaching. The aperture 1456 is sized and configured to accommodate a fastener (e.g., a nut and bolt assembly) or to be couplable to a rail mount such that a photovoltaic rail guide can be selectively coupled to the mount assembly 1400. In a preferred rail free embodiment, the upright guide 1404 is configured to slideably engage a vertically adjustable clamp assembly that can be fixed in a selected location along the length of the upright guide 1404.

The bases 1402a, 1402b further comprise a top surface 1414. An upper opening of at least one through-hole portion 1427 being located within the bases 1402a, 1402b may be distanced from the upright guides 1404a, 1404b so that the through-hole portion 1428 has a substantially flat portion surrounding the upper opening. As will be described in further detail below, the through-hole portion 1427 includes a through-hole 1428 and configured to accommodate a fastener.

As is shown in FIG. 76, the through-hole 1428 extends at least partially through the base 1402. Affixed below the bases 1402A, 1402A is a dual seal pad 1440, with dual seal pad 1440 covered by the bases 1402A, 1402A. The dual seal pad 1440 may be formed of any appropriate material such as, e.g., foam, rubber, butyl, sealant tape, mastic, or other compressible, non-porous, water impervious material. The dual seal pad 1439 may be the full size and shape of the bottom surface of the bases 1402A, 1402B and is placed and adhered to the bottom surface of the bases 1402A, 1402B. The dual seal pad 1440 may be comprised of a compression pad 1440A and a seal pad 1440B. As shown in FIG. 75, each base 1402A, 1402A may have a dual seal pad 1439 adhered to its bottom surface, thus base 1402A may have dual seal pad 1440 adhered to its bottom surface, comprised of compression pad 1440A and seal pad 1441B and base 1402B may have dual seal pad 1440 adhered to its bottom surface, comprised of compression pad 1440A and seal pad 1440B. There may be additional dual seal pads 1440 for each additional base 1402.

In a preferred embodiment the dual seal pad 1440 is applied to the bottom surface of the base during a manufacturing process, i.e. the dual seal pad is factory installed on the base 1402, such that when the installer receives the mount assembly 1400 on the roof, it is ready to be installed and the installer needs only to peel the removeable film layer 1442 from the bottom of the seal pad 1441 and place the mount 1400 on the desired location on the roof surface.

The dual seal pad 1440 includes a removable film layer 1442, with the film layer 1442 including a user-accessible pull tab 1418. The film layer 1442 is configured to protect an adhesive surface of the dual seal pad 1440 until the mount assembly 1400 is to be mounted to a roof surface. That is, when an installer is prepared to mount the mount assembly 1400 in a desired location on a roof surface, the film layer 1442 can be peeled away from the dual seal pad 1440, thereby exposing the adhesive surface of dual seal pad 1440. The seal pad 1440 may be the Eternabond™ or any synthetic resins, thermoplastics, butyl, and non-curing rubber with a built-in primer or applicable primer. With the adhesive surface exposed, the installer can then simply apply the base 1402A, 1402A to a desired location on the roof surface (i.e., a "peel-and-stick" arrangement). The base 1402A, 1402A rest on the dual seal pad 1440 when assembled and the bases 1402A, 1402A are fixed to the roof or surface. The dual seal pad 1440 separates the bases 1402A, 1402B from the roof or surface, or at least partially.

An advantage of the dual seal pad 1440, as shown in FIG. 75, is that it can accommodate the uneven nature of a roof or the steps in the roofing layers within a single shingle course. In a preferred embodiment the compression pad 1440 is comprised of a closed cell foam that is impervious to water and resiliently maintains its natural thickness, such that if it is compressed, its natural tendency is to exert pressure to regain its uncompressed thickness. Thus the compression pad 1440 is impervious to water and compressible. As the roof mount is fastened down on the roof surface the compression pad 1440 is compressed such that where the higher shingle layer overlaps the lower shingle layer the foam material is more compressed and the dual seal pad 1440 remains less compressed in the area where the higher shingle layer is not present. In this way the foam material maintains a downward pressure toward the roof surface urging the seal layer onto the top surface of the roofing and substantially in and around the roofing surface granules. On a flat or uneven surface, the dual seal pad 1440 when compressed forms to the flat or uneven surface providing substantial water sealing to the roofing penetration area.

Figure 85:
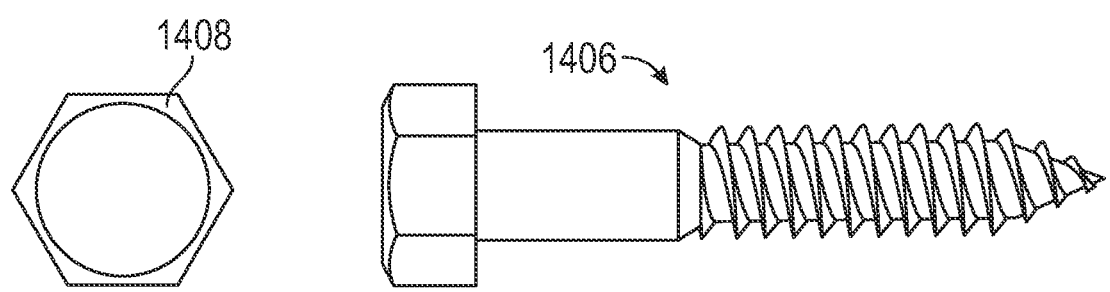
FIG. 85 is an example of a fastener for connecting a photovoltaic mount assembly to a surface.

The mount assembly 1400 further includes at least one fastener 1406 and a washer 1410. The washer 1410 may be a two-part sealing washer comprised of a rigid portion and a compressible polymeric portion. The fastener 1406 may be any appropriate fastener suitable for roof-mount applications such as, e.g., a threaded lag bolt, a threaded screw, a nail, a stake, etc. In FIG. 85, fastener 1406 is a threaded lag bolt having a hexagonal head 1408. However, it is to be understood that alternative driving head shapes and/or configurations could be utilized in accordance with the present disclosure. The fastener 1406 is sized so as to pass through the through-hole 1428 of the base 1402a, 1402b. While the FIGS. only illustrate a number of fasteners 1406 and through-holes 1428, it is to be understood that the mount assembly in accordance with other embodiments could incorporate any amount more than one fastener and/or through-hole.

Figure 81:
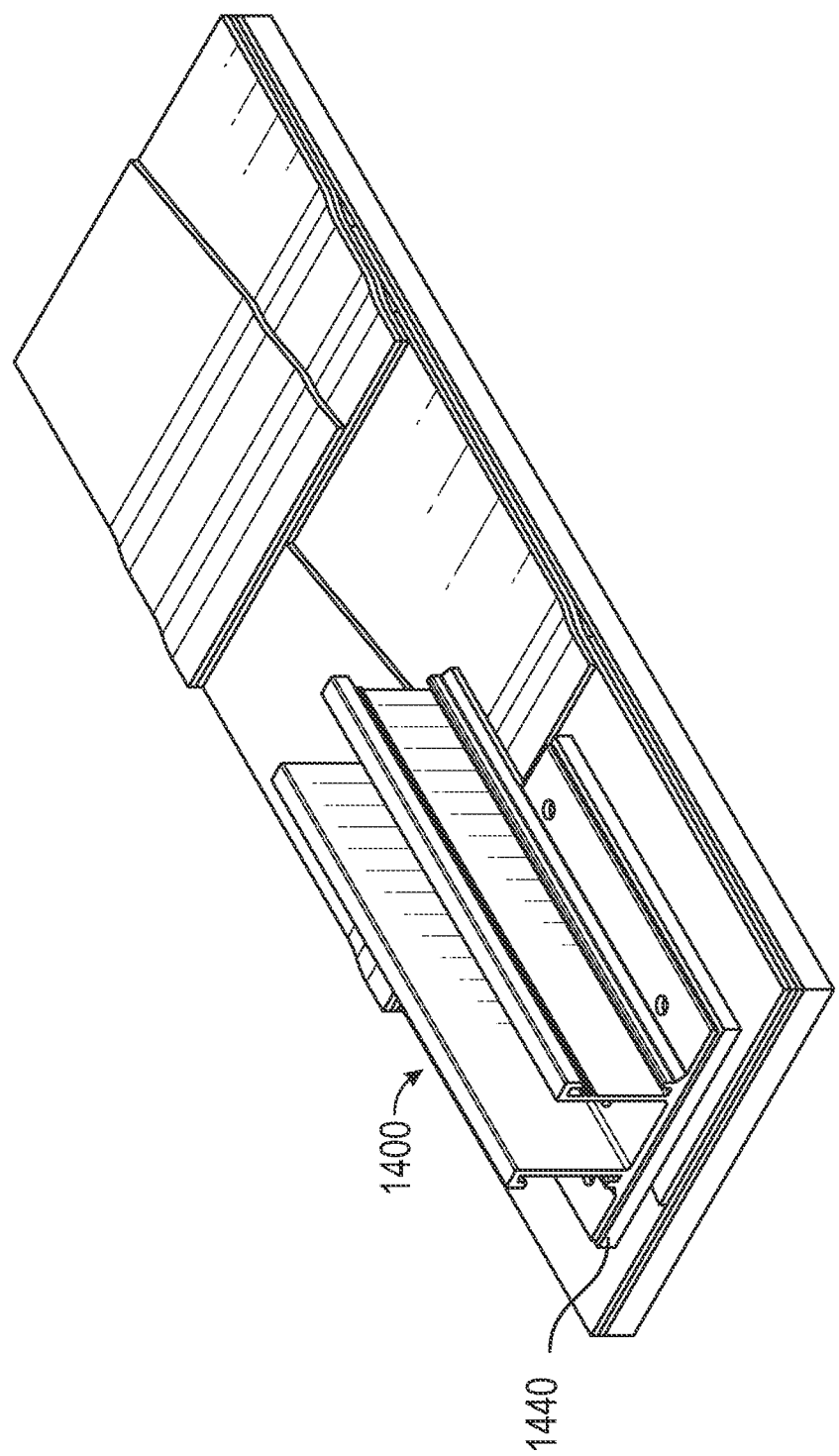
FIG. 81 is a top isometric view of an alternative design of the photovoltaic mount assembly of FIG. 74 on a set of roof shingles.
Figure 82:
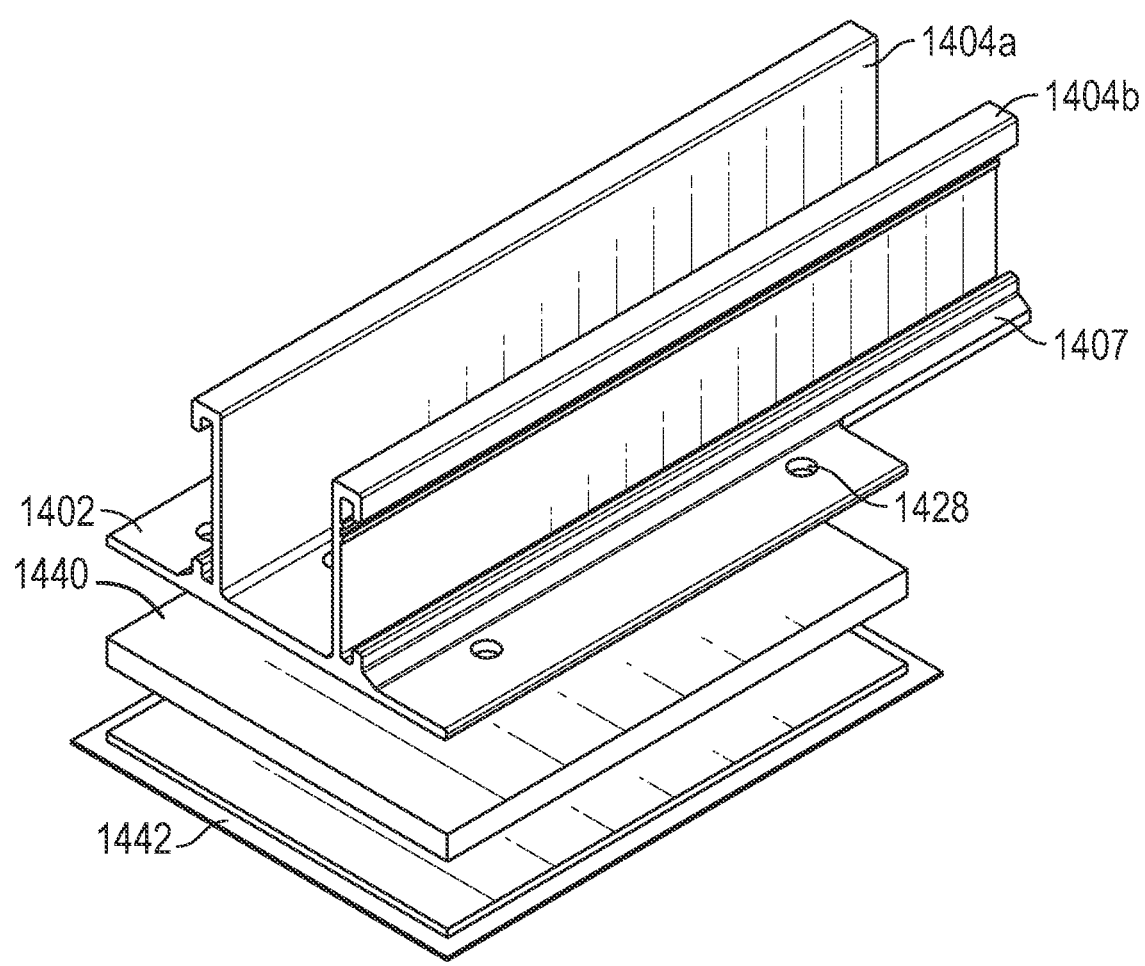
FIG. 82 is a partial exploded top isometric view of the photovoltaic mount assembly of FIG. 80.
Figure 83:
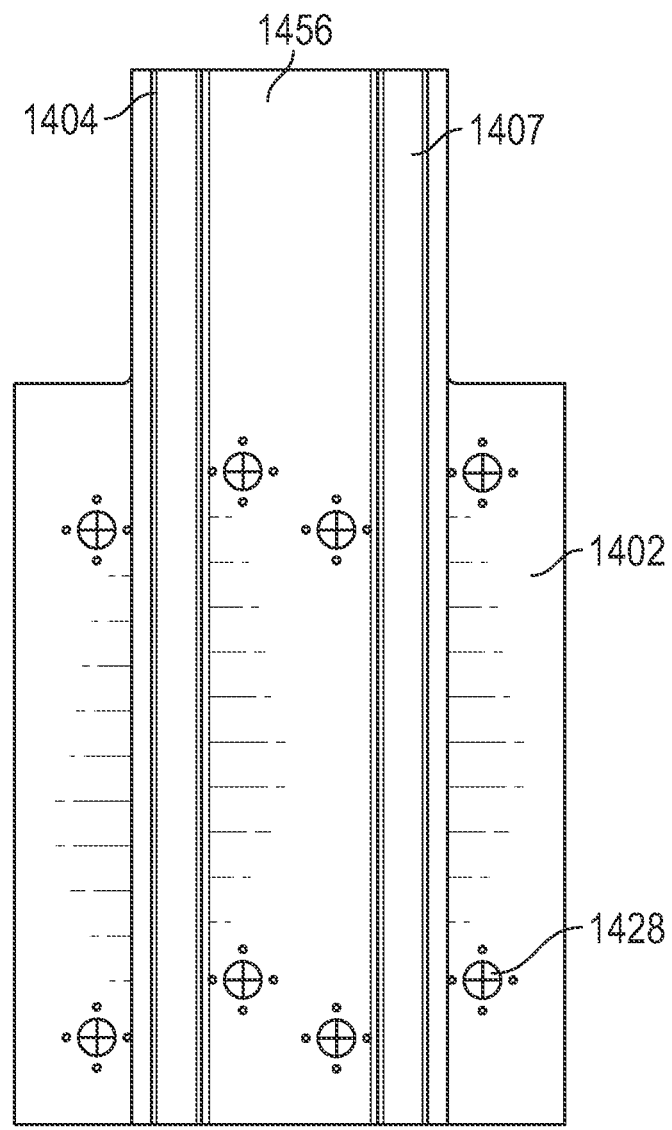
FIG. 83 is a top view of the photovoltaic mount assembly of FIG. 80.
Figure 83C:
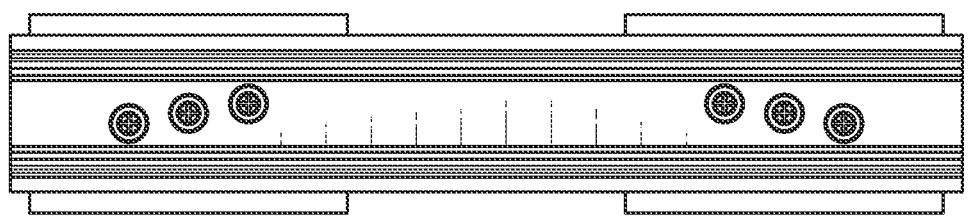
Figure 83B:
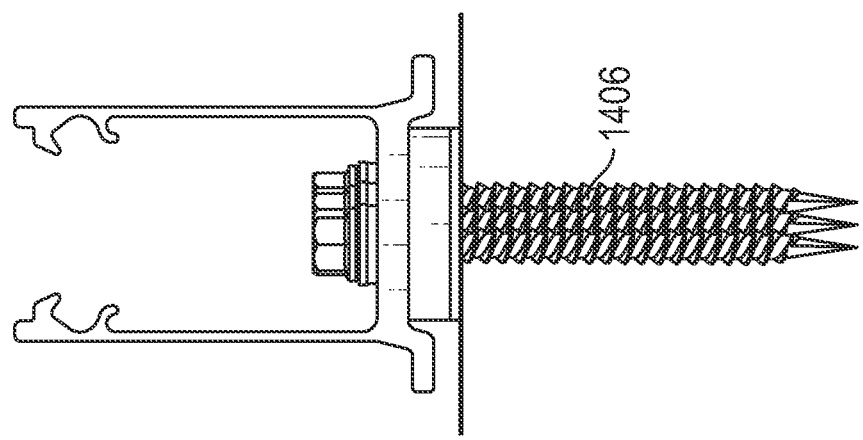
Figure 83A:
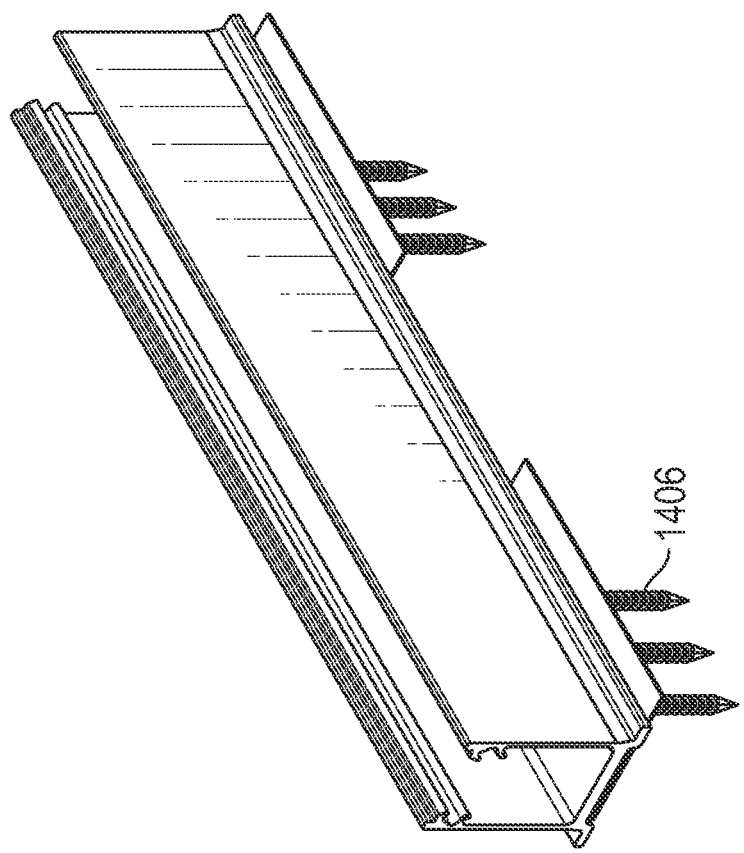
FIG. 83a is an isometric view of an exemplary rail attached to an exemplary mount.
Figure 84:
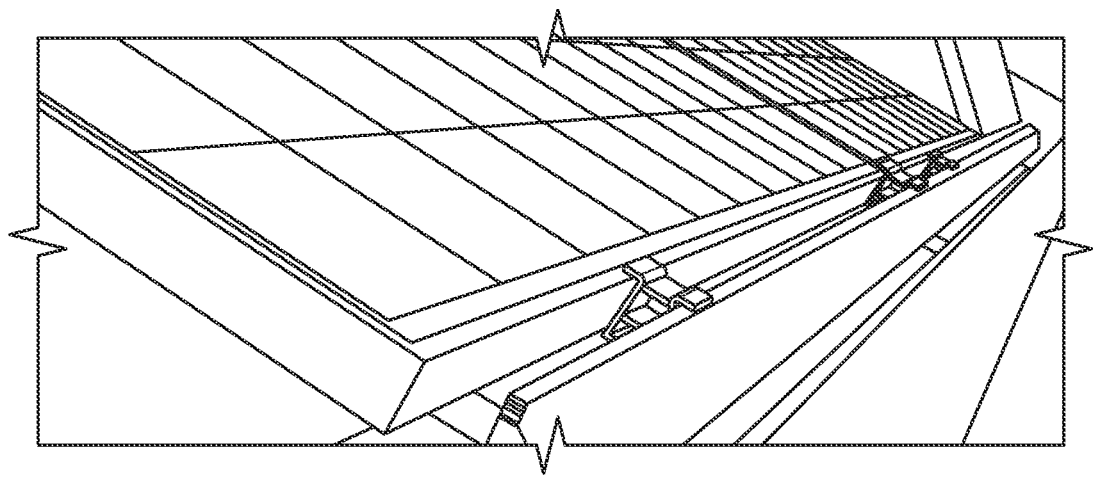
FIG. 84 is an example of a mounted solar module with a skirt.

FIGS. 81-83 illustrate an alternative embodiment of the mount assembly 1400 with a single base 1402. The two part upright guide members 1404 is fixed to the base 1402. A section of the upwardly extending support structures or slides 1404 extends past the width or length of the base 1402, being an extended portion 1407. The two part upright guide members 1404a, 1404b extend with the extended portion 1407 past the width or length of the base 1402. The top lip and bottom lip may form a clip-like section for additional attachment and extend with extended portion 1407 past the width or length of the base 1402. An advantage of this alternative embodiment is the extended portion 1407 allows for additional attachment points. These additional attachment points allow for more flexibility and options when attaching the base 1402 to the roof or surface. Another advantage of this alternative embodiment is the extended portion 1407 may be long enough to extend over multiple shingle courses of the roof. This allows for attachment points where previously attachment between solar modules and roof or surface were impractical. Specifically, for example, attachment points where the edges of solar modules meet at with a stepped surface due to overlapping roof shingle layers. An additional advantage of this alternate is to allow the entire connection between roof surface and mount assembly to be located within a single shingle course, while simultaneously allowing the connection between the mount assembly and the further brackets or assemblies connecting the solar modules to the mount assembly 1400 to be located beyond the single shingle course where the mount assembly 1400 is connected to the roof surface.

During installation of the mount assembly 10, 50, 100, 200, 300, 400, 500, 600, 700, 800, 1000, 1000, 1100, 1200, 1300, 1400 onto a roof surface, a desired location is selected. Then the film layer 42 is removed from the dual pad 240, 340, 440, 540, 640, 740, 840, 1040, 1040, 1140, 1240, 1340, 1440 to expose the adhesive side which is placed at the desired location. The fasteners 18, 58, 108, 206, 306, 406, 506, 606, 706, 806, 906, 1006, 1106, 1206, 1306, 1406 are then used to mount the assembly 10, 50, 100, 200, 300, 400, 500, 600, 700, 800, 1000, 1000, 1100, 1200, 1300, 1400 to the desired location. Pilot holes may be drilled before or after the dual pad 240, 340, 440, 540, 640, 740, 840, 1040, 1040, 1140, 1240, 1340, 1440 is placed.

Commonly an installer will approximately locate a rafter or other roof structural member by hitting the roof surface and sensing the rigidity of the roof and sounding the roof.

This is not and exacting process and sometimes the location of the rafter is misjudged, such that when the fastener 18, 58, 108, 206, 306, 406, 506, 606, 706, 806, 906, 1006, 1106, 1206, 1306, 1406 is installed through the mount and into the roof the rafter is completely missed, or the fastener 18, 58, 108, 206, 306, 406, 506, 606, 706, 806, 906, 1006, 1106, 1206, 1306, 1406 penetrates the rafter too close to the edge of the rafter. This can result in leaks and non-structural connections to the roof which can result in inadequate capacity to resist the loads on the solar modules resulting in catastrophic failures and destruction of property.

The present invention allows the installer to confidently install the mount assembly 10, 50, 100, 200, 300, 400, 500, 600, 700, 800, 1000, 1000, 1100, 1200, 1300, 1400 to the roof substrate by either connecting to the rafter adequately or alternately connecting to the sheathing. First the installer places the mount assembly 10, 50, 100, 200, 300, 400, 500, 600, 700, 800, 1000, 1000, 1100, 1200, 1300, 1400 on the roof centering it on the approximated location of the rafter. Then the installer inserts the fastener 18, 58, 108, 206, 306, 406, 506, 606, 706, 806, 906, 1006, 1106, 1206, 1306, 1406 through one of the through holes 28, 74, 116, 224, 328, 428, 528, 628, 728, 828, 1028, 1028, 1128, 1228, 1328, 1428. If a strong connection is made with this first fastener 18, 58, 108, 206, 306, 406, 506, 606, 706, 806, 906, 1006, 1106, 1206, 1306, 1406, the installer needs only to install one more fastener 18, 58, 108, 206, 306, 406, 506, 606, 706, 806, 906, 1006, 1106, 1206, 1306, 1406 through the corresponding through holes 28, 74, 116, 224, 328, 428, 528, 628, 728, 828, 1028, 1028, 1128, 1228, 1328, 1428. If the rafter is missed, the installer will be made aware of the missing by the early reduced resistance while installing the fastener 18, 58, 108, 206, 306, 406, 506, 606, 706, 806, 906, 1006, 1106, 1206, 1306, 1406. In this case the installer then installs the other laterally separated through hole 28, 74, 116, 224, 328, 428, 528, 628, 728, 828, 1028, 1028, 1128, 1228, 1328, 1428. If this fastener 18, 58, 108, 206, 306, 406, 506, 606, 706, 806, 906, 1006, 1106, 1206, 1306, 1406 makes a strong connection to the rafter or roof structural member, the installer needs only to install one more fastener 18, 58, 108, 206, 306, 406, 506, 606, 706, 806, 906, 1006, 1106, 1206, 1306, 1406 through the corresponding through holes 28, 74, 116, 224, 328, 428, 528, 628, 728, 828, 1028, 1028, 1128, 1228, 1328, 1428. If the installer missed the rafter with the first two fasteners 18, 58, 108, 206, 306, 406, 506, 606, 706, 806, 906, 1006, 1106, 1206, 1306, 1406, the installer then installs the rest of the fasteners 18, 58, 108, 206, 306, 406, 506, 606, 706, 806, 906, 1006, 1106, 1206, 1306, 1406 through the rest of the through holes 28, 74, 116, 224, 328, 428, 528, 628, 728, 828, 1028, 1028, 1128, 1228, 1328, 1428 and the adequate strength connection is made to the sheathing and all the through holes 28, 74, 116, 224, 328, 428, 528, 628, 728, 828, 1028, 1028, 1128, 1228, 1328, 1428 and the roof penetrations are fully waterproofed. Additional bolts or connectors may be used if desired.

While the mount assembly embodiments described above with respect to FIGS. 1-85 may preferably be utilized without the need for a flashing, it is to be understood that all embodiments described herein could also be utilized in conjunction with a flashing or similar component.

Advantageously, the base 12, 52, 202, 302, 402, 502, 602, 702, 802, 1002, 1002, 1102, 1202, 1302, 1402 is formed or shaped to retain or hold the dual seal pad 240, 340, 440, 540, 640, 740, 840, 1040, 1040, 1140, 1240, 1340, 1440 below or within the base 12, 52, 202, 302, 402, 502, 602, 702, 802, 1002, 1002, 1102, 1202, 1302, 1402 in a sealed, liquid tight fashion. Advantageously, the through holes 28, 74, 116, 224, 328, 428, 528, 628, 728, 828, 1028, 1028, 1128, 1228, 1328, 1428 are positioned on the base 12, 52, 202, 302, 402, 502, 602, 702, 802, 1002, 1002, 1102, 1202, 1302, 1402 so that an anchoring section will be securely fastened to the surface upon fastening. Advantageously, the mount assembly 10, 50, 100, 200, 300, 400, 500, 600, 700, 800, 1000, 1000, 1100, 1200, 1300, 1400 may be securely installed without the need of a flashing.

While several embodiments of mount assemblies are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

The invention claimed is:

1. A mount assembly for securing a solar panel rail or a rail-less support structure directly to a roof surface, the mount assembly comprising:
   - a two-part base comprising a top portion and a bottom portion, wherein the top portion is nestable within the bottom portion,
   - the top portion of the base comprises an exterior sidewall and a top surface,
   - the bottom portion of the base comprises an interior sidewall with a top and a bottom;
   - a guide extending upwards from the top portion of the base, wherein the guide forms a pair of members extending from the base and an aperture between the pair of members;
   - a through-hole portion, wherein the through-hole portion is formed within the top portion of the base and passes through the top surface and a bottom surface of the top portion; and
   - a fastener, wherein the fastener is sized to pass through the through-hole portion; and wherein a shape of the exterior sidewall of the top portion and a dimension of the exterior sidewall of the top portion match a shape of the interior sidewall of the bottom portion and a dimension of the interior sidewall of the bottom portion, respectively, and the top surface of the top portion of the base is lower than the top of the interior sidewall of the bottom portion of the base.

2. The mount assembly according to claim 1, wherein a bottom surface of the bottom portion of the two-part base comprises a curved portion.

3. The mount assembly according to claim 1, further comprising an outer rim, wherein the outer rim surrounds a concave portion of the two-part base.

4. The mount assembly according to claim 1, further comprising a gasket member, wherein the gasket member at least partially contacts an outer rim of the bottom portion of the two-part base.

5. The mount assembly according to claim 2, wherein the bottom surface of the bottom portion of the base comprises a first portion and a second portion, and wherein the second portion is inset relative to the first portion.

6. The mount assembly according to claim 2, further comprising a gasket member, wherein the gasket member at least partially surrounds a first portion of the bottom surface of the bottom portion of the two-part base.

7. The mount assembly according to claim 2, wherein the bottom portion further comprises an open space defined by the interior sidewall and an exterior sidewall.

8. A mount assembly for securing a solar panel rail or a rail-less support structure directly to a roof surface, the mount assembly comprising:
- a two-part base comprising a top portion and a bottom portion, the top portion having a top surface and the bottom portion having an interior sidewall, wherein the top portion is nestable within the bottom portion and the top surface is below a top of the interior sidewall;
- a guide extending upwards from the top portion of the base, wherein the guide forms a pair of members, the pair of members having an upward height greater than an upward height of the bottom portion, the guide forming an aperture between the pair of members;
- a through-hole portion, wherein the through-hole portion is formed within the top portion of the base and passes through a bottom surface of the top portion; and
- a fastener, wherein the fastener is sized to pass through the through-hole portion and is a threaded lag bolt.

9. The mount assembly according to claim 8, wherein the bottom portion of the base comprises an opening, an exterior sidewall, a top rim, and a bottom rim.

10. The mount assembly according to claim 8, wherein the top portion of the base comprises an exterior sidewall, and wherein a shape of the exterior sidewall of the top portion and a dimension of the exterior sidewall of the top portion match a shape of the interior sidewall of the bottom portion and a dimension of the interior sidewall of the bottom portion, respectively.

11. The mount assembly according to claim 8, wherein the bottom portion further comprises an open space defined by the interior sidewall and an exterior sidewall.

12. The mount assembly according to claim 8, wherein the top portion further comprises a lip extending at least partially around an exterior sidewall, and wherein the lip of the top portion is configured to contact a top rim of the bottom portion when the top portion and the bottom portion are in a fully nested configuration.

13. The mount assembly according to claim 8, further comprising a gasket member, wherein the gasket member at least partially contacts a bottom rim of the bottom portion of the base.

14. A mount assembly for securing a solar panel rail or a rail-less support structure directly to a roof surface, the mount assembly comprising:
- a two-part base comprising a top portion and a bottom portion, wherein the top portion is nestable within the bottom portion;
- a guide extending upwards from the top portion of the base, wherein the guide forms a pair of members extending from the base and an aperture between the pair of members;
- a through-hole portion, wherein the through-hole portion is formed within the top portion of the base and passes through a bottom surface of the top portion; and
- a gasket member, wherein the gasket member at least partially contacts a bottom rim of the bottom portion of the base and the bottom surface of the top portion is positioned within an inner space defined by the gasket member.

* * * * *